United States Patent
Allen et al.

(10) Patent No.: US 6,630,566 B1
(45) Date of Patent: Oct. 7, 2003

(54) POLYMERIC MATERIAL COMPRISING N, P, S, AS, OR SE AND COMPOSITION FOR CHARGE TRANSPORT MATERIAL

(75) Inventors: Joanne Victoria Allen, Blackley (GB); John Dylan Morgan, Blackley (GB); Julie Anne Fergus, Blackley (GB); Mark Thomas, Liverpool (GB); Stephen William Leeming, Blackley (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/581,914

(22) PCT Filed: Dec. 16, 1998

(86) PCT No.: PCT/GB98/03685

§ 371 (c)(1), (2), (4) Date: Oct. 2, 2001

(87) PCT Pub. No.: WO99/32537

PCT Pub. Date: Jul. 1, 1999

(30) Foreign Application Priority Data

Dec. 19, 1997 (GB) ................................................ 9726810

(51) Int. Cl.$^7$ .......................... C08G 73/00; C08G 75/00
(52) U.S. Cl. ........................ 528/422; 528/373; 528/398; 525/328.5; 428/690; 428/917; 250/462.1
(58) Field of Search ..................... 528/422, 373, 528/398; 525/328.5; 428/690, 914; 250/462.1

(56) References Cited

FOREIGN PATENT DOCUMENTS

| | | |
|---|---|---|
| DE | 3610649 | 10/1987 |
| EP | 0 506 368 | 9/1992 |

OTHER PUBLICATIONS

Patent Abstracts of Japan, vol. 008, No. 24 (C–208), Feb. 2, 1984 & JP 58 189254 A (Kogyo Gijutsuin; others: OJ), Nov. 4, 1983 see abstract.

Primary Examiner—Duc Truong
(74) Attorney, Agent, or Firm—Pillsbury Winthrop LLP

(57) ABSTRACT

A polymeric material comprises at least one repeat unit consisting substantially of a moiety of Formula 1:

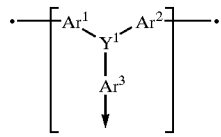

Figure 1:
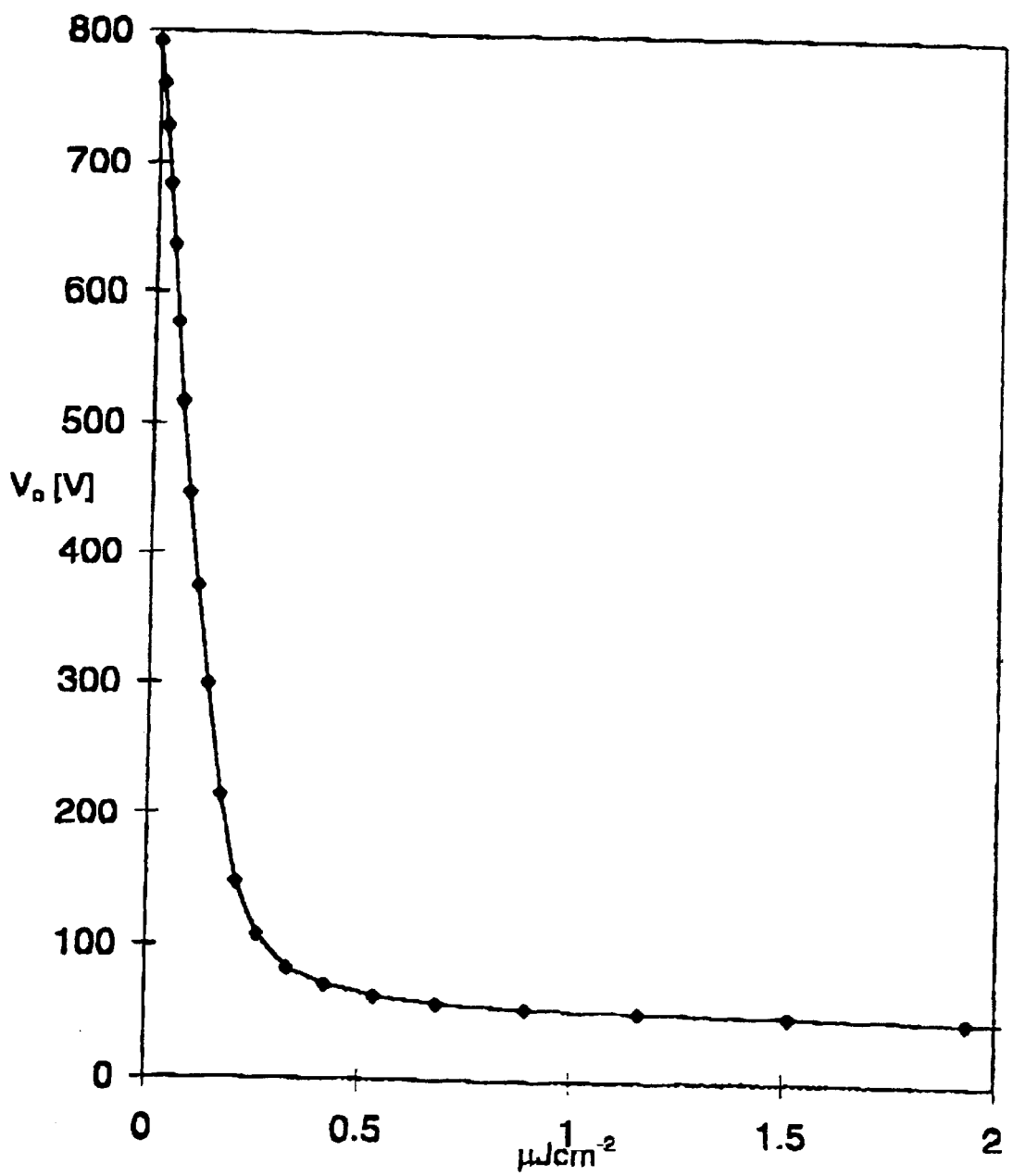

Formula 1 in which $Y^1$ represents N, P, S, As and/or Se, $Ar^1$ and $Ar^2$, which may the same or different, represent independently a multivalent, optionally substituted aromatic group, and $Ar^3$ represents independently a mono or multivalent, optionally substituted aromatic group. At least one terminal group is attached in the polymer to the $Ar^1$, $Ar^2$ and optionally $Ar^3$ groups located at the end of the polymer chains, so as to cap the polymer chains and prevent further polymer growth. At least one terminal group is derived from at least one end capping reagent used in the polymerisation to form the polymeric material to control the molecular weight thereof. A charge transport material comprising such polymers is useful in electroreprographic and electroluminescent devices. These polymers may be made by controlling their molecular weight with an end capping reagent.

13 Claims, 5 Drawing Sheets

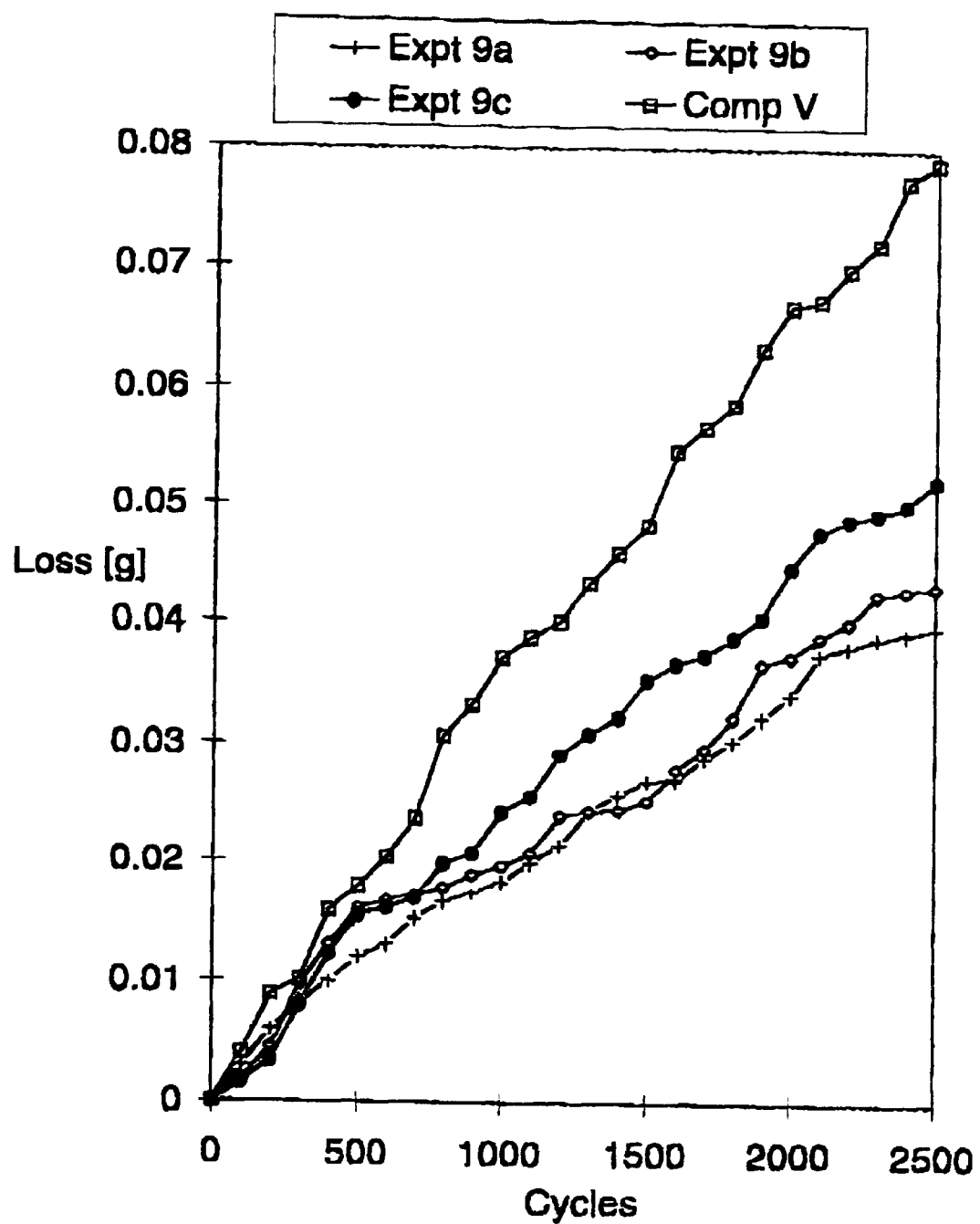

POLYMERIC MATERIAL COMPRISING N, P, S, AS, OR SE AND COMPOSITION FOR CHARGE TRANSPORT MATERIAL

The present invention relates to certain polymeric materials, and compositions containing them, which may be useful as charge transport materials. The invention also relates to processes for making these polymers and their use in devices such as electroreprographic devices and electroluminescent devices.

Polymers of the invention may be particularly useful in the field of electroreprography. Electroreprography is any process in which an image is reproduced by means of electricity and incident radiation, usually, electromagnetic radiation, more usually visible light. Electroreprography includes the technology of electrophotography which encompasses photocopying and laser printing technologies. Typically, in both a photocopier and a laser printer, a photo-conductive member is first charged in the dark (e.g. by applying a high voltage via a Corona discharge). Then a latent electrostatic image in charge is produced by partial exposure of the charged photo-conductive member (e.g. a drum or belt) to radiation (e.g. light). The radiation neutralises the charge to the exposed regions. The light source can either be reflected light from an illuminated image (photocopying) or from a laser which scans the photo-conductive member usually under instruction from a computer (laser printing). Once a latent image has been produced in charge, it is developed with toner, the toner is transferred onto a substrate (e.g. paper) and then fixed thereto (e.g. by heat) so that a visible image is obtained.

The photo-conductive member typically comprises a photo-conductor (e.g. an organic photo-conductor ["OPC"]) which must perform two different functions: generate a charge on exposure to the incident radiation; and transport the photo-generated charge to the surface. The unexposed regions of the photo-conductive member will retain their charge and form the latent image. It is usual to use different materials for each of these two processes and develop materials which are separately optimized for their ability to generate photo-induced charge (charge generating materials or "CGMs") or their ability to transport charge (charge transport materials or "CTMs"). One aspect of the present invention is concerned with improvements in the field of CTMs.

The photo-conductor can be constructed as a single law or from a plurality of layers, for example from at least one charge generating layer ("CGL") comprising the CGM and at least one separate charge transport layer ("CTL") comprising the CTM.

An ideal photoconductor would be one where the material charges rapidly to a high value in the dark, retains the charge in the dark (i.e. exhibits no dark decay) and shows rapid total discharge on exposure to low-intensity illumination. The time taken for the charge-discharge cycle of a photo-conductor limits the maximum speed at which the latent image can be generated. Photo-conductive materials with improved electrical properties allow faster printing and copying.

The present invention relates to certain polymeric materials which may comprise triarylamine repeat units and which can offer improved properties as charge transport materials. Triarylamines are well known small molecule CTMs. Certain large molecule compounds and polymeric materials that comprise triarylamine moieties and/or repeat units are also known in the prior art, as described below.

DE 3610649 (BASF) discloses polymers of formula:

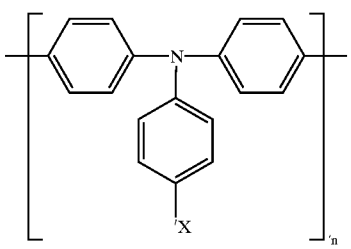

where 'n is from 1 to 100, and 'X is H or Br. These polymers are made from an Ullmann coupling of tri- and/or di-bromotriphenylamine monomers and are not end capped (i.e. are not treated with a material with acts as an end capping reagent positively to control the molecular weight of the chains during polymerisation). This reference only suggests the use of these polymers as effective electrical conductors if doped either chemically (e.g. with tris-p-bromophonylaminiumhexachloroantimonate) or electrochemically (e.g. by anodic oxidation with conducting salt anions). This acts as a disincentive for a reader of this document to use undoped triarylamine polymers as CTMs in electroreprography, particularly as this field of use is not mentioned in this patent. This document does not suggest that it might be desirable to control the properties of these polymers during polymerisation, or how this might be achieved.

EP 0669654-A (Toyo ink) (=U.S. Pat. No. 5,681,664) discloses a hole transport material which is a copolymer of formula:

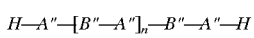

where A" is a aromatic amine moiety which may be a triarylamine and B" is a $C_{4-7}$alicyclic moiety which optionally may contain heteroatoms. This document teaches that these copolymers need the alicyclic moiety B" to be an effective hole transport material and this would discourage a reader of this document from using polymers without this moiety as CTMs. These polymers are not intentionally end capped.

EP 0786106-A (Toyo ink) discloses light emitting compounds of formula:

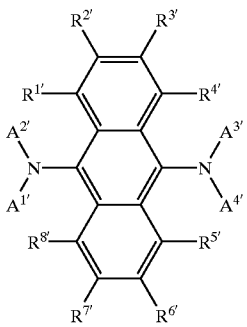

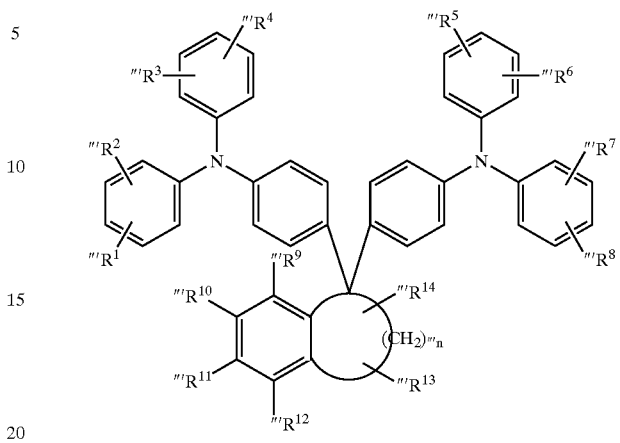

where each of $A^{1-}$ to $A^{4-}$ is a substituted or unsubstituted aryl group having 6 to 16 carbon atoms, and each of $R^{1-}$ to $R^{8-}$ is independently a hydrogen atom, a halogen atom, a substituted or unsubstituted alkyl group, a substituted or unsubstituted alkoxy group, a substituted or unsubstituted aryl group or a substituted or unsubstituted amino group, provided that adjacent substituents may form an aryl ring. These compounds are not polymers and there is no suggestion from this document to use polymers as CTMs.

EP 0827367-A (Xerox) disclose the use in electroluminescent (EL) devices of polynuclear amines of formula:

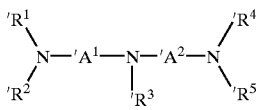

where 'R$^1$ to 'R$^5$ are aryl groups and 'A$^1$ and 'A$^2$ are biaryl groups. These compounds are monodisperse molecules which are prepared by direct synthesis (e.g. Ullmann coupling), not by polymerisation. These compounds are not polymers. Indeed this patent teaches explicitly that polymeric CTMs are disadvantageous compared to the above compounds, as Xerox state that, unlike polymers, these compounds can be used to prepare a CTL by vapour deposition (see page 2, lines 29 to 31).

JP-A-08(96)-040995, 040996 and 040997 (all Togo ink) are consecutively numbered patent publications each of which discloses certain compounds which comprise triphenylamine residues. The compounds in stated to have utility in OLEDs and electrophotosensors. These triarylamine derivatives are molecular compounds and are not end gapped polymeric materials.

JP-A-08(96)-259938 (Togo ink) describes hole transport materials (for use in electrophotography and OLEDs) which are compounds of the formula:

where: '''R$^1$ to '''R$^{14}$ are H, halogen, optionally substituted alkyl, optionally substituted alkoxy, optionally substituted thioalkoxy, cyano, amino, mono- or di-substituted amino, hydroxy, mercapto, optionally substituted aryloxy, optionally substituted arylthio, optionally substituted carbocyclic aromatic ring group, optionally substituted heterocyclic aromatic ring group, optionally substituted heterocyclic group with neighbouring substituents optionally forming optionally substituted alicyclic ring, optionally substituted carbocyclic aromatic ring, optionally substituted heterocyclic aromatic ring, optionally substituted heterocyclic ring: and '''n is 2 to 7. These molecules contain a saturated alicyclic or heterocyclic moiety, are not polymers and are not end capped.

U.S. Pat. No. 3,256,486 (Eastman Kodak) discloses doped linear polymers comprising triarylamine repeat units which have utility as photo-conductors in electrophotography where the polymer would perform the function of both the COM and CTM. This teaches away from the use of undoped linear polymers as a separate CTM in conjunction with a (different) CGM. The polymers disclosed are not end capped polymers and there is no suggestion that it would be desirable to control polymerisation or how this might be achieved.

U.S. Pat. No. 4,322,487 (Eastman Kodak): and Research Disclosure 19014 (Feb 1980); disclose particles for use in electrophoretic migration imaging. The particles comprise a colorant in a polymeric binder which further comprises triarylamine repeat units (the aryl groups being optionally substituted). These polymers are not end capped and are not used as CTMs.

U.S. Pat. No. 4,565,860 (Nissan) discloses a polymer comprising -[N(p-Ph)$_a$]- repeat units (where Ph means para-phenylene or phenylenyl). The polymer is not end capped and is doped with an electron acceptor to be an effective electro-conductor. This teaches away from using either undoped or end capped triarylamine polymers as CTMs.

U.S. Pat. No. 4,741,603 (Nissan) discloses conjugated triphenylamine polymers which are used as the active component of an electrochromic mirror. These polymers are not end capped and are not designed for use as CTMs.

U.S. Pat. No. 4,801,185 (Nissan) discloses an electrochromic cell which comprises certain triphenylamine polymers. These polymers are not end capped and are also not designed for use as CTMs.

U.S. Pat. No. 5,476,740 (Xerox) describes a particular OPC device comprising CGMs and CTMs. One of the four preferred types of CTM listed (see col. 10, lines 66) is "poly triarylamines". There is no further detail given of which triarylamine polymers are meant. End capped triarylamine polymers are not disclosed.

U.S. 5,877,096 (Ricoh) relates to a particular construction of OPC with TIOPc as the CGM. One of 26 CTMs types listed as usable in this OPC (see col. 10, lines 12 to 27) is "triarylamine derivatives". This general reference to triarylamine CTMs does provide any motivation to make end capped triarylamine polymers.

WO 97-33193 (Dow Chemical co.) discloses certain cross-linkable and chain extendable polyarylamines with utility in organic light-emitting materials (OLEMs). The polymers disclosed in this document are copolymers which achieve their stated cross-linkability and chain extending properties by comprising at least one reactive group selected from: hydroxy, glycidyl ether, acrylate ester, methacrylate ester, ethenyl, ethynyl vinylbenzoxyl, maleimide, nadimide, trifluorovinyl, ether, a cyclobutene attached to adjacent atoms on the aromatic group, and trialkylsiloxy. Dow argue that the properties required for a polymer to be a good CTM for are OLEM are different from those required for an electroreprographic CTM (see page 1, lines 14 to 29). There is no disclosure in this reference of how to prepare polymers using are end capping reagent to control molecular weight and no teaching that it might be advantageous to do so.

WO 98-06773 (Dow Chemical Co.) discloses certain polyarylamines with utility in OLEMs. The polymers have the formula:

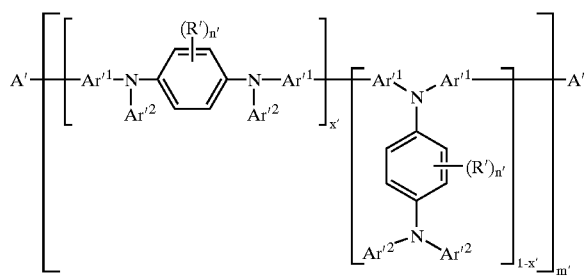

wherein:
R⁻ is independently in each occurrence a
    $C_{1-24}$hydrocarbyl, $C_{1-24}$hydrocarboxy, $C_{1-24}$hydrocarbylthiooxy, or $C_{1-24}$hydrocarbylcarboxyl;
$Ar^{-1}$ and $Ar^{-2}$ are independently in each occurrence a $C_{6-18}$ aryl moiety optionally substituted with a $C_{1-12}$hydrocarbyl, $C_{1-12}$hydrocarbyloxy, $C_{1-12}$hydrocarbylthiooxy, or $C_{1-12}$hydrocarbylcarboxyl;
A⁻ is independently in each occurrence hydrogen or a halogen;
x⁻ is independently in each occurrence a positive number from 0 to 1:

n⁻ is independently in each occurrence a whole number of from 0 to 4; and m⁻ is a number from 5 to 1000.

These polymers are terminated with an A⁻ group which is either H or halo; comprise diamine repeat unit(s); and are not end capped. The method of polymerisation used to prepare these polymers does not readily control their polydispersity (i.e. m⁻ falls within a large of numbers). Thus it is difficult to optimise the properties of these polymers. As in the previous reference, Dow argue that CTMs designed for use with OLEMs are not necessarily good as electroreprographic CTMs (see page 1, lines 10 to 20).

WO 98/02018 (Bayer) discloses a particular construction of OLEM device comprising as the CTM a compound of formula:

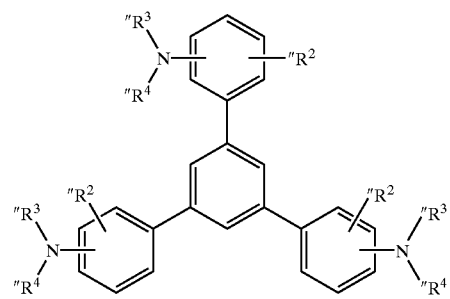

where "$R^2$ is H, optionally substituted alkyl or halogen; and "$R^8$ and/or "$R^4$ may be (amongst other things) optionally substituted aryl. These large molecules comprise three triarylamine units (e.g. three triphenylamines) attached to a central benzine ring. These compounds are not polymers, are monodisperse and do not comprise intentional end capping groups. They are produced by direct chemical synthesis not polymerisation.

Synthetic Metals, 1991, Vol. 40, pages 231–238 (Nissan) discloses a method for the synthesis of certain polymers comprising -[N(p-Ph)₃]- repeat unit. The polymers are described as electrical conductors when doped with, iodine but insulators when undoped. These are not end capped.

Macromal. Chem., 1992, Vol. 193, cages 909–919, "The higher homologues of triphenylamine: model compounds for poly(N-phenyl-1.4-phenyleneamine)" discloses compounds of formulae:

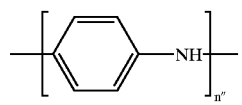

and

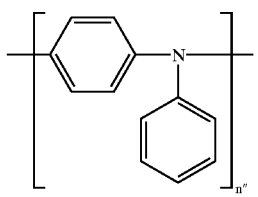

Preparation of poly(N-phenyl-1,4-phenyleneamine), its dimer, trimer and tetramer are described. These compounds are monodiasperse, small molecule oligomers of up to 4 repeat units, and are not end capped. They are prepared by stepwise synthesis, not polymerisation, Chem. Commun., 1997, page 2083 (Tanaka et al.) and Chemistry & Industry, Nov, 17, 1997, page 914; both disclose that certain branched bromo containing triphenylamine polymers may be useful CTMs. Tanaka et al state that a disadvantage of their preparation method is the lack of control over molecular weight. These polymers are not end capped.

Polym. Prep. (Am. Chem. Soc. Div. Polym. Chem.) 1997, Vol. 38(1), pages 388–389; Chem. Commun., 1986; pages 2175–2176; and Appl. Phys. Letts., Apr. 14, 1997, Vol. 70(15), pages 1829–1931 (all Toyota); disclose molecular hole transporting materials for use in an electroluminescent device. The materials have the following formulae:

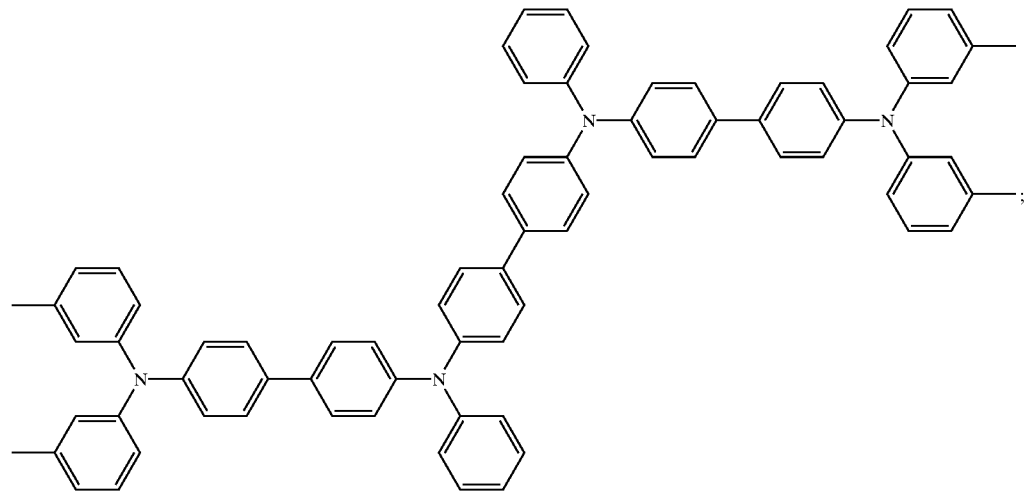

TPTE

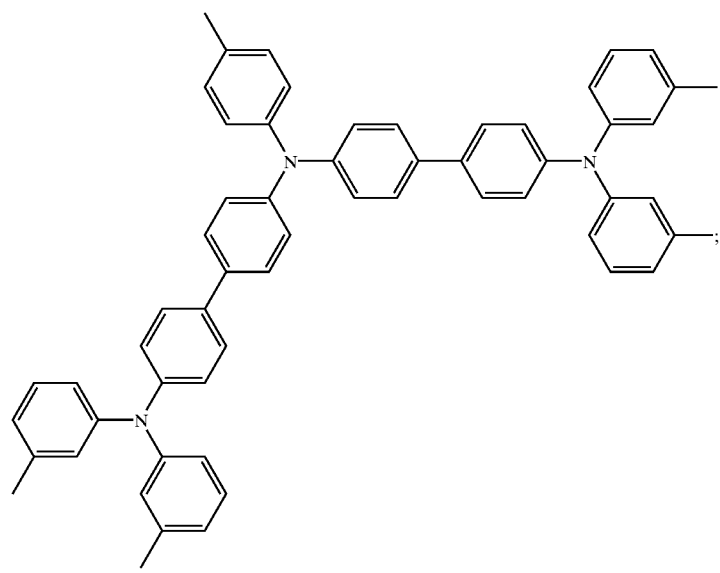

TPTR

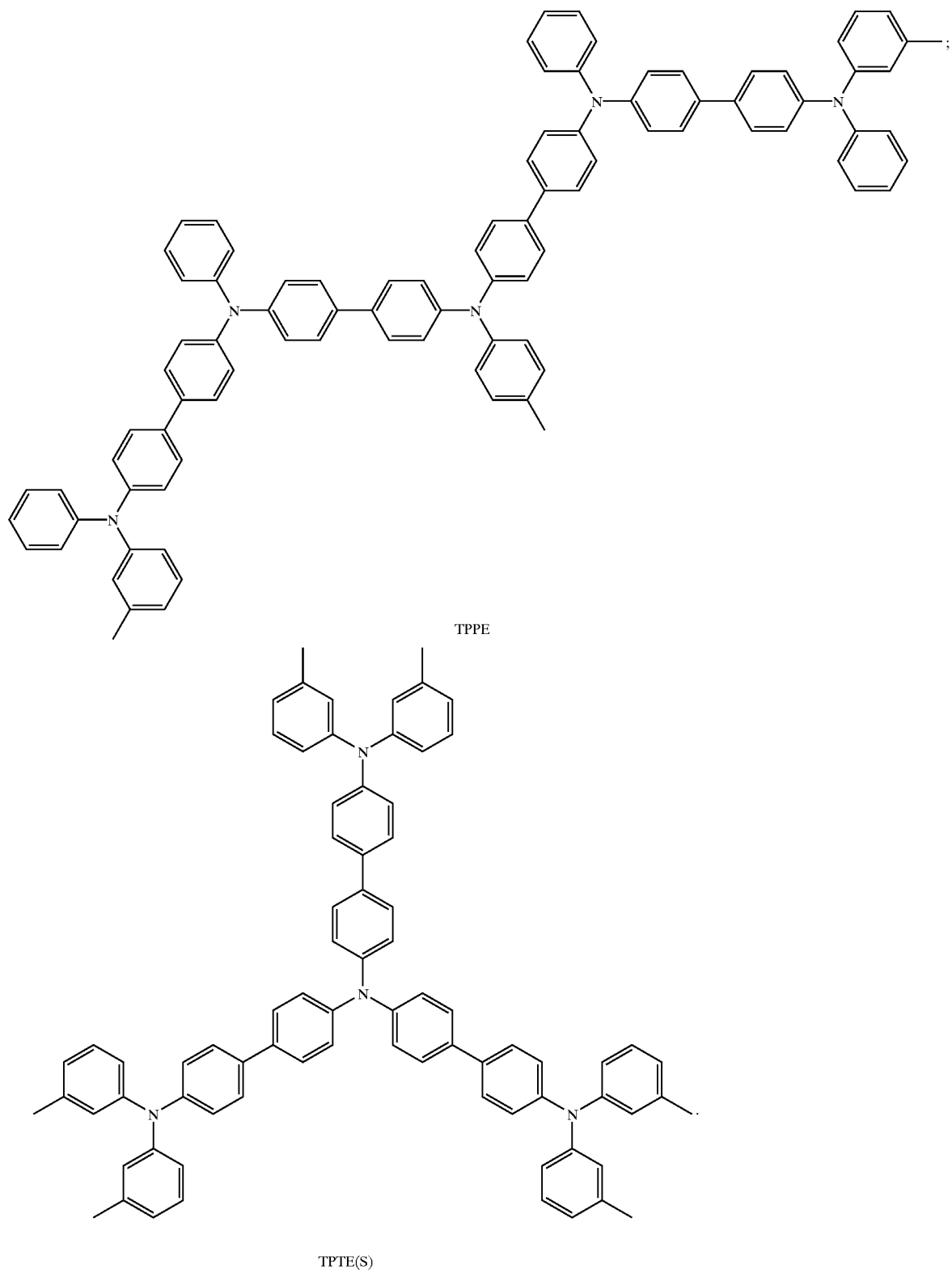
TPPE
TPTE(S)
These molecules are prepared directly via an expensive multi-stage chemical synthesis which produces each molecule in a chemically pure monodisperse form. These molecules are not end capped with terminal groups and there would be no reason to do so as they are not produced by polymerisation. These materials ate monodisperse and consist of molecules of a single molecular weight. This is very different from a polydisperse polymeric material made try a polymerisation method which comprises a mixture of different polymeric species of varying chain lengths and with a distribution of molecular weights. The molecular weight for a polydisperse polymer would be calculated as an average value for the bulk polymer.

A paper by Kocheleva, Tameev et al. (from resp. Karpov inert. of Phys. Chem and A. N. Framing Inst. of Electrochem. of Rus. Acad. Sci.) was inducted in the proceedings from IS&T NIP 14:1998 International Conference on Digital Printing Techniques. Oct. 18 to 23, 1988, entitled "Catalytic dehalogenation polymerisation of 4,4'-dihalogentriphenylamines in the presence of a nickel complex" (pages 528 to 531). This paper discloses triphenylamine oligomers comprising from 4 to 10 repeat units synthesised by nickel promoted dehalogenation polymerisation of 4,4'-dihalogentriphenylamines. These materials are not end capped or produced using an end capping reagent. They were tested as the CTM in an otherwise conventional dual layer photo-receptor. The paper explicitly teaches (see Table 5 below) that:

"electrophotographic characteristics of oligomeric TPA improve ith increasing their molecular weights. Thus the photosensitivity of PTPA-3 is almost comparable to those of DEH end TPD." (page 530, col. 2 lines 1 to 4-underlining added).

Furthermore the paper states that the TPA oligomers:

"doped polycarbonate. . . [to show]. . . xerographic properties which were comparable to those for DEH end TPD." (page 531, col, lines 16 to 18—underlining added).

The results obtained in this paper were set out in Table 1 (col. 2, page 530) as follows:

| [CTM] | $M_w$ | Photosensitivity, S (lx × s)$^{-1}$ |
|---|---|---|
| PTPA-1 | 1154 | 2.9 |
| PTPA-2 | 1680 | 2.9 |
| PTPA-3 | 2300 | 3.5 |
| DEH | — | 3.3 |
| TPD | — | 2.9 |

DEH is (diethylamino)benzaldehyde diphenylhydrazone. TPD is bis(N,N'-3-methylphenyl)bis(N,N'-phenyl)-1,1'-biphenyl-4,4'-diamine. Both DEH and TPD are well-known small molecule CTMs. PTPA-1, PTPA-2 and PTPA-3 ae various non end capped, triarylamine oligomeric CTMs that were made by nickel promoted dehalogenation polymerisation of 4,4'-halogentriphenylalamines as described in this paper. The photo-conductor tested was of a conventional dual layer construction (a CTL on a CGL). The CTL consisted of the same polymer binder ($M_w$=30,000) doped in each case with one of the CTMs listed above at a 1:1 weight ratio with the CTL binder. The CGL used in each test was a 2:1 respective ratio of TIOPc dispersed in a polyvinyl butyral binder. These results show that oligomeric CTMs made as described in this paper (without end capping) when tested at the same concentration exhibit only comparable photo-sensitivities to well known small molecule CTMs (such as TPD which is a small molecule triarylamine). There is no teaching in this paper which would suggest to a reader how the oligomers disclosed therein might be modified to exhibit much improved electroreprographic properties over the prior art.

Thus the prior art materials described above have various deficiencies as CTMs. For example the prior art teaches the use of large molecules comprising a triarylamine repeat unit in conductive layers, which must then be doped with additional materials (e.g. iodine) and/or must comprise additional substituents (e.g. bromo) to achieve good electrical conduction and/or further cross-linking or chain extension of the CTM. The prior art also teaches that triarylamine oligomeric CTMs are of low molecular weight, are produced by direct synthesis not polymerisation and/or are monodisperse. There is no teaching in the prior art of how polymerisation might be readily controlled to produce a satisfactory triarylamine polymeric CTM. There is empirical evidence in the prior art that triarylamine polymers exhibit only similar photosensitivity to small-molecule triarylamine CTMs.

The CTMs currently available are not completely satisfactory in some or all respects such as those discussed previously. Thus it would be desirable to provide CTMs which result in improvements in some or all of the aforementioned areas.

The applicant has unexpectedly discovered that certain end capped polymers, which can be based on triaryl amine repeat units(s), act as much improved charge transfer materials. This finding is in direct contradiction to what might have been predicted from the prior art. Thus it is very surprising that the end upped polymers of the invention overcome some or all of the aforementioned disadvantages with known CTMs.

Therefore broadly in accordance with the present invention there is provided a polymeric material comprising at least one repeat unit, the or each of more than one) repeat unit consisting substantially of a moiety of Formula 1:

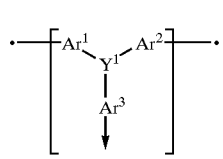

Formula 1 in which:

$Y^1$ represents, independently if in different repeat unit, N, P, s, As and/or Se preferably N:

$Ar^1$ and $Ar^2$ which may be the same or different, represent, independently if in different repeat units, a multivalent (preferably bivalent) aromatic group (preferably mononuclear but optionally polynuclear) optionally substituted by at least one optionally substituted $C_{1-40}$carbyl-derived groups and/or at least one other optional substituent and $Ar^3$ represents, independently if in different repeat units, a mono or multivalent (preferably bivalent) aromatic group (preferably mononuclear but optionally polynuclear) optionally substituted by at least one: optionally substituted $C_{1-40}$carbyl-derived group and/or at least one other optional substituent, where at least one terminal group is attached in the polymer to the $Ar^1$, $Ar^2$ and optionally $Ar^3$ groups located at the end of the polymer chains, so as to cap the polymer chains and prevent further polymer growth, and at least one terminal group is derived from at least one end capping reagent used in the polymerisation to form said polymeric material to control the molecular weight thereof.

It will be appreciated that when the central atom (e.g. $Y^1$ and/or $Y^2$) in the repeat units of polymers of the invention and polymer precursors used to form them (denoted by the various formulae herein) is other than trivalent (e.g. divalent S and/or divalent Se), the number of aromatic groups (e.g. denoted by $Ar^1$, $Ar^2$ and for $Ar^3$) attached thereto will be adjusted to correspond to the valence of the central atom (e.g. for divalent S and/or divalent Se, in Formulae 1 and/or 2, $Ar^3$ and the arrow therefrom are not present and the repeat unit is divalent rather than optionally trivalent).

The number of the repeat units of Formula 1 which may be present in a particular polymer molecule of the invention (and which can also be denoted by the integer 'n' herein) may be from 2 to 20,000 inclusive.

The polymeric materials of the present invention are obtainable (preferably are obtained) by polymerisation controlled by addition of at least one end capping reagent in an amount sufficient to reduce substantially, further growth of the polymer chain.

The asterisks extending from $Ar^1$ and $Ar^3$ in Formula 1 are intended to indicate that these groups may be multivalent (including divalent as shown 1n Formula 1).

The arrows extending from certain polymers and moieties therein (for example from $Ar^3$ in Formulas 1 and 2 herein and the ring to which $R^3$ may be attached in Formula 3 herein) are intended to indicate that these groups may be monovalent or multivalent if these groups are monovalent the arrow denotes a bond to a suitable terminal group such as hydrogen or another substituent which is inert to coupling under the conditions of polymerisation (e.g. alkyl or aryl). In Formulae 2 and 3 hereinafter such a terminal group is denoted by $R^3$ which is only present when the aryl group to which it is attached is monovalent. If the group is multivalent (e.g. bivalent) the arrow denotes a bond to another repeat unit (i.e. the polymer chain is branched and/or cross-linked).

The end capped polymers of the invention can be produced more cheaply and with a better control over their resultant properties (such as their molecular weight and polydispersity) due to the end capping. Furthermore the chemical nature of the end cap can to selected to control aspects of the polymerisation and hence properties of the resultant polymer. For example carrier mobility, polymer compatibility, electronic configuration [e.g. frontier orbital (FO) energy levels] and/or solubility may be strongly affected by substitution (if used) and/or molecular weight (e.g. mobility can be shown to increase with polymer molecular weight). The polymers of the present invention may act as very good CTMs, compared to similar polymers in the prior art. Thus it is surprising that end capped triarylamine polymers of the present invention, which can be easily prepared with controllable properties, may also be very effective, better CTMs compared to the prior art, as well as possessing other useful advantages.

The novel polymers of the present invention are of use as very effective CTMs in electroreprographic devices. However such polymers may have many other uses which may rely on the same, similar and/or different properties to those required for electroreprography.

For example the polymers of the present invention may be generally relevant for use in (and/or in combination with) any application and/or device which requires the use of polymeric conductors, polymeric photo-conductors, organic photo-conductors (OPCs), electroluminescent (EL) materials, polymeric materials which exhibit substantial conjugation over the polymer and/or polymeric semiconductors. Preferred polymeric semiconductors have hole mobilities greater than 0.01 $cm^2$/volt sec. This minimum mobility is either that of the pure polymeric material, or of an admixture of the polymeric material with one or more other polymeric or monomeric materials having different electrical and/or physical properties. Preferably the polymers of the present invention also exhibit some or all of the following other useful properties: high carrier mobility, compatibility with binders, improved solubility, high durability and/or high resistivity undoped.

Preferably the polymers of the invention may be used in at least one of the following devices and/or for at least one of the following applications: electroreprographic devices (such as those described herein); electroluminescent (EL) devices {such as organic light emitting devices (OLEDs) [e.g, devices where the OLEM comprises a light emitting polymer (LEP)] and/or devices which comprise light emitting diodes (LEDs), [where the light emitting material may be inorganic but is preferably an organic, oligomeric or polymeric material]}; semi-conductor devices; photoconductive diodes; metal-semiconductor junctions (e.g. Schottky barrier diodes); p-n junction diodes; solar cells and/or batteries; photovoltaic devices (e.g. photovoltaic cells); photodetectors, optical sensors; phototransducers; bipolar junction transistors (BJTs), heterojunction bipolar translators and/or other switching transistors; field effect transistors (FETs) (which may comprises metal-semiconductor FETs, metal-insulator-semiconductor FETs and/or organic FETs); charge transfer devices (which may comprise charge coupled devices [CCDs]); lasers (which may comprise semi-conductor and/or organic lasers); p-n-p-n switching devices (which may comprise semiconductor controlled rectifiers [SCRs]); optically active EL devices (which for example may be prepared by control of homochiral monomer polymerisation to achieve polarised light output, e.g, for 3-D imaging); thin film transistors (TFT, e.g. polymeric TFTs); organic radiation detectors; infra-red emitters; tunable microcavities for variable output wavelength; telecommunications devices and applications (for example a combination of OLEM, fibre optic and detector): optical computing devices (especially using materials with improved switching speeds): optical memory devices (for example devices which rely on external stimulus to trigger EL emission for devices run just below threshold onset voltage); general design of detectors and/or sensors (for example by combining EL excitation just below onset voltage, relying on external stimulation to trigger EL emission); chemical detectors (e.g. by combining EL with know or future luminescence detector systems); and combinations of any such devices and/or applications in which they are used.

In such applications and devices the polymer of the invention may be used either as the pure polymeric material, or of an admixture of the polymeric material with one or more other polymeric or monomeric materials having different electrical and/or physical properties. It may be laid down in a film form, (often less than one micron thick or even less than 250 nanometers thick) which can be optionally patterned or structured by a variety of coating or printing techniques such as dip coating, roller coating reverse roll coating, bar coating, spin coating, gravure coating, lithographic coating (including photolithographic processes), ink jet coating (including continuous and drop-on-demand, and fired by piezo or thermal processes), screen coating, spray coating and web coating. In the fully functional application or devices, the polymer of the invention or an admixture of polymer of the invention with one or more other polymeric or monomeric materials having different electrical and/or physical properties, may be in contact with metallic or non-metallic materials (having conducting, semi-conducting or non-conducting properties) In order to give a functioning application and/or device.

Certain of than applications require the tuning of the properties of the polymers of the invention which can readily be achieved by the preparation methods described herein, such as end capping. It will be understood that preferred polymers may have different, even opposite, optimal properties that those which are preferred and/or exemplified herein for electroreprographic applications. For example polymeric CTMs of the invention when optimised for use with organic light emitting materials [OLEMs] preferably may have a higher molecular weight and/or different mobilities than optimal for electroreprography.

Furthermore the compositions and/or specific polymers used for each application may be different. For example it is desirable that an electroreprographic polymeric CTM Is compatible with the binder polymers (such as polycarbonates) used to make a CTL By comparison a polymeric CTM for use in an OLEM may be formulated without many other (or wart no other) ingredients to make a film of substantially pure CTM. Thus each of these CTM polymers may require different physical properties.

More preferably polymers of the present invention are useful as charge transport materials (CTMs), most preferably in the fields of electroreprography and/or electroluminescent devices, especially electroreprography.

As mentioned above $Ar^1$, $Ar^2$ and $Ar^3$ are each an optionally substituted aromatic group which may be a mononuclear aromatic group or a polynuclear aromatic group. A mononuclear aromatic group has only one aromatic ring, for example phenyl or phenylene. A polynuclear aromatic group has two or shore aromatic rings which may be fused (for example napthyl or naphthylene), individually covalently linked (for example biphenyl and/or a combination of both fused and individually linked aromatic rings. Preferably each $Ar^1$, $Ar^2$ and $Ar^3$ is an aromatic group which is substantially conjugated over substantially the whole group.

Polymers of the present invention are end capped, that is polymerisation is controlled by adding at least one end capping reagent to limit further growth of the polymer chain. If the end capping reagent is added in excess (e.g. at the step when it is desired to terminate polymerisation) further growth of the polymer chain (and/or polymer network if the polymer is branched and/or moss-linked) can be substantially inhibited (e.g. substantially quenched). The end capping reagent adds terminal group(s) to the polymer chain which are substantially incapable under the conditions of polymerisation of undergoing coupling (e.g. with other polymer precursor and/or other parts on the polymer chain). The terminal groups) end cap the polymer chain end act to substantially reduce the possibility of (preferably stop) hither polymerisation by blocking sites at which the polymer chain could otherwise grow under the conditions of the polymerisation. Preferably in the polymers of the present invention from about 60% to substantially all of the polymerisation sites are blocked by at least one terminal substituent. More preferably (in one option) substantially all such sites are blocked. In another more preferable option from about 60% to about 90% of these sites are blocked.

Optional features of polymers of the invention which may further distinguish them from known polymers are any one or more of the following: invention polymers can be electroreprographically effective; invention polymers can have an $M_n$ value of at least about 1000 daltons; invention polymers can comprise terminal group(s) other than those formed from bromobenzocyclobutene; invention polymers can comprise terminal group(s) other than a group selected from: (H, halo, hydroxy, glycidyl ether, acrylate ester, methacrylate ester, ethenyl, ethynyl, vinylbenzoxyl, maleimide, nadimide, trifluorovinyl, ether, a cyclobutene, a group forming part of a cyclobutene group, and trialkylsiloxy); invention polymers can be other than copolymer(s) which consist of triarylamine repeat unit(s) and $C_{4-7}$alicyclic repeat unit(s) optionally containing heteroatom(s); invention polymers can be substantially undoped: and/or invention polymers can be substantially polydisperse.

Preferably the reagents to be reacted to form a polymer of the present invention, comprise a polymer precursor (normally considered as a monomer, although it could also be for example a polymerisable low molecular weight oligomer, such as a dimer or trimer) which is capable of being polymerised to form a polymer of the invention together with at least one end capping reagent.

Preferably the polymers of the invention comprise at least 3, more preferably at least 4, most preferably at least 6, repeat units of Formula 1 or Formulae 2 or 3 hereinafter.

Preferably the terminal group(s) comprise at least one group derivable from (more preferably derived from) an and capping reagent selected from: at least one; optionally substituted $C_{1-40}$carbyl-derived molecule.

Preferred polymeric material of the present invention comprises a substance represented by Formula 2:

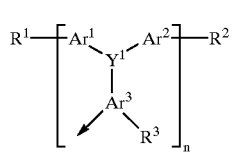

Formula 2 where $Ar^1$, $Ar^2$, $Ar^3$ and $Y^1$ represent, independently in each case, those atoms) and/or group(s) as described herein;
  n represents an integer from 3 to about 500;
  $R^1$, $R^2$ and $R^3$ represent, independently, a terminal group as described herein, $R^3$ only being present when $Ar^3$ is not attached to another repeat unit.

Preferably in Formulae 1 and/or 2, $Ar^1$, $Ar^2$ and $Ar^3$ are each independently an optimally substituted, aromatic carbyl-derived group, more preferably an optionally substituted heterocyclic and/or benzenoid ring which comprises an aromatic group, most preferably the optionally substituted aromatic group is, or forms part of, a bivalent $C_{6-40}$hydrocarbyl, and especially is selected from phenylene and naphthenyl (both optionally substituted, preferably try $C_{1-15}$alkyl).

More preferred polymeric material of the present invention comprises a substance represented by Formula 3:

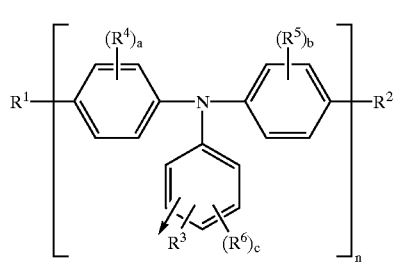

Formula 3 where $R^1$, $R^2$, $R^3$ and n represent, independently if in different repeat units, those groups or values described herein, $R^3$ only being present when the ring to which it is attached is not itself attached to another repeat unit;
  a and b represent, independently in each case, 0 or an integer from 1 to 4;
  c represents, independently in each case, 0 or an integer from 1 to d (where d is 5 minus the valence of the aromatic group), preferably 0 to 5;

n represents an integer from d to about 200; and

R⁴, R⁵ and R⁶ represent, independently in each case, optionally substituted $C_{1-15}$alkyl and/or at least one optional substituent.

As written above the substance which is represented by Formulae 2 and/or 3 will be a single polymer molecule in which the integer 'n' denotes the number of repeat units in an arbitrary one of the many chains which may comprise a bulk polymer. It will be understood that the integer 'n' in Formulae 2 and 3 could be replaced by the real number 'm' [which is an average for 'n' aver the whole polymer]In which can the substance represented by Formulae 2 and 3 would be a bulk polymer, rather than one of the molecular chains which comprise such a polymer. In such a substitution the values given for 'n' in Formulae 2 and 3 may remain unchanged for 'm', except that non-integral values would be allowed for 'm'. The differences between 'n' and 'm' herein, and preferred values thereof, are discussed more fully hereinafter.

The optional substituents on the aromatic repeat unit(s) are those listed herein. Preferably they may be selected to improve the compatibility of the CTM with the binder resins in which they may be formulated to form the CTL. Thus, the size and length of the substituents may be selected to optimise the physical entanglement or interlocation of the polymeric CTM with the binder resin. The choice of substituent also effects electronic properties and hence mobility of charge carriers.

Preferably the terminal groups (which are attached to the repeat units of Formula 1 and denoted by $R^1$, $R^2$ and, if present $R^2$, in Formulae 2 and 3) are unreactive groups, that is are substantially incapable of undergoing chain extension or cross-linking under the conditions of polymerisation. More preferably the terminal groups are independently affected from at tenet one optionally substituted $C_{1-40}$hydrocarbyl group, most preferably selected from $C_{1-30}$alkyl, $C_{8030}$aryl and $C_{7-30}$aralkyl, any of which frilly be optionally substituted. Especially preferred terminal groups comprise $C_{6-36}$aryl optionally substituted with at least one: $C_{1-4}$alkyl (itself optionally substituted by at least one halo); $C_{1-4}$alkoxy (itself optionally substituted by at least one halo); amino (itself optionally N-substituted by at least one $C_{1-4}$alkyl). In particular the terminal group may be selected from: phenyl optionally substituted with at least one methyl, 2-methylprop-2-yl, methoxy, ethoxy, trifluoromethyl and/or diethylamino.

Particular polymers of the invention may be formed from at least one specific monomer selected from:
bis(N-4-chlorophenyl)-3-methylphenylamine;
bis(N-4-chlorophenyl)-4-methylphenylamine;
bis(N-4-chlorophenyl)-2,4-dimethylphenylamine;
bis(N-4-chlorophenyl)-4-(N⁻,N⁻-diethyl) aminophenylamine;
bis(N-4-chlorophenyl)-3-trifluoromethylphenylamine;
bis (N-4-chlorophenyl)phenylamine;
bis (N-4-chlorophenyl)-2,5-dimethylphenylamine;
bis (N-4-chlorophenyl)-3-methoxyphenylamine;
bis (N-4-chlorophenyl)-4-ethoxyphenylamine;
bis (N-2-methyl-4-chlorophenyl)-2,4-dimethylphenylamine;
bis (N-4-chlorophenyl)-4-(2-methylprop-2-yl)phenylamine;
tris (N-4-chlorophenyl)amine; and/or
mixtures thereof.

Alternatively particular polymers of the invention may comprise at least one terminal group derived from at least one especially preferred and capping reagent selected from: 1-chloro-3-methylbenzene; 1-chloro-4-methylbenzene; 1-chloro-3-trifluoromethylbenzene; 1-chloro-3-methoxybenzene; 1-bromo-2,4-dimethylbenzene; (N-4-chlorophenyl)diphenyl amine; 1-bromo-4-(2-methylprop-2-yl)benzene; chlorobenzene; and/or mixtures thereof.

Specific polymeric materials of the invention may be those obtainable by the polymerisation of any combination and/or mixture of at least one especially preferred monomer (as described above) in the presence of, and/or which is substantially quenched by, at least one especially preferred end capping reagent (as described above).

There is empirical evidence in the prior art (see previously) that shows triarylamine polymers are not significantly more effective as CTMs compared to well-known small molecule triarylamines (e.g. TPD). It was believed that the mixtures of component polymer molecules of differing chain lengths in a polydisperse polymer would result in charge trapping and thus prevent rapid hole transport within a polymeric CTM.

Yet because of the control of polymerisation by end capping, the applicant has shown herein that, very surprisingly, the end capped triarylamine polymers of the present invention can exhibit significantly improved performance as CTMs in an electroreprographic device.

Without wishing to be bound by any theory it is believed that in a transport material, charge carriers (e.g. positive holes) move via a series of oxidation-reduction steps from one molecule to another (so-called "hopping charge transport"). It is thought that the highest energy electron of the molecule is delocalised over a substantial part of the molecule. Thus enlarging the size of the conjugated π system world increase the probability of electron transfer. Preferred polymers of the present invention may achieve this by substantially complete conjugation throughout the whole length of the polymer chain and/or polymer network (If the polymers are cross linked).

However polymers of the invention may also comprise oligomeric conjugated sections (e.g. of repeat unit of Formula 1) stitched together with non-conjugated sections (such as aliphatic sections, for example "W" orientated n-propyl groups) to produce polymers of the present invention which are incompletely conjugated but which have optimal merge transfer characteristics between the conjugated sections. Such polymers may be co-polymers prepared using a difunctional non-corrugated, co-polymer linking agent (such as 1,3-dichloropropane). During preparation of these co-polymers this linking agent may also act as an end capping reagent.

For efficient and rapid transport of charge, polymer molecules preferably do not contain areas where charge carriers may be localised (trapped). The nature of the end capping reagent may therefore influence the degree to which charge carriers may be trapped (if at all) on a polymer molecule. By choosing appropriate terminal groups on a polymer molecule of the present invention, charge mobility can be advantageously optimised (e.g. in electroreprography, residual image can be eliminated).

It is also believed that frontier orbital energy level(s) in the polymers of the present invention may be tuned to match them with the energy levels of other materials with which a polymer of the invention may be required to interact. Such tuning might be achieved for example by varying electron density using suitable substituents and/or by varying conjugation length by adjusting the values of 'n'. Varying the polydispersity of the polymers of the invention may also influence the range of frontier orbital (FO) energy levels and this may afford the opportunity of selecting ranges of FO energy levels to provide a staircase of energy levels between different materials. By this means the properties of polymers of the invention may be optimised to form, where desirable, an electrical bridge between particular materials with which they may be used.

The use of end capping reagents to control polymerisation allows facile preparation of polydisperse polymers which can be very effective CTMs. This has many further advantages. Polydisperse polymers are straightforward to manufacture using polymerisation techniques which are much cheaper than direct chemical synthesis of a large molecule. By comparison monodisperse, large molecules would be very difficult to produce by polymerisation methods as isolation of a component of a single chain length from the polymer mixture would be very onerous and expensive it not practically impossible. With end capping it is feasible to prepare, as effective CTMs, polydisperse polymers of long chain lengths and high molecular weight, which could not readily be made by direct synthesis. CTMs which have a wide variety of desired and/or optimised properties can thus be prepared. The properties of polydisperse polymers can also be readily modified by altering the composition of polymer precursor(s) [normally monomer(s)] used in their preparation [e.g, by using a mixture of selected monomer(s)] and/or altering the composition of polymer(s) in the resultant CTM [e.g. by using a mixture of selected polymer(s)].

The end capped poetic CTMs of the present invention have improved compatibility with the diluents (e.g. resin binders) used in the CTL. For example the polymers of the invention do not lower the $T_g$ or polymeric diluents to which they are added to the same degree as prior art small molecule CTMs. This is in direct contrast to known CTMs which are generally small molecules which tend to lower resin $T_g$ and hence durability to a greater extent. Thus optionally when electroreprographically effective amounts of a CTM of the present invention are used to make a CTL the formulation retains a high $T_g$ which gives the CTL improved durability. The speed of an electroreprographic device depends on the concentration of CTM within the CTL, whereas its lifetime is a function of its durability. Therefore devices made using a CTM of the present invention may ether have a much increased life for a given speed or be faster for a given lifetime. It is also desirable to have materials of high $T_g$ for use in electroluminescent devices.

Polymeric CTMs with branched and/or cross-linked structures may be used to further improve structural strength and durability of the CTL.

A further advantage of the polymeric CTMs of the present invention is there is a much reduced tendency for them to crystallise within the CTL. Such crystallisation would lead to CTL failure. Thus if necessary higher concentrations of these CTMs can be safely incorporated (e.g. dissolved) in a CTL without re-crystallisation problems. A higher loading of CTM allows even faster transport of charge within the CTL and hence faster electroreprographic devices.

A polymer of the invention may be substantially wholly linear in structure; or may have a degree of chain branching. In the latter case the degree of chain branching may be sufficient for the polymer to be cross-linked, the polymer is other than a substantially wholly linear polymer, i.e. if it is branched or even cross-linked, the polymer must comprise at least one aromatic repeat unit which is tri- or higher valent, (for example generally $Ar^3$ in Formula 1 is not monovalent but multivalent, e.g. bivalent) so there is a moiety capable of providing chain branching and even cross-linking the resulting polymer.

Optionally polymers of the invention have a branched polymer structure which may even form a cross-linked network of polymer chains through direct bonds to the $Ar^1$, $Ar^2$ and $Ar^3$ groups. Such branched and/or cross-linked polymers may provide improved structural strength and durability. If polymers of the present invention are branched the polymer may comprise 'side chains' attached to a main chain. There are many ways a branched polymer can be arranged, for example "star-branching". Star branching results when a polymerisation starts with a single monomer and has branches radially outward from this point. Polymers with a high degree of brunching are called dandrimers. Often in these molecules, branches themselves have branches. This tends to give the molecule an overall spherical shape in three dimensions.

Branching in the polymer chain may be introduced by addition of a tri (or higher) functional monomer, preferably a triarylamine substituted by at least three coupling groups (such any of those defined herein e.g. for $X^1$ to $X^4$ hereinafter); more preferably a triphenylamine substituted by three or more groups selected from any of chloro, bromo and/or iodo; most preferably tris(chlorophenyl)amine.

Nevertheless polymers of the invention also include those where polymer chains are substantially linear (e.g. comprise mainly di-substituted repeat units where the monomers attach via the $Ar^1$ and $Ar^2$ groups); those which are substantially branched (e.g. having a significant proportion of tri-substituted repeat units where the monomers attach via the $Ar^3$ group as well as the $Ar^1$ and $Ar^2$); those which are combined (e.g. comprise any suitable proportion of regions with linear and regions with branched repeat units within the same polymer chain); and/or any suitable mixtures of such polymer chains. The degree of blanching of a polymer of the invention may be defined by the ratio of bivalent to monovalent $Ar^3$ groups within the polymer. This ratio is preferably within the range from about 0 (linear) to about 1.0, more preferably from about 0.001 to about 0.5 of bivalent $Ar^3$ to monovalent $Ar^3$ respectively (i.e. a high number signifies more branching).

In an entirely optional aspect of the invention it may be desirable that a polymer of the invention does not consist of only linear polymers (i.e. the polymer may comprise [even in a trace amount] at least one polymer molecule which is not solely linear, such as a polymer molecule which comprises a branched region). Nevertheless preferred polymers of the invention are those which are substantially linear, including those which are wholly linear.

The polymers of the invention have s controlled polydispersity, i.e. the length distribution of the different polymer gains can be controlled. The length of each polymer chain within a polydisperse polymer mixture corresponding to an independent value of the integer 'n' herein (e.g. as denoted in Formulae 2 and 3), and these may be readily controlled by end capping the chains during polymerisation. Preferred polymer chains are those with values of n from 3 to about 500, more preferably from 4 to about 200, most preferably from 6 to about 50 and especially from 8 to about 30. A polymer of the present invention may consist substantially of polymer chains with the aforementioned 'n' values.

In the polymers of the present invention a value may be determined by known methods for the average number of repeat units per chain over the whole bulk polymer. This average value is denoted herein by the real number 'm' which, as an average and/or calculated value, need not be an integer. It will be understood that 'm' is distinct from the specific value for a particular polymer chain denoted by the integer 'n' herein (e.g. in Formulae 2 and 3), Preferred polymers exhibit an 'm' value of from about 3 to about 200, more preferably from about 4 to about 100, most preferably from about 4 to about 50. It is advantageous that 'm' is from about 6 to about 40, more advantageously from about 6 to about 20, for example from about 8 to about 14. Preferably the polymers of the invention comprise a mixture of polymer chains with a substantially Gaussian distribution of chain lengths, although other distributions are also possible [such as non-symmetrical (e.g. skewed) and multi-modal (e.g. bimodal) distributions].

The process developed by the applicant for polymerising the polymer precursor(s) in the presence of an end capping reagent (i.e. a chain terminator) produces the end coped polymers of the invention, and enables one to more ready control the polydispersity of the resultant polymer. Preferably the polymers of the invention have a polydispersity ($M_w/M_n$) from about 1.1 to about 5.0. More preferably from about 1.1 to about 3.0 (where $M_w$ denotes weight average molecular weight and $M_n$ denotes number average molecular weight). Polydispersity may be measured by any convenient method (such as gel permeation chromatography—GPC).

Preferably the polymer of the invention has an $M_n$ value of from about 700 daltons to about 120,000 daltons more preferably from about 700 to about 50,000 daltons; most preferably from about 1000 daltons to about 40,000 daltons. Advantageously invention polymers have an $M_n$ of from about 1,100 to about 15,000 daltons, more advantageously from about 1,500 daltons to about 12,000 daltons, in particular from about 1,800 daltons to about 8,000 daltons. The preferred method for measuring and/or determining $M_n$ values herein is from gel permeation chromatography ("GPC") using a mufti angle laser light scattering (MALLS) detector and/or a refractive indent (RI) detector.

Polymers that comprise substantially one type of monomer in the chain are called 'horrhopolymers' whereas polymers which incorporate more than one kind of monomer into their chain are called 'copolymers'. Copolymers may comprise the random, block or graft type. A random copolymer contains chains which have a random arrangement of the multiple monomers. A block copolymer contains chains with blocks of monomers of the same type. A graft copolymer contains chains which have a backbone comprising one type of monomer with pendant branches made up of at least one type of monomer. Polymers may also form bonds between neighbouring chains. These bonds can be formed directly between the neighbouring chains, or two chains may bond to a third common molecule. Preferred polymers of the invention comprise all polymeric forms that are electroreprographically effective.

Preferably the polymers are substantially free of repeat units other than those of the formulae given herein, and a given polymer of the invention preferably has only one repeat unit. Where a polymer has only one repeat unit it is likely to be a homopolymer, although in principle it is possible to employ a polymer precursor made from two or more different monomers so that a polymer derived from that precursor alone would have only one repeat unit yet be a copolymer. If a polymer of the invention has more than one repeat units (i.e. two or more repeat unit; which are different from each other) it is likely to be a copolymer.

The polymers of the invention may be electroreprographically effective without being doped with species such as halogen radicals or halide ions. Thus preferably the polymers of the invention may be 95% free (by weight) of such impurities. Apart from halo species, other dopants in the polymer which readily form spades (such as anlons) which can trap positive holes may in fact reduce ability of the polymer to transport positive charge from the CGL. Thus it is preferred, although not essential, that the polymers of the invention are substantially free of impurities.

The polymers of the present invention may be coloured or substantially colourless.

When in the formulae herein there is a list of labels (e.g. $Ar^1$ and $Ar^2$) or indices (e.g. 'n') which are said to represent a list of labels or numerical values, and these are said to be "independent in each case" this indicates each label and/or index can represent any of than groups listed, independently from each other, independently within each repeat unit. Independently within each Formula and/or independently on each group which is substituted; as appropriate. Thus in each of these instances many different groups might be represented by a single label (e.g. $Ar^1$).

The terms 'optional subslituent' and/or 'optionally subsbtuted' as used herein (unless followed by a list of other substituents) signifies at least one of the following groups (or substitution by these groups): sulfo, formyl, amino, imino, nitrilo, mercapto, cyano, nitro, halo, $C_{1-4}$alkyl. $C_{1-4}$alkoxy, hydroxy and/or combinations thereof. These optional groups may comprise all chemically possible combinations in the same group and/or a plurality (preferably two) of the aforementioned groups (e.g. amino and sulfonyl if directly attached to each other represent a sulfamoyl radical). Preferred optional substituents comprise: any of $C_{1-4}$alkyl, methoxy and/or ethoxy (any of these optionally substituted by at least one halo); and/or amino (optionally substituted by at least one methyl and/or ethyl); and/or halo.

The term 'carbyl-derived' as used herein denotes any monovalent or multivalent organic radical moiety which comprises at least one carbon atom either without any non-carbon atoms (e.g. —C≡C—), or optionally combined with et least one other non-carbon atom (e.g. alkyl, carbonyl etc.). The non-carbon atom(s) may comprise any elements other than carbon (including any chemically possible mixtures or combinations thereof) that together with carbon can comprise an organic radical moiety. Preferably the non-carbon atom is selected from at least one hydrogen and/or heteroatom, more preferably from at least one; hydrogen, phosphorus, halo, nitrogen, oxygen and/or sulfur, most preferably from at least one hydrogen, nitrogen, oxygen and/or sulfur. Carbyl-derived groups include all chemically possible combinations in the same group of a plurality (preferably two) of the aforementioned carbon and/or non-carbon atom containing moieties (e.g. alkoxy and carbonyl if directly attached to each other represent an alkoxycarbonyl radical).

The term 'hydrocarbyl' as used herein (which is encompassed by the term 'carbyl-derived') denotes any radial moiety which consists only of at least one hydrogen atom and at least one carbon atom. A hydrocarbyl group may however be optionally substituted.

Preferably 'carbyl-derived' moieties comprise at least one of the following carbon containing moieties: alkyl, alkoxy, alkanoyl, carboxy, carbonyl, formyl and/or combinations thereof; optionally in combination with at least one of the following heteroatom containing moieties: oxy, thio, sulfinyl, sulfonyl, amino, imino, nitrilo and/or combinations thereof.

More preferred carbyl-derived groups comprise at least one: alkyl and/or alkoxy (optionally substituted with at least one halo).

The term 'alkyl' or its equivalent (e.g. 'alk') as used herein may be readily replaced, where appropriate, by terms denoting a different degree of saturation and/or valence e.g. moieties that comprise double bonds, triple bonds, and/or aromatic moieties (e.g. alkenyl, alkynyl and/or aryl) as well as multivalent species attached to two or more substituents (such as alkylene).

The term 'halo' as used herein signifies fluoro, chloro, bromo and iodo.

Any radical group or moiety mentioned herein (e.g. as a substituent) refers to a monovalent radical unless otherwise stated or the context clearly indicates otherwise (e.g. an alkylene moiety is bivalent and links two other moieties). Unless the context clearly indicates otherwise, a group herein which comprises a chain of three or more atoms signifies a group in which the chain wholly or in part may be linear, branched and/or form a ring (including spiro and/or fused rings). The total number of certain atoms is specified for certain substituents for example $C_{1-\alpha}$-hydrocarbyl, signifies a hydrocarbyl moiety comprising from 1 to $\alpha$ carbon atoms. In any of the formulae herein if at least one ring substituents are not indicated as attached to any particular atom on the ring, the substituent may replace any H attached to an atom in the ring and may be located at any available position on the ring which is chemically possible.

In an optional proviso, the carbyl-derived groups and/or the optional substituents herein may comprise and/or be other than: hydroxy, glycidyl ether, acrylate ester, methacrylate ester, ethenyl, ethynyl, vinylbenzoxyl, maleimide, nadimide, trifluorovinyl ether, cyclobutene or a group forming part of a cyclobutene group, and trialkylsiloxy.

Unless the context clearly indicates otherwise, as used herein plural forms of the terms herein are to be construed as including the singular form and vice versa.

The term 'electroreprographically effective' (for example with reference to the polymers of the present invention) will be understood to comprise those ingredients which if used in electroreprography in the correct manner provide the required properties to the composition and/or device necessary to generate a charge on exposure to incident radiation, transport said charge and/or to form an image therefrom; and which are compatible with the diluent(s) used to formulate electroreprographic compositions. Preferred 'electroreprographically effective' materials (especially for CTMs) are those which are capable of supporting the injection of photo-generated charge (e.g. positive holes) from a CGM and/or CGL and/or are capable of allowing the transport of charge (e.g. positive holes) through the CTM and/or CTL. 'Electroreprographically inert' refers to a material which would not be 'electroreprographically effective' as defined herein and/or would not substantially adversely effect electroreprographic performance.

Where the context indicates, the term "electroreprographically effective" may be replaced by another term such as "effective for use" as it will be understood that polymers of the invention may also be of use in fields other than electroreprography, such as any of those mentioned herein.

It is believed that the polymers of the invention are highly electroreprographically effective, exhibiting excellent properties as CTMs. However should any of the polymers claimed herein should be found not to be electroreprographically effective they still form part of the present invention. Such polymers would have utility as intermediates in the preparation of more electroreprographically effective polymers, as tools to investigate the mode of action of the polymeric CTMs of the invention, and/or in the other non electroreprographic uses described herein.

Certain polymers of the invention and/or moieties therein (such as repeat units), may exist in many different forms for example at least one form from the following non-exhaustive list: isomers, stereoisomers, enantiomers, diastereoisomers, geometric isomers, tautomers, conformers, forms with regio-isomeric substitution, isotopically substituted forms, polymeric configurations, tactic forms, interstitial forms, complexes, chelates, ciathrates, interstitial compounds, non-stoichiometric complexes, stoichiometric complexes, ligand complexes, organometallic complexes, solvates and/or mixtures thereof. The present invention preferably comprises all such forms of the polymers of the invention, moieties therein, any compatible mixtures thereof and/or any combinations thereof, preferably those which are electroreprographically effective.

At least one polymer of the present invention has utility as charge transfer material (CTM) for use in electroreprography and/or electroluminescence (EL). For example the combination of the CTM polymers of the present invention with an EL material (such as an LEP), whether in multi-layer or admixture, can improve EL efficiency as the energy levels of the polymeric CTM can be tuned (e.g. as described herein) to best match the other materials in the electrical current chain. However, a preferred use of the polymers of the present invention is in electroreprography.

Therefore in a further aspect of the invention there is provided a composition suitable for use as a charge transport material (CTM), optionally for use in an electroreprographic device, the CTM comprising (optionally in a substantially pure form) at least one polymeric material of the present invention as described herein; optionally together with a substantially electroreprographically-inert diluent. Preferably the diluent comprises polymer(s) other than those of the present invention.

It will be appreciated that compositions comprising polymers of the invention may be formulated differently for according to the end use, with different amounts of polymer and/or different additional ingredients. For example for use with OLEMs a preferred composition may provide a film which comprises mostly (preferably at least about 50%, more preferably at least about 80%) the polymers of the invention. Such a film may most preferably comprise substantially 100% polymer of the invention. On the other hand electroreprographic formulations may comprise less than these amounts of polymers of the invention and are preferably formulated as described below.

Polymers of the present invention may be used in combination with any diluent (which preferably comprises at least one resin binder), CGM, other CTM and/or any other ingredient conventionally used in electroreprography to formulate an electroreprographically effective composition (e.g. a CTL and/or CGL). Optionally the composition may be formulated for use in a single layer electroreprographic device (where the CTM and CGM are in the same layer). However formulations optimised for dual and multi layer devices are preferred (i.e. where there is at least one CTL and at least one separate CGL). Preferred electroreprographic compositions are those which can be used to form the or a CTL on a substrate in a suitable part of the electroreprographic device (e.g. on top of the CGL on a photoreceptor drum) and/or which may form the CTL directly. The CTL may be formed by any suitable method (e.g. spin coating, vapour phase deposition and/or immersion of the substrate in a liquid composition).

Compositions which are used to prepare a CTL may additionally comprise a solvent so they can be applied to the substrate (e.g. the CGL) as a liquid, the CTL being formed by evaporation of solvent. Suitable solvents may be any solvent commonly used in photoreceptor manufacturing, preferably selected from at least one of: toluene, tetrahydrofuran (THF), ethyl acetate, chlorobenzene, dichloromethane, dichloroethane, n-butyl acetate and/or mixtures thereof.

Liquid compositions used to prepare a CTL of the invention may comprise the solvent in an amount from about to from about 50% to about 99%, more preferably from about 60% to about 95%, most preferably from about 70% to about 90% based on the mass of the total liquid composition. The remainder of the liquid composition may comprise those ingredients described below for the CTL in the relative proportions described therein.

The diluent may comprise any substantially electroreprographically inert material, preferably a binder resin, more preferably a resin which is a good electrical insulator. The binder resin is preferably selected from at least one: polyamide, polyurethane, polyether, polyester, epoxy resin, polyketone, polycarbonate [e.g. poly(4,4'-isopropylidine-diphenylene carbonate (such as those available commercially from: GEC under the trade name Lexan, from Bayer under the trade name Makrolon and/or from Mobay Chem. Co. under the trade name Merion). PCA, PCZ and/or co-polymers of polycarbonates [e.g. those copolycarbonates described in JP-A-07(95)-271061 and 271062 (both Fuji-Xerox)}], polysulfone, vinyl polymer (for example polyvinylketone and/or polyvinylbutyral [e.g. PVB]), polystyrene, polyacrylamide, copolymers thereof (such as aromatic copolymeric polycarbonate polyesters [e.g. those available commercially from Bayer under the trade name APEC]) and/or mixtures thereof. Preferred binder polymers are those having molecular weights ($M_n$) from about 20,000 to about 120,000 daltons, more preferably from about 50,000 to about 100,000 daltons.

PCA denotes bis-phenol-A polycarbonate resin.

PCZ denotes poly(4,4'-cyclohexylidenediphenylene carbonate) resins comprising a repeat unit of formula:

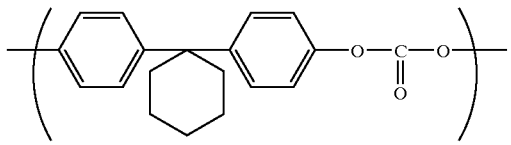

PCZ is available commercially (directly or indirectly) from Tejin for example under the trade name Panalite.

The diluent may optionally further comprise at least one plasticiser, which is preferably selected from at least one: halogenated paraffin, polybiphenyl chloride, dimethylnaphthalene, dibutyl phthalate and mixtures thereof.

The diluent may be selected for its hardness and durability. However polymers of the invention with a suitable high value for average molecular weight may also be sufficiently durable to be used without a diluent. For example polymers of the invention that may be used without a diluent, may be those polymers with a $T_g$ comparable to those of conventional resin binders which are used as substrates for CTLs (e.g. polycarbonate and/or polyester resins). Alternatively a CTL composition may comprise a mixture of polymers of the invention with diluent resins, and it is advantageous if the mixture has a $T_g$ comparable to conventional resin substrates used to make CTLs. Preferably a CTL composition of the invention has a $T_g$ which is within about 50° C. of the $T_g$ of that composition when substantially free of CTM (and which may correspond to the $T_g$ of its component diluent resin(s) when substantially pure). Such compositions can be particularly durable when used in an electroreprographic device. The $T_g$ is measured by the known method of differential scanning calorimetry (DSC).

The CGMs which may be used in conjugation with the CTMs of the present invention may be any known in the art, as well as any new CGMs which may be discovered in the future and which would be readily apparent to those skilled in the art to be suitable for use with the polymeric CTMs of the present invention.

Thus, for example, suitable CGMs may comprise an inorganic photoconductor (which may be crystalline or a glass), an organic photoconductor and/or an charge transfer complex.

Preferably the CGM may be selected from at least one of the following materials: inorganic photoconductive substances such as: inorganic crystalline materials (for example compounds such as zinc oxide, zinc sulfide, cadmium sulfoselenide, cadmium selenide, cadmium sulfide and mixtures thereof, materials such as trigonal selenium, and mixtures of any of these compounds and materials); inorganic glasses (for example amorphous selenium, vitreous selenium, and/or selenium alloys [e.g. Se/Te, Se/Te/As, Se/As and/or mixtures thereof]);

substituted and unsubstituted metallo- or metal-free phtalocyanine [Pc] compounds (for example, metal free phthalocyanines [such as $H_2Pc$], metal phthalocyanines, [such as Cu, Ni, Mg, Zn or Co Pc], titanyl phthalocyanine [TiOPc], vanadyl phthalocyanine [VOPc], and/or other phthalocyanines [e.g. InClPc, AlClPc, AlClPcCl, t-$Bu_{1.4}$VOPc and/or GaOHPc]); naphthalocyanines;

aquarylium compounds (e.g. squaraines and/or squariliums);

azuleniums;

azo compounds (e.g. azo pigments);

perylene compounds (e.g. perylene pigments, perylene tetracarboxydilmide and/or bis-imidazole perylene [BZP]);

indigo compounds (e.g. indigo pigments);

quinacridones;

polycyclic quinones (for example polynuclear aromatic quinones such as anthraquines and/or anthanthrones [e.g. dibromo anthanthrone known herein as "DBA"])

cyanine compounds (e.g. cyanine dyes);

xanthene compounds (e.g. xanthene dyes);

thiapyryliums (for example their salts);

diamino triazines (for example substituted 2,4 diamino triazines);

triphenodioxazines;

3,6-diphenylpyrrolo[3,4-c]pyrrole-1,4-dithione charge transfer complexes comprising an electron donor, e.g. poly-N-vinylcarbazole and an acceptor e.g. trinitrofluorenone;

eutectic complexes formed by pyrylium salts (e.g. dyes) and polycarbonate resins; and/or any mixtures thereof.

More preferably the CGM comprises phthalocyanines (for example metal free phthalocyanine, $H_2Pc$, TlOPc, GaOHPc and/or VOPc); perylenes (e.g. BZP) and/or polycyclic quinones (e.g. DBA).

Most preferably the CGM comprises metal-free Pc and/or TiOPc in any electroreprographically effective, polymorphic form which is now known or is discovered in the future. Known polymorphs of metal free Pc include the X form (XPc) and the tau form (τPc). Known TiOPc polymorphs include those denoted as types I (≡β), II (≡α), III (≡m), IV (≡Y or γ), X, Z and Za [e.g. as described in U.S. Pat. No. 5,189,156 (Xerox) and GB 2322866-A (Zeneca)]. Particularly preferred CGMs are selected from at least one: TiOPc (I), TiOPc(Za) and TiOPc(IV) polymorph.

Preferably the optional other CTM(s) in a composition of the invention may be selected from at least one of the following materials capable of transporting charge (which are preferably non-polymeric): triarylamine; hydrazone; triphenylmethane, oxazole, oxadiazole; styrilic; stilbene, butadiene and/or any combinations thereof (including combinations of these functional moieties in the same molecule) and/or mixtures thereof.

More preferably additional CTMs may comprise tetrakis (N,N-aryl)biaryldiamines, most preferably bis(N,N'-[substituted]phenyl)bis(N,N'-phenyl)-1,1-biphenyl-4,4'-diamines, especially the 4-methyl, 2,4-dimethyl and/or 3-methyl derivatives thereof.

Preferred electroreprographic compositions of the invention, which may be used to prepare a CTL in an electroreprographic device and/or which may form such a CTL, comprise from about 8% to about 100%, more preferably from about 10% to about 75%, most preferably from about 15% to about 50% of polymer(s) of the present invention and from about 0% to about 92% more preferably from about 25% to about 90%, most preferably from about 50% to about 85% of electroreprographically inert diluent(s) (such as those described herein). All percentages are by mass of ingredient to the total mass of the composition.

Suitable photo-conductors with a CTM of the invention may be formed from a single OPC layer or from a plurality of CTL(s), CGL(s) and other layer(s) and can be fabricated as known to persons skilled in the art [for example as described in GB 1577237 (Xerox), especially FIGS. 1 to 4 therein]. The thickness of a CTL of the invention (including a single layer which combines the function of both a CTL and a CGL) may be from about 0.01 μm to about 50 μm, preferably from about 0.2 μm to about 30 μm. The thickness of a (separate) CGL which may be used in conjugation with a CTL of the present invention, may be from 0.01 μm to about 20 μm, preferably from about 0.05 μm to about 5 μm.

Other conventional aspects of OPC devices and compositions, including other binder(s), CGM(s), non-invention CTM(s), arrangements and/or optimal thicknesses of CTL(s) and/or CGL(s), may readily be included in and/or used with the CTMs and compositions of the present invention. Such details are known to persons skilled in the art of electroreprography and are disclosed in: "Chemistry and Technology of Printing and Imaging Systems" published by Blackie Academic & Professional (1996), edited by P. Gregory, (see especially Chapter 4, "Electrophotography"); and the review paper "Organic Photoconductive Materials Recent Trends and Developments" by K. Y. Law, Chem. Rev., 1993, Vol. 83, pages 449–86. The disclosures of both these documents are incorporated herein by reference. It will be appreciated that future developments in these areas (such as future OPC chemicals or device construction) could also be used in conjunction with the polymers of the present invention.

In a still further aspect of the present invention there is provided a method for making a composition of the present invention, by mixing at least one polymer of the present invention with at least one (optionally substantially electroreprographically inert) diluent.

The method may further comprise making a charge transport layer (CTL) by coating onto a substrate a composition and/or at least one polymer of the present invention.

The polymers of the present invention may be prepared from at least one suitable polymer precursor which may comprise any suitable (co)monomer(s), (co)polymer(s) [including homopolymer(s)], (co)oligomers [including homo-oligomers(s)], and mixtures thereof which comprise aromatic moieties which are capable of forming a bond with the or each polymer precursor(s) to provide chain extension and optional cross-linking with another of the or each polymer precursor(s) via direct bond(s) as indicated in the Formulae herein. The polymer precursor(s) may be substantially unreactive at normal temperatures and pressures. Polymerisation may be initiated by any suitable means which are well known to those skilled in the art for example: chemical initiation by adding suitable agents; catalysis; photochemical initiation using an initiator followed by irradiation at a suitable wavelength; and/or thermal initiation. After a suitable period an end capping reagent is added (preferably in excess) to quench polymerisation.

Therefore in another aspect of the present invention there is provided a process for making an optionally electroreprographically effective end capped polymeric material; the process comprising the steps of:
a) performing polymerisation of at least one polymer precursor (preferably at least one monomer) of Formula 4:

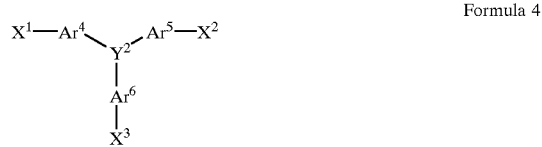

Formula 4 in which:
Y$^2$ independently represents, N, P, S, As and/or Se, preferably N;
Ar$^4$, Ar$^5$, and Ar$^6$ which may be the same or different, each independently represent at least one mononuclear or polynuclear aromatic group optionally substituted by a substituent which does not react with other groups on the polymer precursor(s) under the conditions of polymerisation;
X$^1$, and X$^2$ which may be the same or different, each independently represent a leaving group which, under the conditions of polymerisation, permits coupling between the aromatic groups to which they are attached and an aromatic group not linked thereto, directly via a bond [this provides chain extension and optional cross-linking, optionally with another of the or each polymer precursor(s)]; and
X$^3$ independently represents H, another group inert to coupling or a leaving group which, under the conditions of polymerisation, permits coupling between the aromatic group to which it is attached and an aromatic group not linked thereto, directly via a bond [this provides chain extension and optional cross-linking, optionally with another of the or each polymer precursor(s)]; and then:
b) adding an end capping reagent of Formula 5 in an amount sufficient to reduce substantially polymerisation (optionally the end capping reagent is added in excess), and where in Formula 5:

Formula 5

T represents H and/or a carbyl-derived radical, preferably H, C$_{1-40}$hydrocarbyl and/or C$_{5-40}$aryl, optionally substituted by at least one substituent which does not react with other groups on the polymer precursor(s) under the conditions of polymerisation; and
X$^4$ represents at least one group in the compound of Formula 5 which, under the conditions of polymerisation, permits coupling between T and an aromatic group on the growing polymer directly via a bond, so as to end cap the chain and provide chain termination.

If X$^3$ is H, or another group inert to coupling, then a linear polymer is formed. If X$^3$ is a leaving group then a branched and/or cross-linked polymer is formed.

Preferably polymerisation (step 'a') may be further controlled if carried out and/or started in the presence of a certain amount of the end capping reagent (chain terminator) of Formula 5, such that the reaction proceeds to the desired degree of polymerisation. It will be understood that the ratio of end capping reagent to polymer precursor will control the average degree of polymerisation. Preferably, if present, the respective mass ratio of polymer precursor to end capping reagent in step 'a' is less than about 5; most preferably from about 0.001 to about 3; more preferably from about 0.01 to about 2 (see also the Examples herein).

The time interval between initiating polymerisation in step 'a' and quenching polymerisation in step 'b' depends on the particular reagents used but may usefully be from about 30 minutes to about 100 hours, preferably from about 1 to about 25 hours more preferably from about 2 to about 10 hours (see also the Examples herein). The end capping reagent may be present during initiation of polymerisation and/or added in one or more suitable aliquots during polymerisation before the final quenching in step 'b'. For example the end capping reagent can be added in third, quarter or half fractional amounts of the total to be added at suitable (e.g. hourly) intervals starting from (e.g.) about 1 to about 5 hours after initiation of step 'a' (see also the Examples herein).

Preferably the respective mass ratio of the initial amount of polymer precursor polymerised in step 'a' to the end capping reagent added to quench polymerisation in step 'b' is an excess, more preferably within the polymer precursor/end capping reagent ratios given previously (see also the Examples herein).

Preferably $Ar^4$, $Ar^5$, and $Ar^6$ which (as shown) represent bivalent radicals may independently comprise the bivalent equivalent of the groups listed herein for the monovalent radicals $Ar^1$, $Ar^2$ and $Ar^3$ respectively in Formulae 1, and/or 2 herein, while $Ar^6$—$X^3$ may also represent the monovalent equivalent as set out herein for the monovalent radical $Ar^3$ in Formulae 1 and/or 2 herein.

Similarly T may comprise the monovalent equivalent of the bivalent radicals listed herein as Terminal Substituents and/or as $R^1$ and $R^2$ in Formulae 1, 2 and 3 herein.

A yet further aspect of the present invention is any polymer obtainable by the above process including all the electroreprographically effective different forms of such polymers and/or moieties therein.

It is understood if it is desired to make a polymer which is not linear, i.e. branched or even cross-linked, the polymer will comprise at least one aromatic/repeat unit which is trivalent, i.e. in the polymer precursor of Formula 4, $X^3$ represents a group capable under the conditions of polymerisation of forming a bond in a coupling with another aromatic group to which it is not attached.

Preferably the polymerisation is carried out in the presence of a catalyst, more preferably the catalyst comprises nickel.

Preferably the chain terminator of Formula 5 is present in an amount of from about 1% to about 50%, more preferably from about 10% to about 20% w/w of the total amount of the at least one polymer precursor of Formula 6.

Preferably $X^1$, $X^2$, $X^3$ and $X^4$ are independently selected from at least one halo, more preferably fluoro, chloro and iodo, most preferably chloro. It is positively preferred that if at least one of $X^1$ to $X^4$ is bromo then at least one of $X^1$ to $X^4$ is a halo other than bromo.

The degree of polymerisation of polymers of the present invention can be controlled by the molar ratio of the polymer precursor(s) of Formula 4 to the chain terminator of Formula 5.

Preferably at least one polymer precursor of Formula 4 comprises at least one compound of Formula 6:

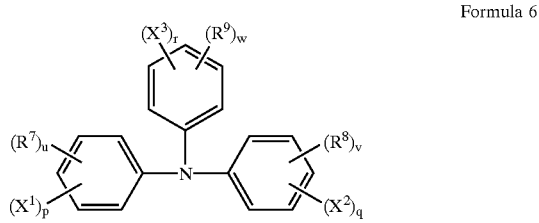

Formula 6 where $R^7$, $R^8$ and $R^9$, independently in each case, comprise at least one group selected from H, optional substituents and optionally substituted $C_{1-40}$carbyl-derived groups, and $R^7$, $R^8$ and $R^9$ are incapable of reacting with other groups on the polymer precursor(s) under the conditions of polymerisation;

$X^1$ to $X^2$ independently comprise a suitable leaving group;

p, q and r independently represent 0 or 1, except at least two of them must be 1;

u, v and w independently represent 0 or an integer from 1 to 5, except at least two of them must be other than 5; and (p+u); (q+v); and (r+w) are all from 0 to 5 or less; except at least three of them must be other than 0.

Preferably in Formula 6:

$R^7$ to $R^9$ comprise, independently in each case, at least one $C_{1-15}$carbyl-derived group; and $X^1$ to $X^3$ comprise, independently in each case: fluoro, chloro, bromo, iodo, optionally substituted arylsulfonyl, optionally substituted $C_{1-8}$alkylsulfonyl and/or diazonium salt.

More preferably $R^7$ to $R^9$ may be, independently in each case: amino (optionally substituted by at least one $C_{1-4}$alkyl); $C_{1-4}$alkyl (optionally substituted by at least one halo) and/or $C_{1-4}$alkoxy (optionally substituted by at least one halo);

More preferably $X^1$ to $X^3$ comprise, independently in each case: fluoro, chloro, bromo, iodo, optionally substituted phenylsulfonyl, optionally substituted $C_{1-4}$alkylsulfonyl and/or diazonium salt (preferred optional substituents being at least one methyl, bromo, fluoro and/or nitro).

Most preferably $X^1$ to $X^3$ may be, independently in each case: chloro; bromo; 4-methylphenylsulfonyl; 4-bromophenylsulfonyl; 4-nitrophenylsulfonyl; methylsulfonyl; trifluoromethylsulfonyl; 2,2,2-trifluoroethylsulfonyl; 4-fluorophenylsulfonyl; 2-trifluoromethyl-1,1,1,3,3,3-hexafluoroprop-2-ylsulfonyl; and/or diazonium salt.

More preferred monomers of Formula 6 are those in which: p and q are both 1; r is 0 and/or 1; u, v and/or w are independently 0, 1 and/or 2; $X^1$, $X^2$ and $X^3$ are Cl; $R^7$ and $R^8$ are both methyl; and $R^9$ is independently selected from methyl; 2-methyl-prop-2yl, methoxy, ethoxy, trifluoromethyl and diethylamino.

Specific monomers that may be used in the above process are those listed previously and/or those which are used to prepare the Examples herein.

Preferably the end capping reagent of Formula 5 comprises at least one compound of Formula 7:

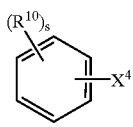
Formula 7 in which,
R¹⁰ comprises, independently in each case, H, optionally substituted $C_{1-40}$ carbyl-derived groups or at least one other optional substituent, and R¹⁰ is incapable of reacting with other groups on the polymer precursor(s) and/or growing polymer chain under the conditions of polymerisation;
a represents 0 or an integer from 1 to 5; and
X⁴ comprises a suitable leaving group.

Preferably R¹⁰ comprises any of those groups specified for R⁷, R⁸ and/or R⁹ previously.

Preferably X⁴ comprises any of those groups specified for X¹, X² and/or X³ previously.

Preferably at least one of the polymers and/or CTMs of the present invention (which may be obtainable by the process of the invention) comprises an end capped polymer of Formula 8:

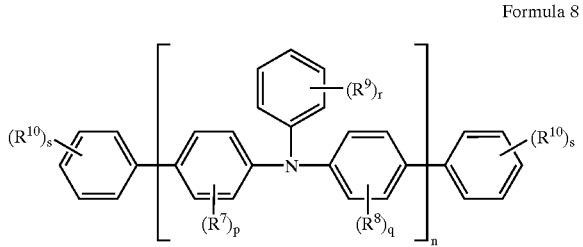
Formula 8 where
R⁷ to R¹⁰ and n, p, q, r and s represent, independently in each case, those groups and values given herein.

While Formula 8 as written above shows a linear polymer, which is preferred, an option within the scope of the present invention is for at least one aromatic ring to which R⁹ is attached not to be monovalent (as shown in Formula 8) but bivalent so that at least one polymer of Formula 8 is other than a linear polymer, i.e. is branched and/or cross-linked.

A yet still further aspect of the present invention provides an electroreprographic device, photo-conductive member for said device; component for said device and/or consumable for use with said device, which comprises at least one polymer and/or CTM composition of the present invention as described herein. The device may be selected from at least one: photocopier, printer, optionally laser printer, fax machine, scanner and multipurpose devices for copying, faxing and/or scanning. The photo-conductive member may be selected from a photosensitive drum and/or a photosensitive belt.

The electroreprographic device, photo-sensitive member, component, and/or consumable may be prepared by a method, comprising the steps of forming a charging generating layer (CGL) on a substrate; and then forming on the CGL a charge transport layer (CTL) comprising a composition and/or at least one polymer of the present invention.

Another aspect of the invention provides use of at least one polymer and/or CTM of the present invention in the operation and/or manufacture of a electroreprographic device, component for said device and/or consumable for use with said device, preferably for the purpose of transporting charge.

Polymers of the present invention may exhibit markedly improved electrical and/or mechanical performance as CTMs compared to the prior art CTMs.

Therefore a yet further aspect of the invention comprises using at least one polymer of the present invention in an electroreprographic composition, photosensitive member and/or electroreprographic device for the purpose of improving electroreprographic performance. Electroreprographic performance may be measured in many ways, for example by decay exposure, time of flight (TOF) and/or residual voltage, and can be compared to a similar electroreprographic composition, photosensitive member or electroreprographic device in which the end capped polymeric CTM of the invention is replaced by an substantially identical amount (in % w/w) of a known CTM (e.g. a well known small molecule triarylamine such as TPO).

The invention is illustrated by the accompanying figures as follows.

FIG. 1 is a photo-induced decay curve (PIDC) typical of CTLs made with polymeric CTMs of the invention (25% w/w CTM in PCZ). It is a photo of residual potential ($V_r$) in volts versus exposure in $\mu Jcm^{-2}$. The procedure used to generate this Figure is described in Test Method 1 (see 1.4) and Experiment 7e herein.

Figure 2:
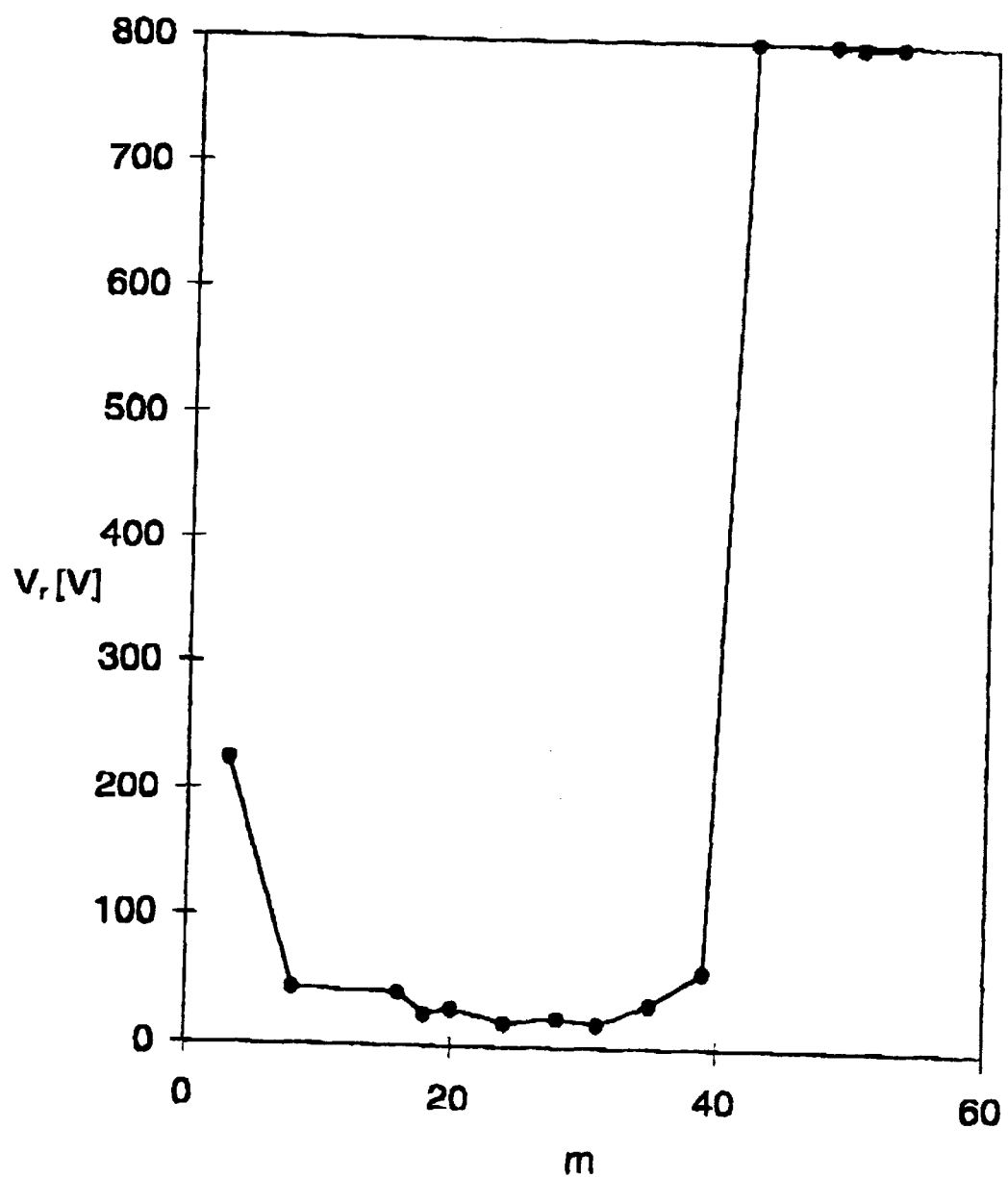

FIG. 2 is a plot of V, versus the average number of repeat units (m) of the polymeric CTMs tested. The procedure used to generate this Figure is described in Test Method 1 and Experiment 5 herein.

Figure 3:
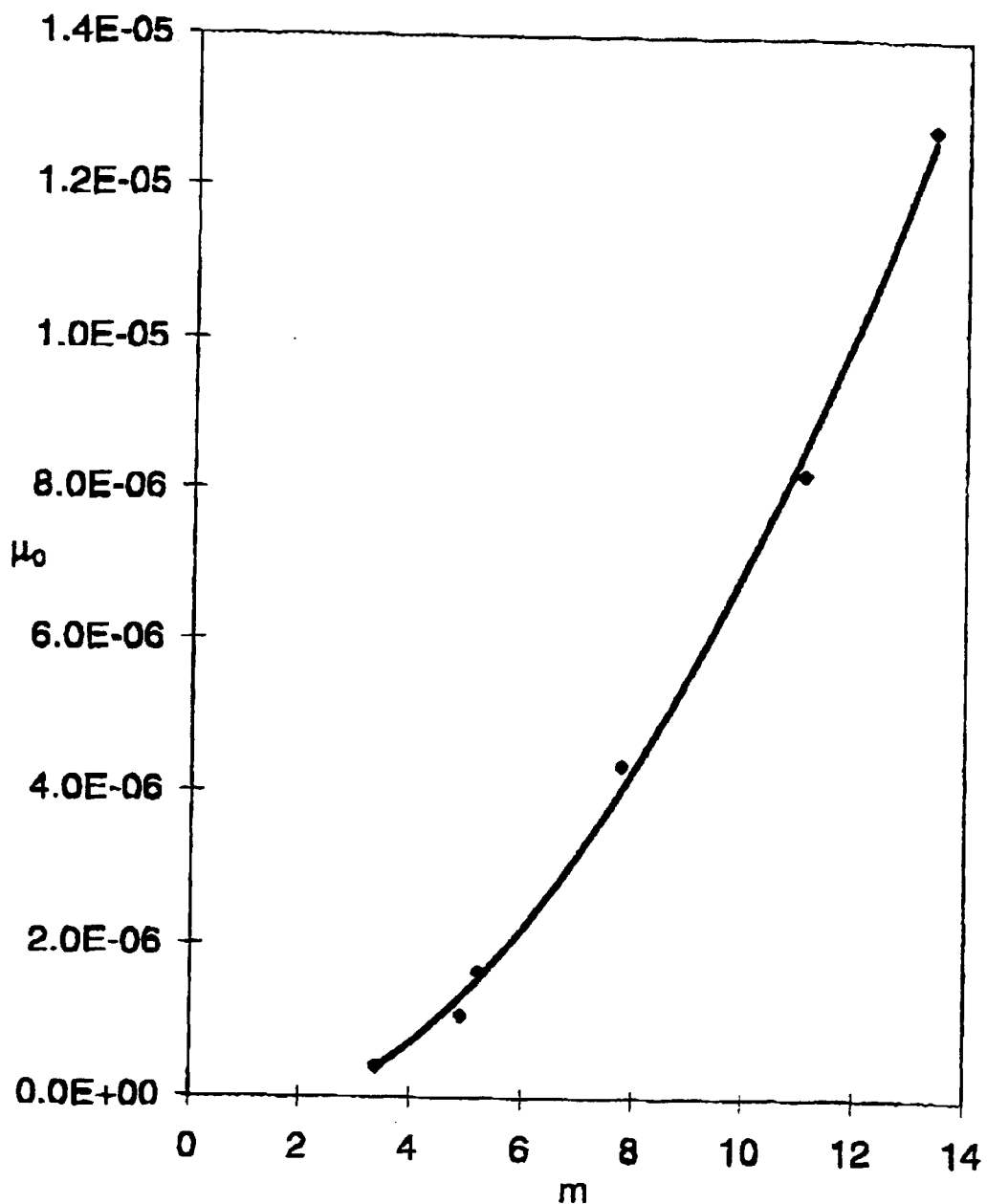

FIG. 3 is a plot of zero field mobility ($\mu_0$) in $cm^2V^{-1}S^{-1}$ versus m (i.e. CTM polymer size). The procedure used to generate this Figure is described in Test Method 2 and Experiment 6 herein.

Figure 4:
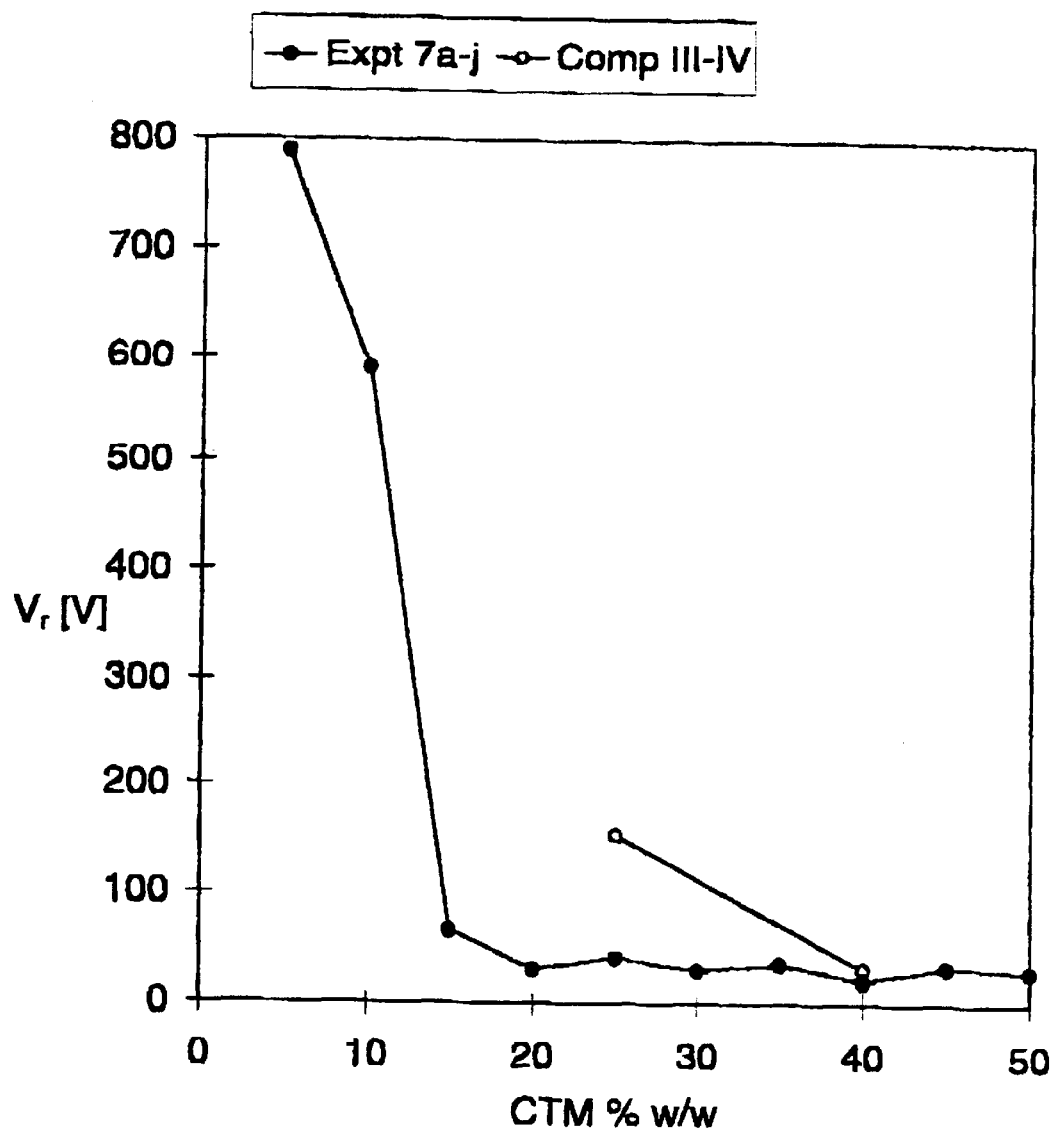

FIG. 4 is a plot of $V_r$ versus the concentration of CTM is the CTL. A comparison is made between the curve for a polymeric CTM of the invention and TPD. The procedure used to generate this Figure is described in Test Method 1 and Experiment 7 herein.

FIG. 5 is a plot of weight loss (in g) versus number of abrasion cycles for various CTLs comprising polymeric CTMs of the invention and (as a comparison) TPD. The procedure used to generate this Figure is described in Experiment 9 herein.

The invention is further illustrated by the following Examples and Experiments. For convenience the Examples have been arranged as follows:

Examples 1 to 11 show polymers of the invention with different repeat units;

Examples 12 to 18 show polymers of the invention with different terminal groups;

Examples 19 to 24 show polymers of the invention with different degrees of chain branching; and Examples 25 to 32 show polymers of the invention with different molecular weights.

The experimental section after these preparative Examples provides data to illustrate the advantageous electroreprographic properties of CTLs of the invention (which comprise one or more polymeric CTMs of the invention). For convenience the Experiments have been arranged as follows:

Experiment 1 shows electrical properties of CTLs of the invention as a function of different repeat units in the polymeric CTM;

Experiment 2 shows electrical properties of CTLs of the invention as a function of different terminal groups on the polymeric CTM;

Experiment 3 shows electrical properties of CTLs of the invention as a function of different degrees of chain branching in the polymeric CTM;

Experiments 4 to 6 show electrical properties of CTLs of the invention as a function of different molecular weight of polymeric CTM;

Experiments 7 and 8 show electrical properties of CTLs of the invention as a function of different concentrations of polymeric CTM in the CTL;

Experiments 9 to 11 show the durability (as measured by abrasion resistance and indicated by $T_g$) of CTLs of the invention;

Experiments 12 to 14 show CTLs of the invention as a function of different ingredients in the CTL (such as binder resin; and Various other formulations for CTLs of the invention are given in Tables 17 to 19.

PREPARATIVE EXAMPLES 1 TO 32

Unless indicated to the contrary, or clearly different from the context, all references herein and in the following examples and experiments to percentages refer to the percentage by mass of ingredient to total mass of the composition to which the ingredients is to be added or of which it is a part.

The number average molecular weights ($M_n$) quoted in the Examples herein were determined by gel permeation chromatography (Waters 150CV) calibrated against polystyrene standards. Samples were run in tetrahydrofuran (hereinafter "THF") using two "Polymer Labs. Mixed D" gel columns at a rate of 1 ml/min. A value for $M_n$ was determined from the GPC spectrum, and from the $M_n$ value, an approximate average degree of polymerisation ($\equiv$m as defined herein) was calculated by subtracting the mass of the terminal groups and dividing by the molecular weight of the repeat unit.

Also for convenience the Examples herein which are polymers are identified by the substituents on the phenyl rings in the repeat unit (e.g. "3-methyl polymer").

The Standard Method

In the preparative Examples herein the following Standard Method was used to prepare Polymers of the invention from a given monomer and other ingredients (e.g. end capping reagent). A reaction vessel (specified in each example) was equipped with an overhead stirrer (or magnetic stirrer if stated in the Example) and a nitrogen line and was flame dried under nitrogen. Nickel (II) chloride ('A' g), zinc powder ('B' g), 2,2'-dipyridyl ('C' g), triphenylphosphine ('D' g) and anhydrous N,N-dimethylacetamide ('E' ml) were charged to the reaction vessel. The mixture was stirred at room temperature (or another temperature if stated in the example) and a deep red/brown solution was observed which is characteristic of the catalyst. The catalyst was warmed to 80° C. (or another temperature if stated in the example) and then the specified amine monomer ['F' g] and end capping reagent ('G' g) were added to the reaction mixture (optionally together with a liquid if stated in the example). The reaction was maintained at temperature and stirred for 'H' hours, after which time more of the end capping reagent ('J' g) was added. The resulting mixture was stirred for a further one hour (or another period if stated in the Example), to ensure the polymer was completely end capped. The reaction was then complete and the polymer was isolated from the reaction mixture and purified as described in each Example, to obtain a sample of the Exemplified polymer.

The values for 'A' to 'J' for each of the Examples herein are given in Tables 1 to 4 below. Any minor variations from the above Standard Method are also described in the relevant Example. The Standard Method was also modified as described herein to prepare various non-invention polymers as Comparative Examples.

Examples 1 to 11 that follow illustrate polymers of the invention made with the same end capping reagent (1-chloro-3-methylbenzene) and various monomers.

Example 1

"3-Methyl Polymer"

1(a) Preparation of bis-(N-4-chlorophenyl)-3-methylphenylamine [used as the monomer in Example 1(b)].

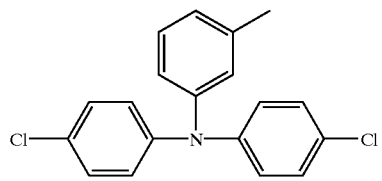

A round bottomed flask (2 liter, 4-neck), equipped with an overhead stirrer, a nitrogen line and a Dean-Stark apparatus fitted with a reflux condenser, was charged with 1-amino-3-methylbenzene (63.9 g), 1-chloro-4-iodobenzene (356.0 g), copper (200 mesh, 82.0 g), 1,4,7,10,13,16-hexaoxacyclooctadecane [known hereinafter as "1B-crown-6"] (36.0 g), anhydrous potassium carbonate (300.0 g) and 1,2-dichlorobenzene (400 ml). The reaction mixture was heated (190° C.) and after 70 hours, the reaction was deemed complete by HPLC analysis. The reaction mixture was allowed to cool to room temperature, then dichloromethane (hereinafter referred to as "DCM", 400 ml) was added to the reaction flask. The reaction mixture was filtered to remove all residual solids and the filter cake was washed with DCM (200 ml). The organic extract was washed several times with water then concentrated under reduced pressure to yield an oil. The crude oil was purified by column chromatography (silica gel) eluting with hexane (500 ml). The volume of the filtrate was reduced under vacuum (to 200 ml) and then poured into methanol (500 ml). The resulting precipitate was recrystallised from methanol and dried under vacuum at 70° C. to give, as a colourless solid, the title amine (48.5 g, >99% pure as determined by HPLC).

1(b) Preparation of "3-methyl polymer" by polymerising the amine monomer [as prepared in Example 1(a)] using 1-chloro-3-methylbenzene as the end capping reagent.

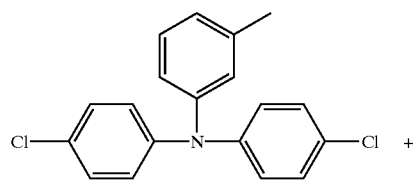

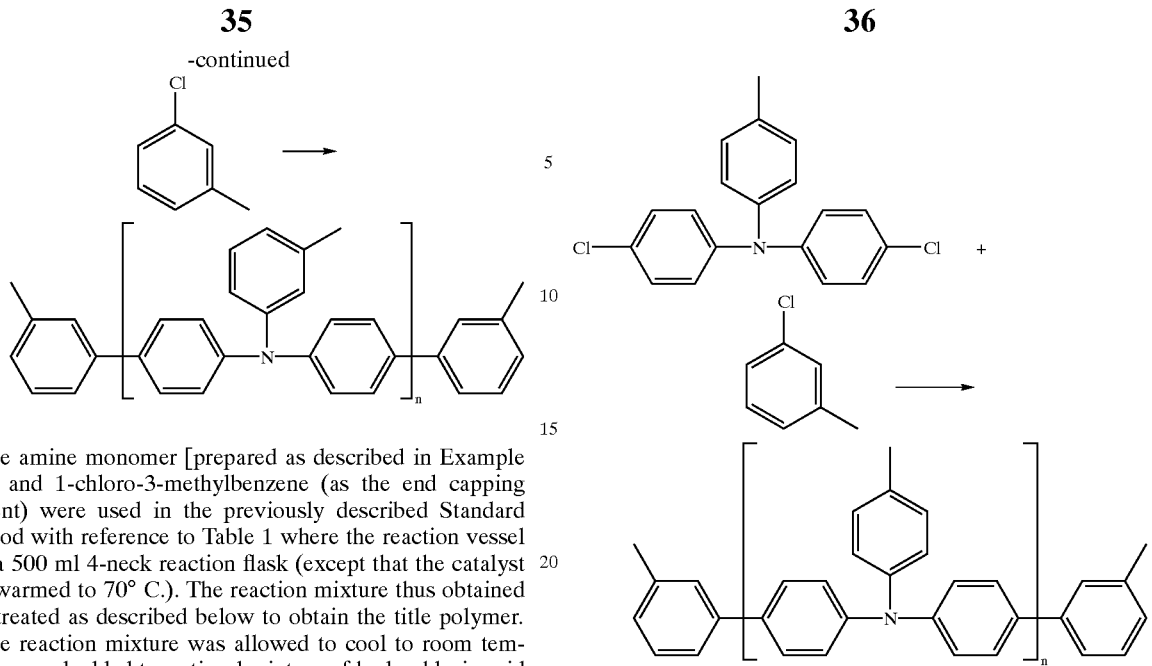

The amine monomer [prepared as described in Example 1(a)] and 1-chloro-3-methylbenzene (as the end capping reagent) were used in the previously described Standard Method with reference to Table 1 where the reaction vessel was a 500 ml 4-neck reaction flask (except that the catalyst was warmed to 70° C.). The reaction mixture thus obtained was treated as described below to obtain the title polymer.

The reaction mixture was allowed to cool to room temperature and added to a stirred mixture of hydrochloric acid (2 M, 200 ml) and DCM (500 ml). The resulting mixture effervesced. The mixture was filtered, under vacuum, through a pad of silica to remove residual solids. The organic layer was concentrated under reduced pressure and washed several times with distilled water. The volume of the resulting liquid was reduced (to ~100 ml) and the organic solution was poured into methanol (500 ml). The resulting precipitate was collected, dissolved in toluene (100 ml) and treated with carbon. The solution was then filtered and poured into methanol (500 ml). The resulting precipitate was collected, by vacuum filtration, washed with methanol (100 ml), then hexane (100 ml) and dried under vacuum at 70° C. to give, as a pale yellow solid, the title polymer (5.7 g), which was characterised as follows: $M_n$=1,100 daltons; m=4; and $T_g$=117° C.

Example 2

"4-Methyl Polymer"

2(a) Preparation of bis(N-4-chlorophenyl)-4-methylphenylamine [used as the monomer in Example 2(b)].

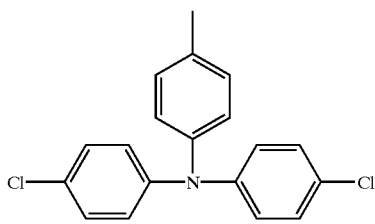

The procedure described in Example 1(a) was repeated, but 1-amino-4-methylbenzene (64.2 g) was used instead of the 1-amino-3-methylbenzene. The reaction was complete after 52 hours as indicated by HPLC. The crude product was purified using column chromatography (silica gel), eluting with hexane (800 ml). The resulting product was recrystallised successively from ethanol and hexane and dried under vacuum at 70° C. to give, as a colourless solid, the title amine (73.0 g, >99% pure as determined by HPLC).

2(b) Preparation of "4-methyl polymer" by polymerising the amine monomer [as prepared in Example 2(a)] using 1-chloro-3-methylbenzene as the end capping reagent.

The amine monomer [prepared as described in Example 2(a)] and 1-chloro-3-methylbenzene (as the end capping reagent) were used in the previously described Standard Method with reference to Table 1 where the reaction vessel was a 1 liter 5-neck reaction flask (except that the catalyst was warmed to 70° C.). The reaction mixture thus obtained was treated as described below to obtain the title polymer.

The reaction mixture was cooled to room temperature and then poured into a mixture of hydrochloric acid (2 M, 2 liter) and DCM (1 liter). The resulting mixture effervesced. The mixture was filtered, under vacuum, through a pad of silica to remove residual solids and the organic layer was washed several times with distilled water. The organic layer was concentrated under reduced pressure to yield a yellow oil. The resulting oil was dissolved in THF (75 ml) and poured into methanol (1.5 liter). The resulting precipitate was collected by vacuum filtration and purified by column chromatography (silica gel), eluting with 1.5 liter of a mixture of DCM and hexane (in a respective volume ratio of 2 to 1). The solvent was removed under reduced pressure and the resulting precipitate was purified twice more by precipitation from THF/methanol (as described previously) and dried under vacuum at 70° C. to give, as an off-white solid, the title polymer (20.2 g), which was characterised as follows: $M_n$=900 daltons; m=3; $T_g$=102° C.; and Cl content=3.0% w/w.

Example 3

"2,4-Dimethyl" Polymer

3(a) Preparation of bis(N-4-chlorophenyl)-2,4-dimethylphenylamine [used as the monomer in Example 3(b)].

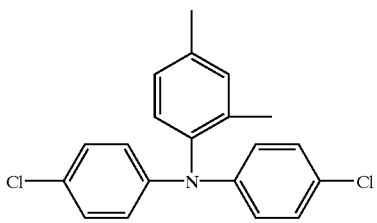

The procedure described in Example 1(a) was repeated, but 1-amino-2,4-dimethylbenzene (72.6 g) was used instead of the 1-amino-3-methylbenzene. The reaction was complete after 74 hours, as indicated by HPLC analysis. The crude product was purified by column chromatography (silica gel), eluting with hexane (800 ml, cyclohexane could also be used). The resulting product was recrystallised from THF/methanol [as described in Example 2(b)], collected by filtration and dried under vacuum at 70° C. to give, as a colourless solid, the title amine (119.5 g, >99% pure as determined by HPLC).

3(b) Preparation of "2,4-dimethyl polymer" by polymerising the amine monomer [as prepared in Example 3(a)] using 1-chloro-3-methylbenzene as the end capping reagent.

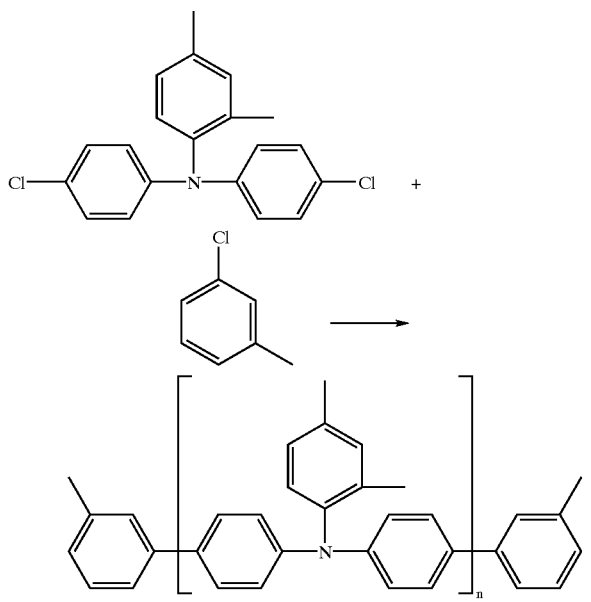

The amine monomer [prepared as described in Example 3(a)] and 1-chloro-3-methylbenzene (as the end capping reagent) were used in the previously described Standard Method with reference to Table 1 where the reaction vessel was a 2 liter 5-neck reaction flask. The reaction mixture thus obtained was treated as described below to obtain the title polymer.

The reaction mixture was cooled to room temperature and poured into a mixture of DCM (1.5 liter) and distilled water (1.5 liter). Concentrated hydrochloric acid (300 ml) was added dropwise to the mixture over 30 minutes to destroy the excess zinc. The resulting mixture effervesced. The organic layer was washed with 50% sodium hydroxide solution (200 ml), then filtered, under vacuum, through a pad of silica to remove any residual solids and washed through with several volumes of distilled water. The organic layer was concentrated under reduced pressure to yield a yellow oil. The resulting oil was dissolved in THF (500 ml) and poured into methanol (2 liter) to form a precipitate. The THF/methanol precipitation (as described previously) was repeated twice to yield an off/white solid (85 g) which was dissolved in 500 ml of a mixture of DCM and hexane (in a respective volume ratio of 3 to 2) and purified by column chromatography (silica gel), eluting with 1.5 liter of a mixture of DCM and hexane (in a respective volume ratio of 3 to 2). The excess solvents were removed, the resulting solid dissolved in THF (500 ml) and the solution was poured into methanol (2 liter). The resulting precipitate was collected and dried under vacuum at 70° C. to give, as an off-white solid, the title polymer (62 g), which was characterised as follows: $M_n=1,800$ daltons; m=6; $T_g=171°$ C.; and Cl content<0.5% w/w.

Example 4

"4-N,N-Diethylamino" Polymer

4(a) Preparation of bis-(N-4-chlorophenyl)-4-(N',N'-diethylamino)phenylamine [used as the monomer in Example 4(b)]

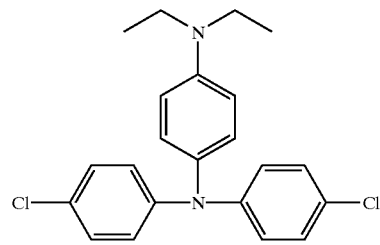

A 250 ml, multi-neck reaction flask fitted with a condenser, nitrogen supply and overhead mechanical stirrer was charged with 1-(N,N-diethylamino)-4-aminobenzene (9.0 g), 1-chloro-4-iodobenzene (40.0 g), potassium hydroxide (24.6 g.), copper (I) chloride (0.6 g), 1,10-phenanthroline (1.6 g) and toluene (150 ml). The reaction mixture was heated rapidly with stirring, under a nitrogen atmosphere, to 105° C. This mixture was then maintained at this temperature under reflux for 23 hours after which 1-chloro-4-iodobenzene (13 g) was added. The reaction was stopped after 27 hours and allowed to cool to room temperature. The reaction mixture was transferred to a beaker containing toluene (150 ml) and water (100 ml). Glacial acetic acid was used to attain a neutral pH and then the organic phase was separated and washed twice with water (100 ml). The organic solution was stirred with silica (15 g), and purified by column chromatography (silica gel), eluting with toluene (1 liter). The organic filtrates were combined and concentrated to a yellow oil under reduced pressure. The oil was absorbed onto silica and purified by column chromatography (silica gel), eluting with a mixture of hexane and toluene (at a initial respective volume ratio of 4 to 1, but where the toluene concentration in the mixture gradually increased as elution progresses), to give the title amine (7.5 g).

4(b) Preparation of "4-N,N-diethylamino polymer" by polymerising the amine monomer [as prepared in Example 4(a)] using 1-chloro-3-methylbenzene as the end capping reagent.

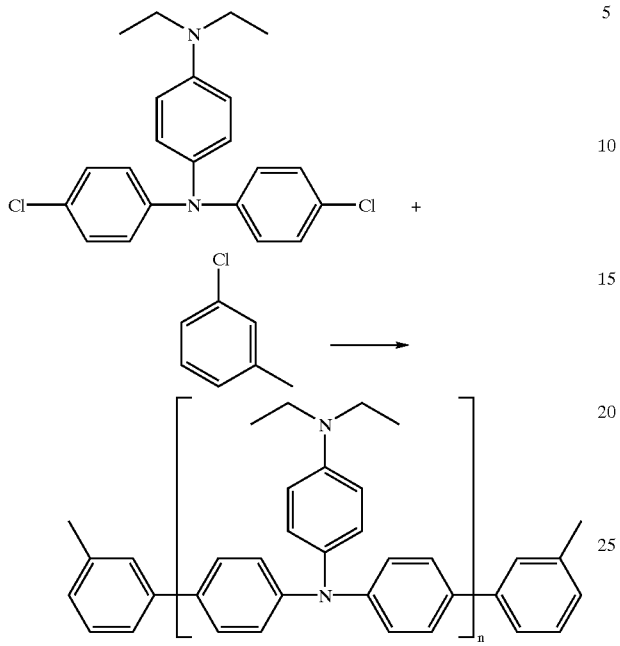

The amine monomer [prepared as described in Example 4(a)] and 1-chloro-3-methylbenzene (as the end capping reagent) were used in the previously described Standard Method with reference to Table 1 where the reaction vessel was a 500 ml 4-neck reaction flask [except that the monomer and initial end capping reagent were added in a solution of anhydrous N,N'-dimethylacetamide (50 ml)]. The reaction mixture thus obtained was treated as described below to obtain the title polymer.

The reaction mixture was allowed to cool and added to a stirred mixture of DCM (500 ml), concentrated hydrochloric acid (75 ml) and water (500 ml). The two phase mixture was separated discarding the aqueous fraction. The organic solution filtered through a glass sinter and the residues were washed with DCM, toluene, then methanol until all organic material was dissolved. The organic fractions were combined and concentrated to a viscous oil under reduced pressure. The oil was added dropwise to acetone (500 ml), to form a white precipitate which quickly coloured in air. The precipitate was dissolved in the minimum volume of hot methanol and precipitated into acetone (500 ml). The solids formed were collected by filtration and dried under vacuum at 70° C., to give the title polymer, which was found to be sparingly soluble in toluene, DCM and THF.

Example 5

"3-Trifluoromethyl" Polymer

5(a) Preparation of bis(N-4-chlorophenyl)-3-trifluoromethylphenylamine [used as the monomer in Example 5(b)]

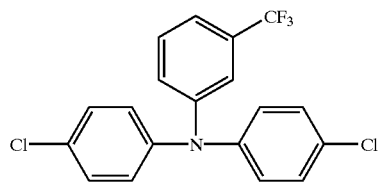

The procedure described in Example 1(a) was repeated, but 1-amino-3-trifluoromethylbenzene (96.7 g) was used instead of the 1-amino-3-methylbenzene. The reaction was heated to 180° C. for 19 hours after which time HPLC analysis indicated the reaction was complete. The crude product was recrystallised from methanol and further purified by hot filtration, under vacuum, with methanol through a pad of silica. The resulting solid was recrystallised from methanol and dried under vacuum at 70° C., to give, as a colourless solid, the title amine (130.0 g. >99% pure as determined by HPLC).

5(b) Preparation of "3-trifluoromethyl polymer" by polymerising the amine monomer [as prepared in Example 5(a)] using 1-chloro-3-methylbenzene as the end capping reagent.

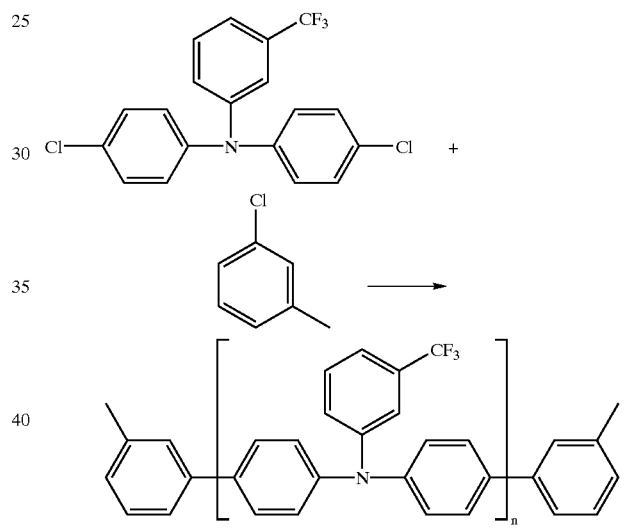

The amine monomer [prepared as described in Example 5(a)] and 1-chloro-3-methylbenzene (as the end capping reagent) were used in the previously described Standard Method with reference to Table 1 where the reaction vessel was a 250 ml 4-neck reaction flask (except that the reaction mixture was heated for 2 hours after final addition of end capping reagent). The reaction mixture thus obtained was treated as described below to obtain the title polymer.

The reaction mixture was allowed to cool to room temperature and then was poured into 1 liter of a mixture of DCM and 2M hydrochloric acid (at a respective volume ratio of 1 to 2). The resulting mixture effervesced. The organic layer was separated and filtered, under vacuum, through a pad of silica to remove residual solids, then washed several times with distilled water. The excess solvents were removed under reduced pressure and the resulting yellow oil dissolved in THF (50 ml). The solution was slowly poured into methanol (500 ml) and the resulting precipitate was collected, by vacuum filtration, and dissolved in 80 ml of a mixture of DCM and hexane (in a respective volume ratio of 2 to 1). The solution was purified by column chromatography (silica gel), eluting with 500 ml of a mixture of DCM and hexane (in a respective volume ratio of 2 to 1). The excess solvents were removed under reduced pressure and the THF/methanol precipitation (as described previously) was repeated twice more, to yield a product which was dried under vacuum at 70° C., to give, as a colourless solid, the title polymer (10.5 g), which was characterised as follows: $M_n$=3,900 daltons; m=12; and $T_g$=149° C.

Example 6

"Unsubstituted" Polymer

6(a) Preparation of bis(N-4-chlorophenyl)phenylamine [used as the monomer in Example 6(b)]

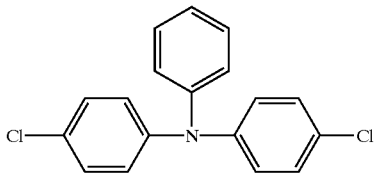

A reaction flask (1 liter, 4-neck), equipped with an overhead stirrer and a nitrogen line was charged with aminobenzene (27.9 g), 1-chloro-4-iodobenzene (178.0 g), copper (200 mesh, 41.4 g), 1B-crown-6 (15.0 g), anhydrous potassium carbonate (150.0 g) and 1,2-dichlorobenzene (200 ml). The reaction was heated to 180° C. for 43 hours, after which time the reaction was deemed complete, as indicated by HPLC analysis. The excess solvent was removed under reduced pressure and toluene (500 ml) was added to the crude mixture at 110° C. On cooling, the residual solids were removed by filtration, under vacuum, through a pad of silica and the filter cake washed with toluene (200 ml). The organic filtrate was washed successively with distilled water (500 ml), hydrochloric acid (0.5 M, 500 ml), then distilled water (2×500 ml). The solvent was removed under reduced pressure and the resulting oil dissolved in hexane (100 ml) and then filtered through a pad of silica. The hexane was removed under reduced pressure and the resulting residue was recrystallised from ethanol (×2) and dried under vacuum to give, as a colourless solid, the title amine (55.0 g, >99% pure as determined by HPLC).

6(b) Preparation of "unsubstituted polymer" by polymerising the amine monomer [as prepared in Example 6(a)] using 1-chloro-3-methylbenzene as the end capping reagent.

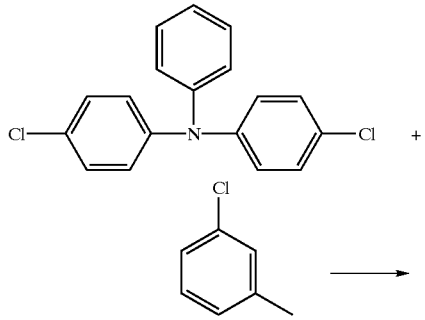

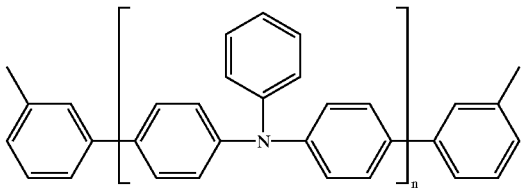

The amine monomer [prepared as described in Example 6(a)] and 1-chloro-3-methylbenzene (as the end capping reagent) were used in the previously described Standard Method with reference to Table 1 where the reaction vessel was a 100 ml 4-neck reaction flask equipped with a magnetic stirrer (except that the catalyst was warmed to 70° C.). The reaction mixture thus obtained was treated as described below to obtain the title polymer.

The reaction mixture was allowed to cool to room temperature and filtered through a pad of silica gel to remove any residual solids. The filtrate was concentrated and the resulting solids were poured into 1 liter of a mixture of DCM and 2M hydrochloric acid (at a respective volume ratio of 1 to 9). The resulting mixture effervesced. The organic layer was reduced in volume (to −100 ml) and then poured into methanol (500 ml). The resulting precipitate was dissolved in DCM (200 ml) and washed successively with hydrochloric acid (0.5 M, 200 ml) and distilled water (4×250 ml). The excess solvent was removed and the resulting solid washed several times with methanol and dried under vacuum at 70° C. to give, as a pale yellow solid, the title polymer (5.0 g) which was characterised as follows: $M_n$=900 daltons; m=3; and Cl content<0.5% w/w.

Example 7

"2,5-Dimethyl Polymer"

7(a) Preparation of bis(N-4-chlorophenyl)-2,5-dimethylphenylamine [used as the monomer in Example 7(b)]

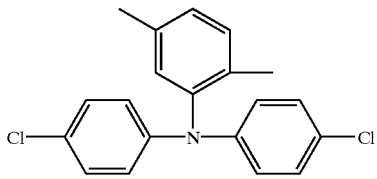

The procedure described in Example 1(a) above was repeated but 1-amino-2,5-dimethylbenzene (72.6 g) was used instead of the 1-amino-3-methylbenzene. The reaction was deemed to be complete after 96 hours, as indicated by HPLC analysis. The crude product was purified by column chromatography (silica gel), eluting with 1.5 liter of a mixture of hexane and DCM (in a respective volume ratio of 16 to 1). The organic fraction was concentrated under reduced pressure and the resulting pale orange solid was recrystallised from a mixture of acetone and methanol and dried under vacuum at 70° C. to give, as an off-white solid, the title amine (108.3 g, 99% pure as determined by HPLC).

7(b) Preparation of "2,5-dimethyl polymer" by polymerising the amine monomer [as prepared in Example 7(a)] using 1-chloro-3-methylbenzene as the end capping reagent.

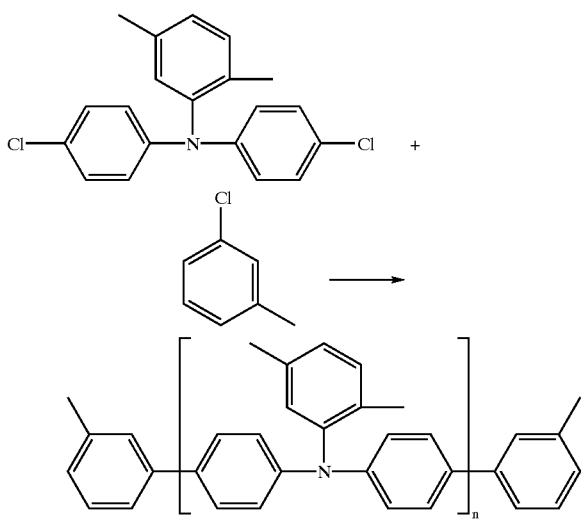

The amine monomer [prepared as described in Example 7(a)] and 1-chloro-3-methylbenzene (as the end capping reagent) were used in the previously described Standard Method with reference to Table 1 where the reaction vessel was a 500 ml 5-neck reaction flask [except that the catalyst mixture was initially stirred at 80° C.; and the monomer and initial end capping reagent were added in anhydrous toluene (100 ml)]. The reaction mixture thus obtained was treated as described below to obtain the title polymer.

The reaction mixture was allowed to cool to room temperature, then concentrated hydrochloric acid (40 ml) was added cautiously to the mixture to destroy the excess zinc. The resulting mixture effervesced. Distilled water (100 ml) and DCM (100 ml) were added, and the organic layer separated. The organic extract was filtered, under vacuum, through a pad of silica to remove residual solids and washed successively with distilled water (2×100 ml) then sodium hydrogen carbonate solution (2 M, 2×100 ml). The solvent was removed under reduced pressure to yield a yellow oil. The resulting oil was dissolved in THF (20 ml) and poured into methanol (500 ml). The resulting precipitate was collected, by vacuum filtration, and dissolved in 50 ml of a mixture of DCM and hexane (in a respective volume ratio of 1 to 1). The product was purified by column chromatography (silica gel), eluting with 400 ml of a mixture of DCM and hexane (in a respective volume ratio of 1 to 1). The THF/methanol precipitation (as described previously) was repeated twice and the resulting precipitate was collected and dried under vacuum at 70° C. to give, as a pale yellow solid, the title polymer (9.6 g) which was characterised as follows: $M_n$=2,200 daltons; and m=7.

Example 8

"3-Methoxy Polymer"

8(a) Preparation of bis(N-4-chlorophenyl)-3-methoxyphenylamine [used as the monomer in Example 8(b)]

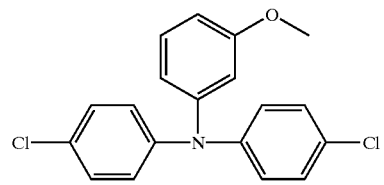

A reaction flask (2 liter, 5-necked), equipped with an overhead stirrer, thermometer, a nitrogen line and a Dean-Stark apparatus fitted with a reflux condenser, was charged with 1-methoxy-3-aminobenzene (28.9 g), 1-chloro-4-iodobenzene (130.1 g), copper (200 mesh, 41.8 g), 18-crown-6 (14.4 g), anhydrous potassium carbonate (108.5 g) and 1,2-dichlorobenzene (150 ml). The reaction mixture was heated to 190° C. and after 20 hours, the reaction was deemed complete, as indicated by HPLC.

The reaction mixture was allowed to cool to room temperature, then DCM (500 ml) was added to the reaction flask. The reaction mixture was filtered to remove all residual solids and the filter cake was washed with DCM (500 ml). The organic extract was washed several times with water and then concentrated under reduced pressure to yield a dark brown oil. The crude product was purified by column chromatography (silica gel), eluting with 1 liter of a mixture of hexane and DCM (in a respective volume ratio of 3 to 1). The volume of the filtrate was reduced under vacuum (to 200 ml) and then was poured into methanol (500 ml). The resulting precipitate was successively recrystallised from ethanol and butan-1-ol, and dried under vacuum at 70° C. to give, as a colourless solid, the title amine (23.3 g, 98.9% pure as determined by HPLC).

8(b) Preparation of "3-methoxy polymer" by polymerising the amine monomer [as prepared in Example 8(a)] using 1-chloro-3-methylbenzene as the end capping reagent.

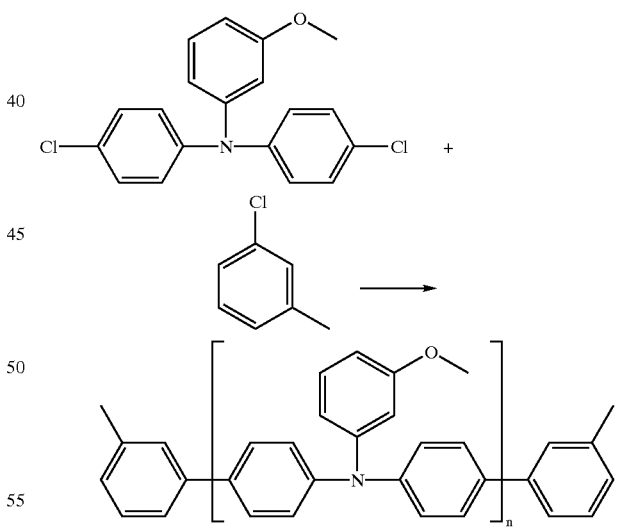

The amine monomer [prepared as described in Example 8(a)] and 1-chloro-3-methylbenzene (as the end capping reagent) were used in the previously described Standard Method with reference to Table 1 where the reaction vessel was a 250 ml 4-neck reaction flask (except that the reaction mixture was heated for 2 hours after final addition of end capping reagent). The reaction mixture thus obtained was treated as described below to obtain the title polymer.

The reaction mixture was allowed to cool to room temperature and then was poured into 1 liter of a stirred mixture of DCM and 2M hydrochloric acid (in a respective volume ratio of 1 to 9). The resulting mixture effervesced. The organic layer was separated and filtered, under vacuum, through a pad of silica. The solution was poured into methanol (500 ml). The resulting precipitate was collected by vacuum filtration, dissolved in THF (50 ml) and poured into methanol (500 ml). The THF/methanol precipitation (as described previously) was repeated and the resulting precipitate was collected and dried under vacuum at 70° C. to give, as a pale yellow solid, the title polymer (6.8 g) which was characterised as follows: $M_n$=2,400 daltons; m=8; and Cl content<0.5% w/w.

Example 9

"4-Ethoxy Polymer"

9(a) Preparation of bis(N-4-chlorophenyl)-4-ethoxyphenylamine [used as the monomer in Example 9(b)]

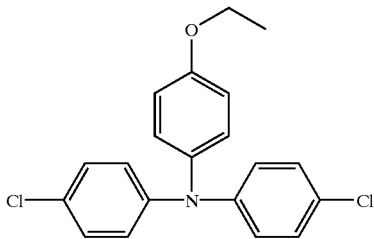

A reaction flask (2 liter 5-neck) fitted with an overhead stirrer, thermometer, nitrogen line and Dean-Stark apparatus fitted with a reflux condenser, was charged with 1-ethoxy-4-aminobenzene (20.0 g), 1-chloro-4-iodobenzene (105.0 g), copper (200 mesh, 27.8 g), 18-crown-6 (9.7 g), anhydrous potassium carbonate (60.4 g) and 1,2-dichlorobenzene (300 ml). The reaction mixture was heated to 190° C. for 45 hours, after which time HPLC analysis indicated the reaction was complete and a colour change was observed from deep purple to a dull green colour. The mixture was allowed to cool to room temperature, then toluene (500 ml) was added to the reaction flask. The resulting solution was filtered and then washed with water (2×500 ml). The organic extract was dried with anhydrous magnesium sulfate, filtered and then concentrated to a deep purple viscous oil.

The preceding preparation was repeated and the crude products combined and purified as follows. The crude product was dissolved in hexane (200 ml) and then purified by column chromatography (silica gel), eluting with 1 liter of a mixture of hexane and DCM (in a respective volume ratio of 7 to 3). Further purification was carried out by fractional column chromatography (silica gel) eluting with hexane (1 liter) to give, as a pale yellow viscous oil, the title amine (20.0 g, 83% pure as determined by HPLC).

9(b) Preparation of "4-ethoxy polymer" by polymerising the amine monomer [as prepared in Example 9(a)] using 1-chloro-3-methylbenzene as the end capping reagent.

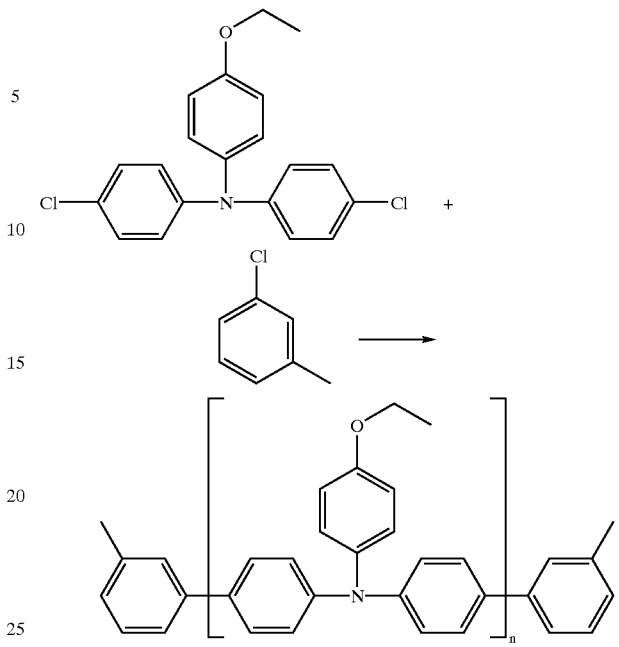

The amine monomer [prepared as described in Example 9(a)] and 1-chloro-3-methylbenzene (as the end capping reagent) were used in the previously described Standard Method with reference to Table 1 where the reaction vessel was a 500 ml 4-neck reaction flask [except that, the monomer and initial end capping reagent was added as a solution in anhydrous N,N-dimethylacetamide (50 ml); and the reaction mixture was heated for 16 hours after final addition of end capping reagent]. The reaction mixture thus obtained was treated as described below to obtain the title polymer.

The reaction mixture was allowed to cool to room temperature and then was added to a stirred mixture of DCM (200 ml) and concentrated hydrochloric acid (40 ml). The organic solution was washed several times with distilled water then concentrated to an oil under reduced pressure. The resulting oil was dissolved in THF (50 ml) and was added dropwise to methanol (200 ml). The resulting precipitate was collected, by vacuum filtration, air-dried and was dissolved in the minimum volume of DCM and then hexane was added until the solution became slightly opaque. The solution was purified by column chromatography (silica gel), eluting with 800 ml of a mixture of DCM and hexane (in a respective volume ratio of 4 to 1). The organic fractions were combined, reduced in volume (to ~100 ml), washed with potassium carbonate solution (1M, 100 ml) and concentrated to a yellow oil. The resulting oil was dissolved in THF (50 ml) and added dropwise to methanol (1.5 liter). The resulting precipitate was collected, by vacuum filtration, and dried under vacuum at 70° C. to give, as an off-white solid, the title polymer as a material [A] (8.2 g), which was characterised as follows: $M_n$=1,200 daltons; m=4; and Cl content<0.5% w/w.

A 2 g sample of the material [A] was dissolved in THF (20 ml) and added dropwise to methanol (200 ml). The resulting precipitate was collected, by vacuum filtration, and dried under vacuum at 70° C. to give a further sample of the title polymer as a material [B] (1.6 g).

Example 10

"Di(2-Methyl)/2,4 Dimethyl Polymer"

10(a) Preparation of bis(N-2-methyl-4-chlorophenyl)-2,4-dimethylphenylamine [used as the monomer in Example 10(b)]

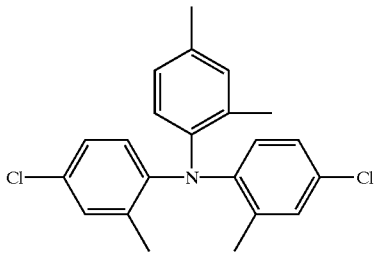

A reaction flask (2 liter, 4-neck), equipped with an overhead stirrer, a nitrogen line and a Dean-Stark apparatus fitted with a reflux condenser, was charged with 2,4-dimethylaniline (18.8 g), 1-iodo-2-methyl-4-chlorobenzene (98.0 g), copper (22.3 g), 18-crown-6 (9.5 g), anhydrous potassium carbonate (78.1 g) and 1,2-dichlorobenzene (350 ml). The reaction mixture was heated to 200° C. for 144 hours, after which time the reaction was deemed complete, as indicated by HPLC analysis. After cooling the reaction mixture to room temperature, DCM (400 ml) was added to the reaction flask, then the mixture was filtered, under vacuum, through a pad of silica to remove all residual solids, and was washed through with further DCM (400 ml). The DCM extract was washed several times with water and the solvent removed under reduced pressure to afford a brown oil. The crude product was purified by flash column chromatography (silica gel), eluting with hexane (500 ml). The hexane fraction was concentrated under reduced pressure to afford a yellow oil, which solidified upon standing overnight (0–4° C., ~16 hours). The solid was recrystallised from methanol twice to give off-white crystals which were purified by column chromatography (silica gel), eluting with hexane to give a colourless oil, which solidified upon standing overnight (0–4° C.). The solid was recrystallised from methanol and dried under vacuum at 70° C. to give, as a colourless solid, the title amine (11.0 g, >99% pure as determined by HPLC).

10(b) Preparation of "di(2'-methyl)/2,4-dimethyl polymer" by polymerising the amine monomer [as prepared in Example 10(a)] using 1-chloro-3-methylbenzene as the end capping reagent.

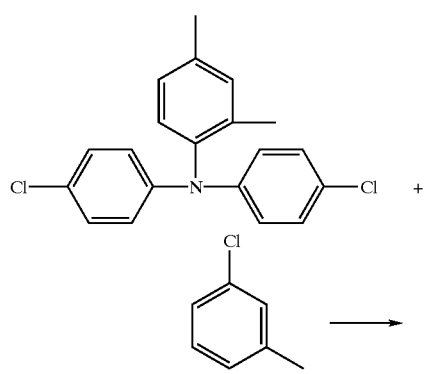

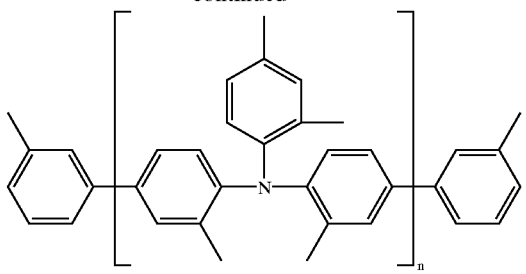

The amine monomer [prepared as described in Example 10(a)] and 1-chloro-3-methylbenzene (as the end capping reagent) were used in the previously described Standard Method with reference to Table 1 where the reaction vessel was a 500 ml 5-neck reaction flask [except that the reaction mixture was heated overnight (~16 hours) after final addition of end capping reagent]. The reaction mixture thus obtained was treated as described below to obtain the title polymer.

The reaction mixture was allowed to cool to room temperature, then DCM (250 ml) was added followed by the slow addition of concentrated hydrochloric acid (17 ml). The resulting mixture effervesced. The organic layer was separated and washed successively with potassium carbonate solution (0.5 M, 500 ml) and distilled water (4×1 liter). The solvent was removed under reduced pressure to yield a yellow oil. The resulting oil was dissolved in THF (100 ml) and poured into methanol (600 ml). The resulting precipitate was collected, by vacuum filtration, and purified by column chromatography (silica gel), eluting with 600 ml of a mixture of hexane and DCM (in a respective volume ratio of 1 to 2). The organic fraction was concentrated under reduced pressure and then purified twice by the THF/methanol precipitation (as described previously) to yield an off-white solid. The solid was further purified by column chromatography (silica gel), eluting with 1 liter of a mixture of hexane and DCM (in a respective volume ration of 1 to 2) followed by the THF/methanol precipitation (as described previously) to yield a product which was dried under vacuum at 70° C. to give, as a colourless solid, the title polymer (6.5 g), which was characterised as follows: $M_n$=1,900 daltons; m=6; and Cl content<0.5% w/w.

Example 11

"4-[2-Methylprop-2-yl] Polymer"

11(a) Preparation of bis(N-4-chlorophenyl)-4-(2-methylprop-2-yl)phenylamine [used as the monomer in Example 11(b)]

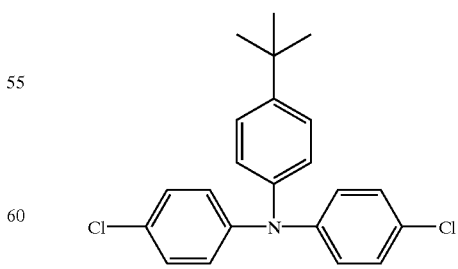

The procedure described in Example 1(a) above was repeated, but 1-amino-4-(2-methylprop-2-yl)benzene (89.5 g) was used instead of 1-amino-3-methylbenzene. The reaction was deemed complete after 46 hours. The crude product was obtained by column chromatography (silica gel), eluting with hexane. Distillation 81–83° C. 1 mm of Hg) removed an impurity while the title amine remained in the distillation flask as a pale yellow oil.

11(b) Preparation of "4-(2-methylprop-2-yl) polymer" by polymerising the amine monomer [as prepared in Example 11(a)] using 1-chloro-3-methylbenzene as the end capping reagent.

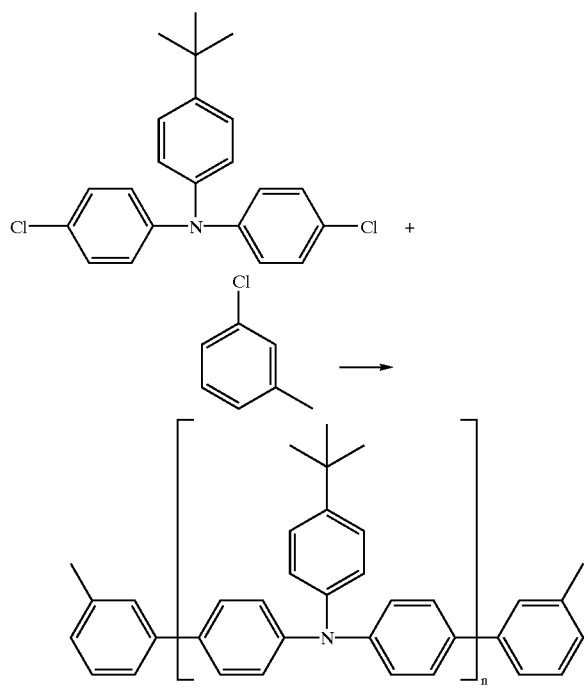

The monomer [prepared as described in Example 11(a)] and 1-chloro-3-methylbenzene (as the end capping reagent) can be used in the previously described Standard Method and with reference to Table 1 below [for example using the amounts given for Example 1(b)], to obtain a reaction mixture which can be treated [for example as described in Example 1(b)] to give a sample of the title polymer.

Example 12

Preparation of "2,4-Dimethyl Polymer" from Amine Monomer [as Prepared in Example 3(a)] Using 1-Chloro-4-Methylbenzene as the End Capping Reagent

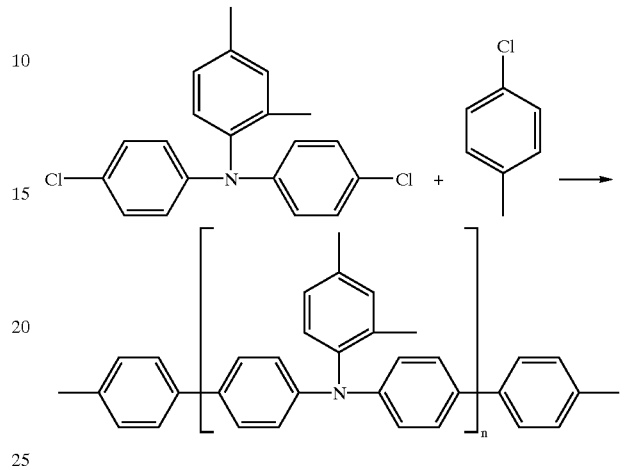

Bis(N-4-chlorophenyl)-2,4-dimethylphenylamine [prepared as described in Example 3(a)] (as the monomer) and 1-chloro-4-methylbenzene (as the end capping reagent) were used in the previously described Standard Method with reference to Table 2 where the reaction vessel was a 500 ml 4-neck reaction flask [except that, the catalyst was formed slowly over about 1 hour; the monomer and initial end capping reagent were added to the catalyst before warming with anhydrous toluene (100 ml); and the reaction mixture was heated for 16 hours after addition of final end capping reagent]. The reaction mixture thus obtained was treated as described below to obtain the title polymer.

The reaction mixture was cooled to room temperature and then concentrated hydrochloric acid (200 ml) was slowly added. The resulting mixture effervesced. The reaction mix-

TABLE 1

(various monomers, 1-chloro-3-methylbenzene and capping reagent)

| Ex | A | B | C | D | E | F | G | H | J |
|---|---|---|---|---|---|---|---|---|---|
| 1(b) | 0.2 g | 10.0 g | 0.3 g | 10.0 g | 70 ml | 10.0 g | 8.0 g | 7 hr | 4.0 g |
| 2(b) | 0.5 g | 32.7 g | 1.0 g | 21.0 g | 400 ml | 52.0 g | 10.1 g | 3 hr | 2.0 g |
| 3(b) | 1.0 g | 59.1 g | 1.8 g | 39.3 g | 750 ml | 102.7 g | 19.0 g | 5 hr | 9.5 g |
| 4(b) | 0.1 g | 4.0 g | 0.1 g | 1.2 g | 50 ml | 7.5 g | 1.2 g | 94 hr | 3.0 g |
| 5(b) | 0.1 g | 8.1 g | 0.2 g | 5.2 g | 100 ml | 18.4 g | 0.6 g | 2 hr | 5.0 g |
| 6(b) | 0.2 g | 6.0 g | 0.2 g | 6.0 g | 60 ml | 10.0 g | 4.0 g | 7 hr | 4.0 g |
| 7(b) | 0.2 g | 10.0 g | 0.3 g | 3.2 g | 100 ml | 16.8 g | 3.0 g | 5 hr | 4.0 g |
| 8(b) | 0.1 g | 8.2 g | 0.2 g | 5.2 g | 80 ml | 11.6 g | 1.3 g | 8 hr | 2.0 g |
| 9(b) | 0.1 g | 5.7 g | 0.2 g | 1.8 g | 50 ml | 10.0 g | 1.8 g | 5 hr | 3.5 g |
| 10(b) | 0.1 g | 5.5 g | 0.2 g | 3.6 g | 100 ml | 10.2 g | 1.7 g | 6 hr | 0.3 g |

Examples 12 to 18 herein illustrate polymers of the invention made with the same monomer [bis(N-4-chlorophenyl)-2,4-dimethylphenylamine] and various end capping reagents, [except that Example 18 was made from bis(N-4-chlorophenyl)phenylamine as the monomer] (Refer to Table 2 herein).

ture was diluted with DCM (500 ml) and washed successively with 50% sodium hydroxide solution (500 ml) and water (2×500 ml). The organic extract was concentrated under reduced pressure to a yellow oil. The resulting oil was dissolved in THF (100 ml) and slowly poured into methanol (500 ml). The resulting precipitate was collected, by vacuum filtration, and the THF/methanol precipitation (as described previously) was repeated twice to yield a pale yellow solid.

The resulting solid was dissolved in 200 ml of a mixture of DCM and hexane (in a respective volume ratio of 1 to 3) and purified by gradient column chromatography (silica gel), eluting with three successive volumes of a mixture of hexane and DCM (respectively 500 ml, 500 ml and 200 ml; at respective volume ratios of 3 to 1, 2 to 1 and 1 to 1). The organic fraction was concentrated under reduced pressure and the resulting product was dried under vacuum at 70° C. to give, as a colourless solid, the title polymer (2.9 g); which was characterised as follows: $M_n$=1,300 daltons; m=4; and Cl content=3.3% w/w.

Example 13

Preparation of "2,4-Dimethyl Polymer" from Amine Monomer [as Prepared in Example 3(a)] using 1-Chloro-3-Trifluoromethylbenzene as the End Capping Reagent

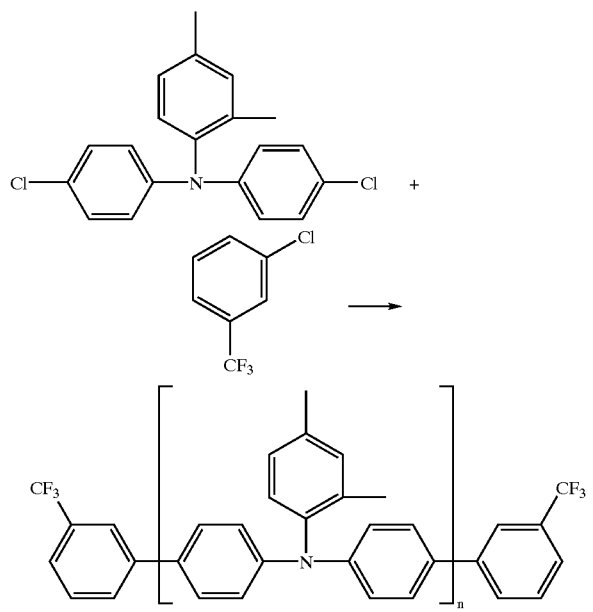

Bis(N-4-chlorophenyl)-2,4-dimethylphenylamine [as prepared as described in Example 3(a)] (as the monomer) and 1-chloro-3-trifluoromethylbenzene (as the end capping reagent) were used in the previously described Standard Method with reference to Table 2 where the reaction vessel was a 500 ml 5-neck reaction flask [except that, the catalyst was formed slowly over about 1 hour; the monomer and initial end capping reagent were added to the catalyst before warming with anhydrous toluene (100 ml)]. The reaction mixture thus obtained was treated exactly as described in Example 12 (except the THF/methanol precipitation procedure was performed a total of two times) until a pale yellow solid was obtained, which was then purified as follows.

The resulting solid was dissolved in 200 ml of a mixture of DCM and hexane (in a respective volume ratio of 1 to 2) and purified by column chromatography (silica gel), eluting with 3 liters of a mixture of hexane and DCM (in a respective volume ratio of 2 to 1). The organic fractions were concentrated under reduced pressure and dried under vacuum at 70° C. to give, as a colourless solid, the title polymer (5.1 g), which was characterised as follows: $M_n$=2,200 daltons; m=7; and Cl content=1.8% w/w.

Example 14

Preparation of "2,4-Dimethyl Polymer" from Amine Monomer [as Prepared in Example 3(a)] using 1-Chloro-3-Methoxybenzene as the End Capping Reagent

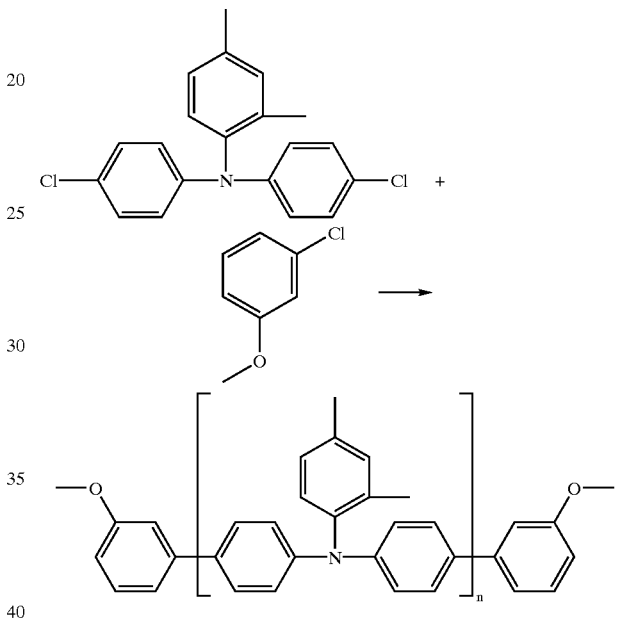

Bis(N-4-chlorophenyl)-2,4-dimethylphenylamine [prepared as described in Example 3(a)] (as the monomer) and 1-chloro-3-methoxybenzene (as the end capping reagent) were used in the previously described Standard Method with reference to Table 2 and exactly as modified in Example 13. The reaction mixture thus obtained was treated exactly as described in Example 13 until a pale yellow solid was obtained which was then purified as follows.

The resulting solid was dissolved in 200 ml of a mixture of DCM and hexane (in a respective volume ratio of 1 to 1) and purified by column chromatography (silica gel), eluting with 2 liters of a mixture of hexane and DCM (in a respective volume ratio of 2 to 1). The organic fraction was concentrated under reduced pressure, to form a colourless solid which was precipitated from THF/methanol (as described above) and dried under vacuum at 70° C. to give, as a colourless solid, the title polymer (10.6 g), which was characterised as follows: $M_n$=2,000 daltons; m=7; and Cl content<0.5% w/w.

Example 15

Preparation of "2,4-Dimethyl Polymer" from Amine Monomer [as Prepared in Example 3(a)] using 1-Bromo-2,4-Dimethylbenzene as the End Capping Reagent

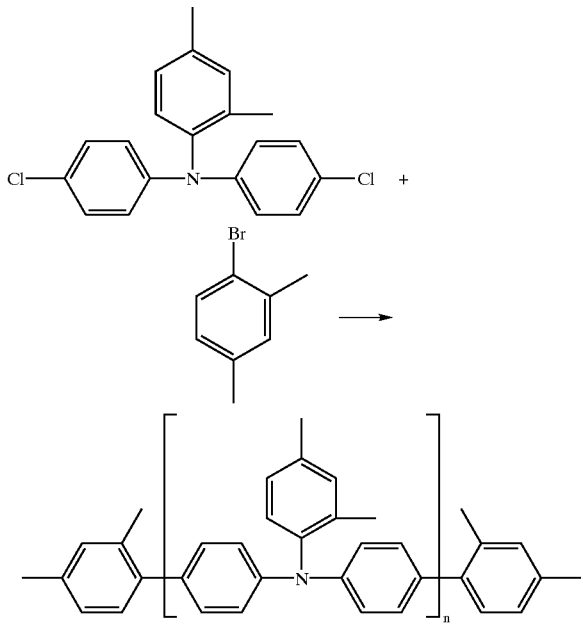

Bis(N-4-chlorophenyl)-2,4-dimethylphenylamine [prepared as described in Example 3(a)] (as the monomer) and 1-bromo-2,4-dimethylbenzene (as the end capping reagent) were used in the previously described Standard Method with reference to Table 2 and exactly as modified in Example 13 (except that also: the reaction mixture was heated to 80° C. for 3 days since HPLC analysis indicated that the reaction was progressing very slowly; and no final end capping reagent ('J') was added to the reaction mixture). The reaction mixture thus obtained was treated exactly as described in Example 13 until a pale yellow solid was obtained which was then purified as follows.

The resulting solid was dissolved in 200 ml of a mixture of DCM and hexane (in a respective volume ratio of 1 to 1) and purified by gradient column chromatography (silica gel), eluting with two successive volumes of a mixture of hexane and DCM (respectively 1 liter and 1.5 liter; at respective volume ratios of 2 to 1 and 1 to 1). The filtrate was concentrated under reduced pressure to yield a pale yellow solid which was precipitated from THF/methanol (as described above) and dried under vacuum at 70° C. to give, as a pale yellow solid, the title polymer (9.2 g), which was characterised as follows: $M_n$=3,300 daltons; m=11; Cl content<0.5% w/w; and Br content<1.5% w/w.

Example 16

Preparation of "2,4-Dimethyl Polymer" from Amine Monomer [as Prepared in Example 3(a)] using (N-4-Chlorophenyl)Diphenylamine as the End Capping Reagent 16(a) Preparation of (N-4-chlorophenyl)diphenylamine (used as the end capping reagent in Example 16(b)].

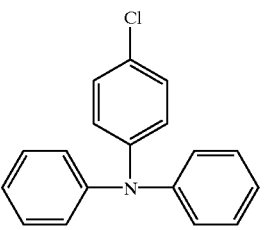

A reaction flask (500 ml, 4-neck) fitted with overhead stirrer, nitrogen line, Dean-Stark trap with water condenser, and a thermometer was flame dried under nitrogen. Diphenylamine (50.0 g), 1-chloro-4-iodobenzene (106.0 g), 18-crown-6 (15.5 g), anhydrous potassium carbonate (147.0 g), copper powder (200 mesh, 40.0 g) and 1,2-dichlorobenzene (500 ml) were charged to the reaction flask. The reaction mixture was heated with stirring to 170° C. for 44 hours, after which time HPLC analysis indicated complete consumption of starting amine. The reaction mixture was allowed to cool to room temperature then filtered, under vacuum, through a pad of silica gel to remove any residual solids and washed through with DCM (500 ml). The brown filtrate was concentrated under reduced pressure to a brown oil which was 'wet' with 1,2-dichlorobenzene. The residue was diluted with DCM (300 ml) and washed with water (3×600 ml). The organic extract was concentrated to a brown oil which solidified on standing. The crude product was dissolved in ethyl acetate (150 ml), then diluted with hexane (450 ml) and filtered, under vacuum, through a pad of silica. The filtrate was concentrated to a brown oil which solidified on standing. The crude product was then dissolved in hot hexane (500 ml) and filtered, under vacuum, through a pad of silica and washed through with hot cyclohexane (1 liter). The filtrate was concentrated under reduced pressure to a pale yellow oil which solidified to an opaque paste on standing. The paste was dissolved in DCM (200 ml), then concentrated under reduced pressure to yield a colourless solid (96.8 g). The colourless solid was purified by dissolving in THF (150 ml) and precipitating from methanol (200 ml). The resulting precipitate was collected, by vacuum filtration, and was dried under vacuum at 70° C. to give, as a colourless solid, the title amine (66.0 g, >99% pure as determined by HPLC).

16(b) Preparation of "2,4-dimethyl polymer" [as Prepared in Example 3(a)] using (N-4-chlorophenyl)diphenylamine [as prepared in Example 16(a)] as the end capping reagent.

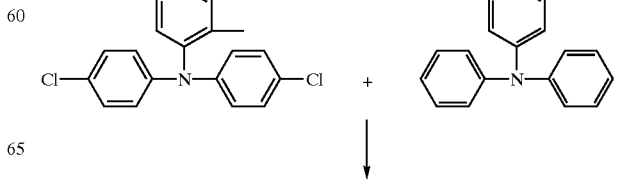

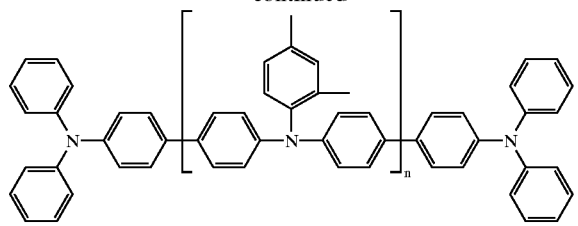

Bis(N-4-chlorophenyl)-2,4-dimethylphenylamine [prepared as described in Example 3(a)] (as the monomer) and (N-4-chlorophenyl)diphenylamine [prepared as described in Example 16(a)] (as the end capping reagent) were used in the previously described Standard Method with reference to Table 2 and as modified in Example 13. The reaction mixture thus obtained was treated exactly as described in Example 13 (except that a yellow gum is formed rather than the yellow oil) until a pale yellow solid was obtained, which was then purified as follows.

The resulting solid was dissolved in 300 ml of a mixture of DCM and hexane (in a respective volume ratio of 1 to 1) and purified by gradient column chromatography (silica gel), eluting with two successive volumes of a mixture of hexane and DCM (respectively 700 ml, and then 2 liter at respective volume ratios of 2 to 1 and 1 to 1). The filtrate was concentrated under reduced pressure to yield a pale yellow solid which was precipitated from THF/methanol (as described above) and dried under vacuum at 70° C. to give, as a pale yellow solid, the title polymer (10.0 g), which was characterised as follows: $M_n$=2,500 daltons; m=7; and Cl content<0.5% w/w.

Example 17

Preparation of "2,4-Dimethyl Polymer" from Amine Monomer [as Prepared in Example 3(a)] Using 1-Bromo-4-(2-Methylprop-2-yl)Benzene as the End Capping Reagent

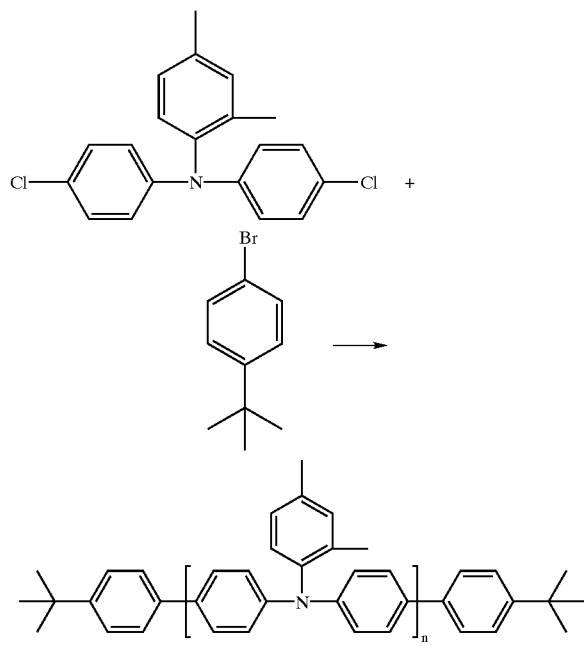

Bis(N-4-chlorophenyl)-2,4-dimethylphenylamine [prepared as described in Example 3(a)] (as the monomer) and 1-bromo-4-(2-methylprop-2-yl)benzene (as the end capping reagent) were used in the previously described Standard Method with reference to Table 2 and as modified in Example 13 (except that also: the reaction mixture was heated to 80° C. for 5 hours when HPLC indicated that the reaction was progressing slowly and thus the reaction was maintained at 80° C. for a further 16 hours after which time the mixture was a green-yellow colour and very little solvent remained; and no further end capping reagent was added to the reaction mixture). The reaction mixture thus obtained was treated as described below to obtain the title polymer.

The reaction mixture was cooled to room temperature and then diluted with DCM (400 ml). Concentrated hydrochloric acid (200 ml) was added dropwise to the mixture to destroy the excess zinc. The organic extract was collected and washed successively with a saturated solution of sodium hydrogen carbonate (500 ml), then water (2×500 ml). The organic extract was concentrated under reduced pressure to a yellow oil. The resulting oil was dissolved in THF (100 ml) and slowly poured into methanol (500 ml). The resulting precipitate was collected, by vacuum filtration, and the THF/methanol precipitation (as described previously) was repeated to yield a pale yellow solid. The resulting solid was dissolved in 150 ml of a mixture of DCM and hexane (in a respective volume ratio of 2 to 1) and purified by gradient column chromatography (silica gel), eluting with two successive volumes of a mixture of hexane and DCM (respectively 1 liter and 2 liter; at respective volume ratios of 1 to 1 and 2 to 1). The organic fraction was concentrated under reduced pressure to yield a pale yellow solid which was precipitated from THF/methanol (as described previously) and dried under vacuum at 70° C. to give, as a colourless solid, the title polymer (8.1 g), which was characterised as follows: $M_n$=3,600 daltons; m=12; and Cl content=0.9% w/w.

Example 18

Preparation of "Unsubstituted Polymer" from Amine Monomer [as Prepared in Example 6(a)] using Chlorobenzene as the End Capping Reagent

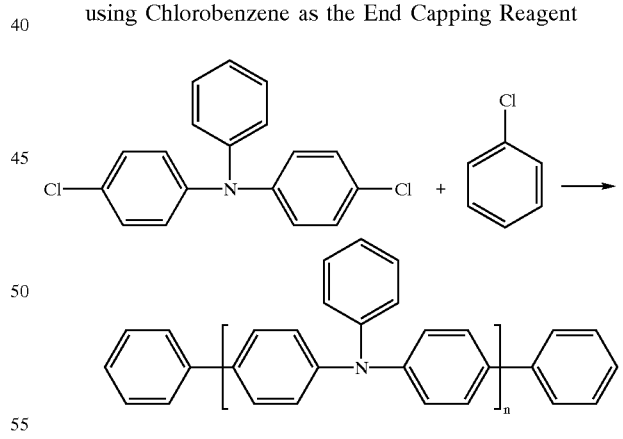

Bis(N-4-chlorophenyl)phenylamine [prepared as described in Example 6(a)] (as the monomer) and chlorobenzene (as the end capping reagent) were used in the previously described Standard Method with reference to Table 2 where the reaction vessel was a 250 ml 5-neck reaction flask [except that, the catalyst was warmed to 70° C. and then the monomer and end capping reagent were added as a solution in anhydrous toluene (25 ml); and the reaction mixture was heated for 16 hours after final addition of end capping reagent]. The reaction mixture thus obtained was treated as described below to obtain the title polymer.

The reaction mixture was allowed to cool to room temperature, then was poured into a mixture of hydrochloric acid (2 M, 400 ml) and DCM (200 ml). The resulting mixture effervesced. The aqueous layer showed the presence of an intractable yellow solid, this was filtered, under vacuum, and washed with methanol (100 ml) to yield a yellow solid (1.7 g) which was insoluble in DCM. The organic layer was washed several times with distilled water. The excess solvents were removed under reduced pressure to yield a yellow oil. The resulting oil was dissolved in THF (50 ml) and poured into methanol (700 ml). The resulting precipitate was collected by vacuum filtration and purified by column chromatography (silica gel), eluting with 300 ml of a mixture of DCM and hexane (in a respective volume ratio of 2 to 1). The solvent was removed under reduced pressure and the THF/methanol precipitation (as described previously) was repeated twice more. The resulting solid was dried under vacuum at 70° C., to give, as an off-white solid, the title polymer (3.0 g), which was characterised as follows: $M_n$=1,200 daltons; m=5.

Comparative Example I

A Linear Polymer Made Using Bis(N-4-Chlorophenyl)Phenylamine (as the Monomer) with No End Capping Reagent Added Bis(N-4-chlorophenyl)phenylamine (as the monomer) was used in the previously described Standard Method with reference to Table 2 where the reaction vessel was a 100 ml 4-neck reaction flask with a magnetic stirrer [except that, the catalyst was heated to 70° C.; no end capping reagent ('G' or 'J') was added; and the reaction mixture was heated for a total of 8 hours before being treated as described below].

The reaction mixture was filtered at 50° C. and the solids washed with N,N'-dimethylacetamide (20 ml). The solids were slurried in hydrochloric acid (2 M, 200 ml) and the mixture was filtered to collect a solid which was washed successively with distilled water (3×50 ml), sodium hydroxide solution (2 M, 2×50 ml), distilled water (5×50 ml), and methanol (2×50 ml) to give, as a pale yellow solid, the title polymer (7.2 g), which was found to be insoluble in all common solvents, Cl content=1.9 % w/w. Thus analysis, either by GPC or in the test methods described herein, was not possible.

Examples 19 to 24 herein illustrate polymers of the invention made with various amounts of a trichloro functional monomer [tris(N-4-chlorophenyl)amine), also referred to herein as "tris monomer"] to produce different degrees of chain branching (refer to Table 3 herein). The percentages given below for the amount of "tris monomer" refer to the percentage mole fraction of the "tris monomer" used (which replaces the initial end capping reagent as ingredient 'G') compared to the amount of the dichloro functional monomer ('F').

Example 19

Branched "2,4-Dimethyl Polymer" Made Using 2% of "Tris Monomer"

19(a) Preparation of tris(N-4-chlorophenyl)amine [used as the trichloro functional monomer in Example 19(b)]

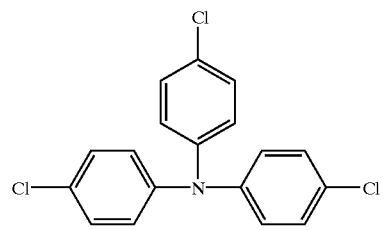

The procedure described in Example 1(a) was repeated, but 1-amino-4-chlorobenzene (76.4 g) was used instead of the 1-amino-3-methylbenzene. The reaction mixture was heated for 23 hours, after which time HPLC analysis indicated the reaction was complete. The crude product was obtained by precipitation into hexane followed by column chromatography (silica gel), eluting with a mixture of hexane and DCM (in a respective volume ratio of 1 to 1). The volume of the resulting orange filtrate was reduced (to ~200 ml) at which point a fine precipitate was formed. The mixture was cooled in an ice/salt bath and the precipitate was collected by filtrate, recrystallised from methanol and dried under vacuum at 70° C. to give, as a colourless solid, the title amine (58.5 g, >99% pure as determined by HPLC).

19(b) Polymerisation of bis(N-4-chlorophenyl)-2,4-dimethylphenylamine using 2% "tris monomer".

Bis(N-4-chlorophenyl)-2,4-dimethylphenylamine [prepared as described in Example 3(a)] (as the [dichloro] monomer) and 1-chloro-3-methylbenzene (as the end capping reagent) were used in the previously described Standard Method with reference to Table 3 where the reaction vessel was a 500 ml 4-neck reaction flask [except that the initial amount of end capping reagent was replaced as

TABLE 2

[Bis(N-4-chlorophenyl)-2,4-dimethylphenylamine monomer, various end capping reagents)

| Ex | A | B | C | D | E | F | G | H | J |
|---|---|---|---|---|---|---|---|---|---|
| 12 | 0.2 g | 10.0 g | 0.3 g | 3.1 g | 100 ml | 16.8 g | 3.2 g | 5 hr | 0.6 g |
| 13 | 0.2 g | 10.0 g | 0.3 g | 3.1 g | 100 ml | 16.8 g | 4.5 g | 5 hr | 0.9 g |
| 14 | 0.2 g | 10.0 g | 0.3 g | 3.1 g | 100 ml | 16.8 g | 3.6 g | 5 hr | 0.7 g |
| 15 | 0.2 g | 10.0 g | 0.3 g | 3.1 g | 100 ml | 16.8 g | 4.6 g | 3 days | none |
| 16(b) | 0.2 g | 10.0 g | 0.3 g | 3.1 g | 100 ml | 16.8 g | 7.0 g | 5 hr | 1.4 g |
| 17 | 0.2 g | 10.0 g | 0.3 g | 3.1 g | 100 ml | 16.8 g | 5.3 g | 21 hr | none |
| 18[1] | 0.1 g | 5.9 g | 0.2 g | 1.8 g | 70 ml | 10.0 g | 1.8 g | 5 hr | 3.4 g |
| Comp I[2] | 0.1 g | 4.0 g | 0.1 g | 4.0 g | 40 ml | 10.0 g | none | 8 hr | none |

Footnotes
[1]Polymer made using bis[N-4-chlorophenyl)phenylamine monomer.
[2]Comp. I is a comparative example which does not form part of the present invention as the polymer prepared therein did not use an end capping reagent.

ingredient ('G') by tris(N-4-chlorophenyl)amine which was added, together with the (dichloro) monomer ('F') in anhydrous toluene (70 ml); and after allowing the reaction to proceed for 'H' hours and adding the end capping reagent ('J') the reaction mixture was stirred for a further 16 hours]. The reaction mixture thus obtained was treated as described below to obtain the title polymer.

The reaction mixture was allowed to cool to room temperature and then hydrochloric acid (2M, 200 ml) and DCM (750 ml) were added to the flask. The resulting mixture effervesced. The organic layer was collected and washed several times with distilled water. The solvent was removed under reduced pressure and the resulting oil was re-dissolved in THF (100 ml). The pale yellow solution was added dropwise to ethanol (1.5 liter) resulting in the formation of an off-white precipitate, which was collected, by vacuum filtration, dissolved in DCM (100 ml), and washed with sodium carbonate solution (1M, 400 ml). The organic extract was concentrated under reduced pressure to yield a yellow oil. The resulting oil was re-dissolved in THF (100 ml) and added dropwise to methanol (2 liter) to yield an off-white precipitate, which was collected by vacuum filtration, washed with methanol (100 ml) and was dried to yield a pale yellow solid. The solid was dissolved in DCM (100 ml), then hexane (100 ml) was added dropwise until a permanent haze could be seen. The pale yellow solution was purified by column chromatography (silica gel), eluting with DCM (5 liter). The organic filtrates were concentrated under reduced pressure to yield a pale yellow solid, which was precipitated from THF/methanol (as described above). The solid was collected then dried under vacuum at 70° C. to give, as a pale yellow solid, the title polymer as a material [A] (11.6 g), which was characterised as follows: Cl content<0.5% w/w.

A 2.0 g sample of the material [A] was dissolved in DCM (25 ml) and purified by column chromatography (silica gel), eluting with DCM (200 ml). The organic fraction was concentrated under reduced pressure to yield a pale yellow solid, which was dissolved in THF (20 ml) and added dropwise to methanol (200 ml). The resulting precipitate was collected by filtration and dried under vacuum at 70° C. to give, as a pale yellow solid, a further sample of the title polymer as a material [B] (1.6 g), which was characterised as follows: Cl content<0.5% w/w.

Example 20

Branched "2,4-Dimethyl Polymer" Made Using 5% "Tris Monomer"

The polymer was prepared exactly as described in Example 19, with reference to Table 3, to give the title polymer as a material [A] (12.1 g), which was characterised as follows: Cl content=2.0% w/w; and then a further sample of the title polymer as a material [B] (1.9 g) which was characterised as follows: Cl content=1.9% w/w. A further sample of title polymer was prepared from 1.0 g of the material [B] by repeating the purification steps used to make material [B] to give another sample of the title polymer as a material [C] (0.5 g).

Example 21

Branched "2,4-Dimethyl Polymer" Made Using 8% "Tris Monomer"

The polymer was prepared by the method described in Example 19 and with reference to Table 3 [except that on purification an intractable solid was collected (5.6 g) and all soluble material was purified using the procedure described in Example 19(b)] to give the title polymer as a material [A] (9.2 g), which was characterised as follows: Cl content<0.5% w/w; and then a further sample of the title polymer as a material [B] (1.6 g) which was characterised as follows: Cl content<0.5% w/w.

Example 22

"3-Trifluoromethyl Polymer" Made Using 2% "Tris Monomer"

Bis(N-4-Chlorophenyl)-3-Trifluoromethylphenylamine [prepared as described in Example 5(a)] (as the [dichloro] monomer) and 1-chloro-3-methylbenzene (as the end capping reagent) were used in the previously described Standard Method with reference to Table 3 where the reaction vessel was a 250 ml 4-neck reaction flask [except that, the catalyst was heated to 75° C.; and the initial amount of end capping reagent was replaced by "tris monomer" as ingredient ('G')]. The reaction mixture thus obtained was treated as described below to obtain the title polymer.

The reaction mixture was allowed to cool to room temperature, then poured into a mixture of hydrochloric acid (2 M, 1 liter) and DCM (200 ml). The mixture was filtered, under vacuum, through a pad of silica to remove any residual solids. The organic layer was separated and concentrated in volume (to ~200 ml). The concentrated solution was poured into stirred hexane (1.5 liter). The resulting precipitate was collected, under vacuum, on a silica bed and washed with hexane (500 ml). The crude product and silica gel were slurried in DCM (200 ml). Hexane (1.5 liter) was added to the slurry and the resulting mixture of product precipitate and silica gel was collected, by vacuum filtration. The resulting solid mixture was further slurried in enough DCM to dissolve the product (200 ml). The solution was filtered, under vacuum, to remove residual silica gel. The DCM filtrate was poured into hexane (1.5 liter) to form a precipitate, which was collected, by vacuum filtration, dried under vacuum at 70° C., to give, as an off-white solid, the title polymer (10.3 g).

Example 23

"3-Trifluoromethyl Polymer" Made Using 5% Tris (N-4-Chlorophenyl)Amine

The polymer was prepared by the method described in Example 19(b) [replacing the bis-(N-4-chlorophenyl)-2,4-dimethylphenylamine with bis-(N-4-chlorophenyl)-3-trifluoromethyl phenylamine] and with reference to Table 3 to give samples of the title polymer as a material [A] (15.3 g), which was characterised as follows: Cl content<0.5% w/w; and then a further sample of the title polymer as a material [B] (1.9 g) which was characterised as follows: Cl content<0.5% w/w.

Example 24

"3-Trifluoromethyl Polymer" Made Using 10% "Tris Monomer"

Bis-(N-4-chlorophenyl)-3-trifluoromethylphenylamine (as the [dichloro] monomer) and 1-chloro-3-methylbenzene (as the end capping reagent) were used in the previously described Standard Method modified in Example 22 with reference to Table 3 where the reaction vessel was a 250 ml 4-neck reaction flask [except that also, the catalyst was stirred at 60° C. before heating to 75° C.]. The reaction mixture thus obtained was treated as described below. The reaction mixture was allowed to cool to room temperature, then poured into hydrochloric acid (2 M, 1 liter), to give, as a coagulate in the reaction flask, the title polymer (18.0 g), which proved insoluble in common solvents.

Comparative Example II

Branched Polymer Made Using Tris(N-4-Chlorophenyl)Amine as the Only Monomer and With No End Capping Reagent Tris(N-4-chlorophenyl)amine [prepared as described in Example 19(a)] (as the only monomer) was used in the previously described Standard Method with reference to Table 3 where the reaction vessel was a 250 ml 4-neck reaction flask [except that, the monomer was added in an anhydrous solution of N,N-dimethylacetamide (50 ml) and toluene (100 ml); no end capping reagent was added (either 'G' or 'J'): and the reaction mixture was heated for a total of 5 hours before being treated as described below].

The reaction mixture was allowed to cool to room temperature and then was added to a stirred mixture of DCM (600 ml), concentrated hydrochloric acid (175 ml) and water (200 ml). The resulting mixture effervesced. The resulting product seemed neither soluble nor insoluble forming a gel like viscous mass. The nature of the mass prevented complete destruction of the zinc by the acid even after adding additional solvent and extensive stirring. The 'gel' was filtered, under vacuum, through a glass sinter to collect the product (containing a limited quantity of zinc) which was dried to constant weight, to give the title polymer (6.4 g), small samples of which were tested for solubility in varied solvents heated at reflux. The polymer was found to be insoluble in all the solvents tested which were: N,N'-dimethylacetamide, N,N'-dimethylformamide, DCM, THF and acetone. Thus analysis, either by GPC or in the test methods described herein, was not possible.

Example 25

Monomer to End Capping Reagent Mole Ratio of 1 to 0.01, Initial Amount of End Capping Reagent ('G') Added Simultaneously With Monomer ('F')

Bis(N-4-chlorophenyl)-2,4-dimethylphenylamine monomer [prepared as described in Example 3(a)] as the monomer and 1-chloro-3-methylbenzene (as the end capping reagent) were used in the previously described Standard Method with reference to Table 4 where the reaction vessel was a 500 ml 5-neck reaction flask [except that, the monomer and all the end capping reagent were added together in anhydrous toluene (100 ml); and the reaction mixture was then heated for a total of 20 hours]. The reaction mixture thus obtained was treated as described below to obtain the title polymer.

The reaction mixture was allowed to cool to room temperature, then concentrated hydrochloric acid (50 ml) was added cautiously over 1 hour. The resulting mixture effervesced. Distilled water (200 ml) and DCM (200 ml) were added to the reaction mixture. The organic layer was filtered, under vacuum, through a pad of silica and washed successively with sodium hydroxide solution (2 M, 2×200 ml) and distilled water (2×200 ml). The excess solvents were removed under reduced pressure to yield a pale yellow solid. The resulting solid was dissolved in THF (50 ml) and poured into methanol (800 ml). The resulting precipitate was collected by vacuum filtration and the THF/methanol precipitation (as described previously) was repeated. The resulting precipitate was dissolved in 250 ml of a mixture of DCM and hexane (in a respective volume ratio of 4 to 1) and purified by column chromatography (silica gel), eluting with 800 ml of a mixture of DCM and hexane (in a respective volume ratio of 4 to 1). The excess solvent was removed and the THF/methanol precipitation (as described previously) was repeated to yield a product which was dried under vacuum at 70° C., to give, as a pale yellow solid, the title polymer as a material [A] (17.3 g), which was characterised as follows: $M_n$=5,400 daltons; m=19; and Cl content<0.5% w/w.

TABLE 3

(branched polymers formed from various amounts of "tris monomer")

| Ex | A | B | C | D | E | F | G | H | J |
|---|---|---|---|---|---|---|---|---|---|
| 19(b)[1] | 0.1 g | 8.2 g | 0.3 g | 5.3 g | 80 ml | 17.1 g | 0.4 g | 5 h | 1.0 g |
| 20[1] | 0.1 g | 8.2 g | 0.3 g | 5.3 g | 80 ml | 17.1 g | 0.9 g | 5 h | 1.0 g |
| 21[1] | 0.1 g | 8.2 g | 0.3 g | 5.3 g | 80 ml | 17.1 g | 1.4 g | 5 h | 1.0 g |
| 22[2] | 0.1 g | 8.2 g | 0.3 g | 5.3 g | 80 ml | 19.1 g | 0.4 g | 5 h | 1.0 g |
| 23[2] | 0.1 g | 8.2 g | 0.3 g | 5.3 g | 80 ml | 19.1 g | 0.9 g | 5 h | 1.0 g |
| 24[2] | 0.1 g | 8.2 g | 0.3 g | 5.3 g | 80 ml | 19.1 g | 1.7 g | 4.5 h | 2.0 g |
| Comp II | 0.1 g | 5.8 g | 0.2 g | 1.8 g | 50 ml | 10.0 g | none | 5 h | none |

Footnote
[1]Polymer made using the bis(N-4-chlorophenyl)-2,4-dimethylphenylamine monomer.
[2]Polymer made using the bis(N-4-chlorophenyl)-3-trifluoromethylphenylamine monomer.
[3]Comp. II is a comparative example which does not form part of the present invention as the polymer prepared therein did not use an end capping reagent.

For the polymers prepared in Examples 25 to 32 herein the monomer [all bis(N-4-chlorophenyl)-2,4-dimethylphenylamine] and the end capping reagent (all 1-chloro-3-methyl benzene) were added in various respective ratios and at different times during polymerisation to control the molecular weight of the resulting polymer (refer to Table 4 herein)

A sample of the material [A] (2.0 g) was dissolved in 20 ml of a mixture of DCM and hexane (at a volume ratio of 1 to 1) and purified by column chromatography (silica gel), eluting with 100 ml of a mixture of DCM and hexane (at a respective volume ratio of 1 to 1). The solvents were removed under reduced pressure and the solid dissolved in THF (10 ml). Precipitation into methanol (100 ml) yielded a product which was dried under vacuum at 70° C., to give, as a pale yellow solid, a further sample of the title polymer as a material [B] (1.8 g), which was characterised as follows: Cl content<0.5% w/w.

Example 26

Monomer to End Capping Reagent Mole Ratio of 1 to 0.05; Initial Amount of End Capping Reagent ('G') Added to 2 Hours after Monomer ('F')

Bis-(N-4-chlorophenyl)-2,4-dimethylphenylamine monomer [prepared as described in Example 3(a)] as the monomer and 1-chloro-3-methylbenzene (as the end capping reagent) were used in the previously described Standard Method with reference to Table 4 where the reaction vessel was a 500 ml 4-neck reaction flask [except that, the monomer was added as a solution in anhydrous N,N-dimethylacetamide (50 ml) and the initial end capping reagent ('G') was added 2 hours later; and the reaction mixture was heated for 16 hours after final addition of end capping reagent]. The reaction mixture thus obtained was treated as described below to obtain the title polymer.

The reaction mixture was allowed to cool to room temperature and then was added to a stirred mixture of concentrated hydrochloric acid (50 ml) and DCM (300 ml). The organic layer was separated then washed several times with distilled water. The solvents were removed under reduced pressure to yield a yellow oil. The resulting oil was dissolved in THF (50 ml) and added dropwise to methanol (500 ml). The resulting off-white precipitate was collected to afford a product which was dried under vacuum at 70° C., to give, as an off-white solid, the title polymer (8.2 g), which was characterised as follows: $M_n$=4,100 daltons; and m=15.

Example 27

Monomer to End Capping Reagent Mole Ratio of 1 to 0.05; Initial Amount of End Capping Reagent ('G') Added Simultaneously With Monomer ('F')

Bis(N-4-chlorophenyl)-2,4-dimethylphenylamine monomer [prepared as described in Example 3(a)] as the monomer and 1-chloro-3-methylbenzene (as the end capping reagent) were used in the previously described Standard Method with reference to Table 4 where the reaction vessel was a 500 ml 5-neck reaction flask [except that the monomer and the end capping reagent were added together as a solution in anhydrous toluene (100 ml); and the reaction mixture was heated for a total of 22 hours; and no further end capping reagent ('J') was added]. The reaction mixture thus obtained was treated as described below to obtain the title polymer.

The reaction mixture was allowed to cool to room temperature, diluted with DCM (300 ml), then hydrochloric acid (5 M, 160 ml) was added cautiously over 30 minutes. The resulting mixture effervesced. The organic layer was separated and washed successively with sodium hydroxide solution (0.5 M, 200 ml) then distilled water (200 ml). The organic layer was filtered, under vacuum, through a pad of silica to remove any residual solids, and was washed through with DCM (200 ml). The excess solvents were removed under reduced pressure to yield a yellow oil. The resulting oil was dissolved in THF (100 ml) and poured into methanol (500 ml). The resulting precipitate was collected, by vacuum filtration, and the THF/methanol precipitation (as described previously) was repeated. The resulting product was dissolved in 400 ml of a mixture of DCM and hexane (in a respective volume ratio of 1 to 1) and purified by column chromatography (silica gel), eluting with 400 ml of a mixture of DCM and hexane (in a respective volume ratio of 1 to 1). The excess solvent was removed and the THF/methanol precipitation (as described previously) was repeated to yield a product which was dried under vacuum at 70° C., to give, as a colourless solid, the title polymer (19.0 g), which was characterised as follows: $M_n$=4,000 daltons; m=14; Tg=170° C.; and Cl content=0.7% w/w.

Example 28

Monomer to End Capping Reagent Mole Ratio of 1 to 0.1; Initial Amount of End Capping Reagent ('G') Added Simultaneously With Monomer ('F')

Bis(N-4-chlorophenyl)-2,4-dimethylphenylamine monomer [prepared as described in Example 3(a)] as the monomer and 1-chloro-3-methylbenzene (as the end capping reagent) were used in the previously described Standard Method with reference to Table 4 where the reaction vessel was a 500 ml 5-neck reaction flask [except that; the monomer and initial end capping reagent were added together as a solution in anhydrous toluene (100 ml); and the reaction mixture was heated for 2 hours after final addition of end capping reagent. The reaction mixture thus obtained was treated as described below to obtain the title polymer.

The reaction mixture was allowed to cool to room temperature, diluted with DCM (300 ml), then hydrochloric acid (5 M, 160 ml) was added cautiously over 30 minutes. The resulting mixture effervesced. The organic layer was separated and washed with sodium hydroxide solution (0..5 M, 200 ml). The organic layer was filtered, under vacuum, through a pad of silica to remove any residual solids. The excess solvents were removed under reduced pressure to yield a yellow oil. The resulting oil was dissolved in THF (50 ml) and poured into methanol (500 ml). The resulting precipitate was collected, by vacuum filtration, dissolved in DCM (200 ml) and washed several times with distilled water. The excess solvent was removed and the THF/methanol precipitation (as described previously) was repeated. The resulting product was dissolved in 400 ml of a mixture of DCM and hexane (in a volume ratio of 1 to 1) and purified by column chromatography (silica gel), eluting with 400 ml of a mixture of DCM and hexane (in a volume ratio of 1 to 1). The excess solvent was removed and the THF/methanol precipitation (as described previously) was repeated to yield a product which was dried under vacuum at 70° C., to give, as a pale yellow solid, the title polymer (15.0 g), which was characterised as follows: $M_n$=3,600 daltons; m=13; and Cl content<0.5% w/w.

Example 29

Monomer to End Capping Reagent Mole Ratio of 1 to 1; Initial Amount of End Capping Reagent ('G') Added to 2 Hours After Monomer ('F')

The polymer was prepared exactly as described in Example 26, but with reference to Table 4, to give the title polymer (7.7 g), which was characterised as follows: $M_n$=1,300 daltons; and m=4.

Example 30

Monomer to End Capping Reagent Mole Ratio of 1 to 1; Initial Amount of End Capping Reagent ('G') Added Simultaneously With Monomer ('F')

The polymer was prepared exactly as described in Example 26, but with reference to Table 4, (except that, the initial amount of end capping reagent was added at the same time as the monomer) to give the title polymer (6.5 g), which was characterised as follows: $M_n$=1,000 daltons; and m=3.

Example 31

Monomer to End Capping Reagent Mole Ratio of 1 to 2; Initial Amount of End Capping Reagent ('G') Added to 2 Hours After Monomer ('F')

The polymer was prepared exactly as described in Example 26, but with reference to Table 4, to give the title polymer (7.6 g), which was characterised as follows: $M_n$=1,200 daltons; and m=4.

Example 32

Monomer to End Capping Reagent Mole Ratio of 1 to 2; Initial Amount of End Capping Reagent ('G') Added Simultaneously With Monomer ('F')

The polymer was prepared exactly as described in Example 26 but with reference to Table 4, (except that, the initial amount of end capping reagent was added at the same time as the monomer) to give the title polymer (8.2 g), which was characterised as follows: $M_n$=700 daltons; and m=2.

The applicant has tried to prepare non end capped equivalents of the end capped polymers exemplified herein as Comparative Example I and II (e.g. for use in comparative tests). However without use of an end capping reagent during preparation the polymerisation step was uncontrolled and the applicant was unable to produce such (non end capped) polymers in a form which could be formulated in a CTL and tested as described herein. Small, non end capped triarylamine oligomers (n is from 4 to 10) have been prepared and tested as CTMs but show unremarkable properties (see the paper by Kocheleva et al, described in the prior art section, previously).

This is indicative of the disincentives that a person skilled in the art faced when considering whether triarylamine polymers might be useful as improved CTMs. The prior art teaches that small triarylamines oligomers prepared in a conventional manner (i.e. without end capping) are no better as CTMs than TPD. The applicant has discovered, that if similar polymers are prepared conventionally (again without end capping) with a large molecular weight they cannot be made in a form suitable for a CTM. These difficulties would have deterred a skilled person from considering a triarylamine polymer might be an improved CTM. There is no suggestion in the prior art to use end capping reagents during polymerisation to make these polymers or that the polymers so produced would exhibit the improved properties shown herein.

Test Methods used in the following experiments.

The effectiveness in electroreprography of polymers of the invention was demonstrated as follows. Certain of the exemplified polymeric CTMs were used to prepare various photoreceptors, the electroreprographic performance of which was tested by the following conventional electroreprographic test methods.

Test Method 1

Measurement of Photo-Induced Decay Curves (PIDC)

A number of electrophotographic photoreceptors were prepared as described below using the CGL prepared using Test Method 1.1 in combination with various CTLs of the invention or (as a comparison) a prior art CTL. In each experiment the absolute quantities of materials used to prepare each photoreceptor were sometimes varied from those given below but the relative amount of each component was fixed unless otherwise specified in the body of an example.

1.1 Preparation Of Charge Generation Layer (CGL)

Titanyloxy phthalocyanine (TIOPc) type IV (15.0 g) was dispersed into a 5% w/w solution of polyvinyl butyral (PVB) in n-butyl acetate (75.0 g) using a high shear mixer. A further quantity of n-butyl acetate (20.0 g) was added to the dispersion to reduce its viscosity. The resulting slurry was charged to an Eiger Mini 50 Motormill (supplied by Eiger Torrance Ltd.) containing a charge (34 ml) of 0.6 to 0.8 mm zirconia beads. The mill was operated at 3,000 rpm for 50 minutes. PVB solution (25.0 g, 5% w/w in n-butyl acetate) was added to the millbase and milling was continued for a further 10 minutes. The millbase was discharged into a receiving vessel and PVB solution (61.5 g) was added to the mill and circulated for 5 minutes. The solution was then discharged into the millbase which was stirred throughout to prevent pigment agglomeration and n-butyl acetate (349.0 g) was flushed through the bead mill and out into the stirred

TABLE 4

("2,4-dimethyl monomer" with various amounts of 1-chloro-3-methylbenzene to control $M_n$)

| Ex | A | B | C | D | E | F | G | H | J |
|----|---|---|---|---|---|---|---|---|---|
| 25 | 0.3 g | 16.3 g | 0.5 g | 5.3 g | 100 ml | 27.4 g | 0.1 g | 20 hr | none |
| 26 | 0.1 g | 5.8 g | 0.2 g | 1.8 g | 50 ml | 10.0 g | 0.2 g | 5 hr | 3.5 g |
| 27 | 0.3 g | 16.3 g | 0.5 g | 5.3 g | 100 ml | 27.4 g | 0.5 g | 22 hr | none |
| 28 | 0.3 g | 16.3 g | 0.5 g | 5.3 g | 100 ml | 27.4 g | 1.0 g | 7 hr | 2.0 g |
| 29 | 0.1 g | 5.9 g | 0.2 g | 1.8 g | 50 ml | 10.0 g | 3.7 g | 5 hr | 3.5 g |
| 30 | 0.1 g | 5.9 g | 0.2 g | 1.8 g | 50 ml | 10.0 g | 3.7 g | 5 hr | 3.5 g |
| 31 | 0.1 g | 5.9 g | 0.2 g | 1.8 g | 50 ml | 10.0 g | 7.4 g | 5 hr | 3.5 g |
| 32 | 9.1 g | 5.9 g | 0.2 g | 1.8 g | 50 ml | 10.0 g | 7.4 g | 5 hr | 3.5 g | dispersion to yield a CGL coating formulation of PVB (1.48%), TiOPc (2.75%) and n-butyl acetate (95.77%).

The dispersion was coated onto aluminised Melinex film using a k#2 and K Control coater model 202 (supplied by RK Print-Coat Industries Ltd.). The coating was dried for 5 minutes at 100° C. to produce a CGL which was approximately 0.4 μm thick.

1.2 Preparation of a Charge Transport Layer (CTL) of the invention

A formulation comprising a polymeric CTM of the invention was prepared using an amount of a polymeric CTM and (optionally) another CTM as specified below (e.g. in the Tables). If not otherwise specified herein 0.5 g of CTM was used (equivalent to 25% CTM in the CTL) in the following preparation. The polymeric CTM and polycarbonate resin (1.5 g of the PCZ available commercially from Esprit Chemical Co. under the trade designation TS 2020) were dissolved in toluene (7.1 g). This solution was coated on top of the CGL made as described above, using a 150 μm wet film depositing bar and K Control coater. The coating was dried for 90 minutes at 100° C. to give a CTL which was approximately 25 μm thick. The CTL thickness was measured using an Elcometer E 300 device.

1.3 Preparation of a prior art comparative CTL

The following coating solution was prepared as a comparison using the well-known CTM: bis(N,N'-3-methylphenyl)bis(N,N'-phenyl)-1,1'-(biphenyl)-4,4'-diamine (TPD). TPD (3.3 g), PCZ (5.0 g) and THF (29.5 g) were mixed together to form a solution. This solution was coated on top of the CGL prepared as described above, using a 150 μm wet film depositing bar and K Control coater. The coating was dried for 90 minutes at 100° C. to give a CTL which was approximately 25 μm thick. The CTL thickness was measured using an Elcometer E 300 device. The CTL comprised 40% CTM. A comparative device was freshly prepared for testing with each series of polymeric CTM samples.

1.4 Electrical testing to evaluate photo-induced discharge curves (PIDC)

A photoreceptor test piece of approximately 5×10 cm was cut out from the coated aluminised Melinex prepared as described above. The test piece was then fixed to a bare aluminium drum (used as the substrate for an OFC), 30 mm in diameter. Two small areas of coating were removed from the edge of the test piece using a suitable solvent. The test piece was then electrically connected to the drum using a suitable conductive paint. The drum was then mounted in a QEA PDT 2000 device (available commercially from Quality Engineering Associates Inc. Burlington Mass. 01803 USA) and was grounded via the contact in the QEA instrument. The QEA PDT 2000 was fitted with a 780 nm band pass filter. A track with a consistent 800 V charge of at least 10 mm length was selected using the charge scanner. Once the track had been selected the PIDC was measured in the known manner. A typical PIDC curve for invention CTLs is shown in FIG. 1, and was generated using the CTL formulation made in Experiment 7e herein (see also Table 11). The surface potential $V_c$ (V), the half decay exposure $E_{1/2}$ ($\mu Jcm^{-1}$) and the seven eighths decay exposure $E_{7/8}$ ($\mu Jcm^{-2}$) were measured together with the residual potential V, (V) after an exposure of 2 $\mu Jcm^{-2}$. Low values for $E_{1/2}$, $E_{7/8}$ and $V_P$ are desirable in a CTM as they indicate efficient discharge of the device on exposure to light. The reliability of the test method and accuracy of the equipment was checked by testing a freshly prepared comparative CTL (fabricated as described in Test Method 1.3) for each measurement.

Test Method 2

Time of flight (TOF) experiment to measure zero field mobility ($\mu_0$)

A number of electrophotographic photoreceptors were prepared in a similar manner to that described above for the PIDC experiments.

2.1 Preparation of CGL

The method described above (in Test Method 1.1) was used to prepared a CGL. The CGL layer promotes adhesion of the CTL to the substrate and may also be used to generate excess charge carriers during the TOF measurement

2.2 Preparation of CTL

The method described above (in Test Method 1.2 and Test Method 1.3) for preparation of both invention and comparative CTLs, was followed except that a K #8 bar was used to apply the coating so that the dry film thickness of the CTL was approximately 15 μm. If otherwise not stated a 25% concentration (by mass) of CTM was used to 75% PCZ in the solid CTL.

2.3 Electroding

A semi-transparent aluminium electrode of approximately 30×5 mm was applied to the top of a section of the film by vacuum deposition. A small portion of the CGL and CTL (prepared as described above) close to the top electrode, was removed with a suitable solvent to reveal the bottom electrode. The electrodes were connected to a power supply and a digitising oscilloscope.

2.4 Hole carrier transit-time measurement

A field was applied across the sample via the electrodes and a sheet of charge carriers (holes) was photogenerated at one side of the film. The charge carriers drifted through the film under the influence of the field creating a current which was detected using a current amplifier connected to the oscilloscope. When the carriers reached the counter electrode, the current was observed to decrease and the transit-time across the film could thereby be determined from the transit waveform. The measurement was repeated with a range of different applied voltages.

2.5 Determination of zero field mobility ($\mu_0$)

The drift mobility of carriers ($\mu$) was calculated for each applied field (=V/L) using the equation $$\mu = L^2/Vt_r.$$

where L is the device thickness, V is the applied voltage and $t_r$ is the transit time. A plot of log $\mu$ versus $(V/L)^{1/2}$ was produced with a best line fit. The best line fit was extrapolated to zero field and $\mu_0$ determined.

Experiment 1

Table 5 shows the electrical properties of CTLs in Test Methods 1 (PIDC) and 2 (TOF) as described herein as a function of different repeat units in the polymeric CTM. All CTL formulations tested were 25% w/w CTM in PCZ binder unless otherwise indicated.

TABLE 5

| CTM Ex | $E_{7/8}$ ($\mu Jcm^{-2}$) | $V_f$ (V) | $\mu_0$ ($cm^2V^{-1}s^{-1}$) | Repeat unit |
|---|---|---|---|---|
| 1[1] | 0.28 | 39 | NP | "3-Me" |
| 2[1] | 0.28 | 27 | $4 \times 10^{-7}$ | "4-Me" |
| 3 | 0.38 | 40 | $1 \times 10^{-5}$ | "2,4-diMe" |
| 5[2] | ND | 218 | $4 \times 10^{-5}$ | "3-CF$_3$" |
| 7 | 0.23 | 19 | $2 \times 10^{-6}$ | "2,6-diMe" |
| 8[1] | ND | 101 | $2 \times 10^{-5}$ | "3-OMe" |
| 9[B] | 0.35 | 20 | $7 \times 10^{-7}$ | "4-OEt" |
| 10 | ND | 101 | $2 \times 10^{-7}$ | "2'-Me/2,4-diMe" |

Footnotes
[1]The PIDC test was performed on a CTL of 40% w/w CTM in APEC 9202 binder.
[2]The PIDC test was performed on a CTL of 40% w/w CTM in PCZ binder.
ND Denotes the CTL did not discharge in the PIDC test.
NP Denotes that test was not performed on that CTL.

Experiment 2

Table 6 shows the electrical properties of CTLs in Test Methods 1 (PIDC) and 2 (TOF) as described herein as a function of different terminal groups on the polymeric CTM. All CTL formulations tested were 25% w/w CTM in PCZ binder. The column headed "End capping reagent" denotes the pattern of substitution, if the end capping reagent used was a substituted benzene compound.

TABLE 6

| CTM Ex | $E_{7/8}$ ($\mu Jcm^{-2}$) | $V_f$ (V) | $\mu_0$ ($cm^2V^{-1}s^{-1}$) | End capping reagent |
|---|---|---|---|---|
| 12 | 0.38 | 46 | $3 \times 10^{-7}$ | "1-Me-4-Cl" |
| 13 | 0.33 | 14 | $4 \times 10^{-8}$ | "1-Me-3-CF$_3$" |
| 14 | 0.34 | 21 | $4 \times 10^{-8}$ | "1-Cl-3-OMe" |
| 15 | 0.32 | 22 | $2 \times 10^{-5}$ | "1-Br-2,4-diMe" |
| 16 | 0.37 | 39 | NP | Ex 16(a) |
| 17 | 0.32 | 13 | $1 \times 10^{-5}$ | "1-Br-4-$^t$Bu" |
| 18 | NP | NP | $3 \times 10^{-7}$ | "Cl" |
| Comp I | X | X | X | None |

Footnotes
NP Denotes that test was not performed on that CTL.
X Denotes that the equivalent (non end capped) linear polymer (Comp I) could not be made into a CTL for use in these tests.

Experiment 3

Table 7 shows the electrical properties of CTLs in Test Methods 1 (PIDC) and 2 (TOF) as described herein, as a function of different degrees of chain branching in the polymeric CTM ("2,4-dimethyl polymer"), produced by using different amounts of a trichloro functional monomer ("tris") as described in the Examples. All CTL formulations tested were 25% w/w CTM in PCZ binder.

TABLE 7

| CTM Ex | $E_{7/8}$ ($\mu Jcm^{-2}$) | $V_f$ (V) | $\mu_0$ ($cm^2V^{-1}s^{-1}$) | tris |
|---|---|---|---|---|
| 19[A] | 0.35 | 49 | $6 \times 10^{-8}$ | 2% |
| 19[B] | 0.24 | 10 | NP | 2% |
| 20[A] | 0.32 | 39 | NP | 5% |
| 20[B] | 0.44 | 40 | NP | 5% |
| 20[C] | 0.28 | 15 | $1 \times 10^{-6}$ | 5% |
| 21[A] | 0.52 | 56 | NP | 8% |
| 21[B] | 0.26 | 12 | $4 \times 10^{-6}$ | 8% |
| Comp II | X | X | X | — |

Footnotes
NP Denotes that test was not performed on that CTL.
X Denotes that the equivalent (non end capped) branched polymer (Comp II) could not be made into a CTL for use in these tests.

Experiment 4

Table 8 shows the electrical properties of CTLs in Test Methods 1 (PIDC) and 2 (TOF) as described herein, as a function of the molecular weight of the polymeric CTM. Molecular weight was varied by using different ratios of monomer to end capping reagent to prepare the polymers, as described in the Examples. All CTL formulations tested were 25% w/w CTM in PCZ binder unless otherwise specified. The specific trends observed in Table 8 may be specified to the particular polymer type, formulation and preparative route. However, it can be seen that invention polymers of this type are much improved CTMs compared to a prior art CTM (TPD) over a whole range molecular weights.

TABLE 8

| CTM Ex | $M_n$ | m | $E_{7/8}$ ($\mu Jcm^2$) | $V_F$ (V) | $\mu_0$ ($cm^2V^{-1}s^{-1}$) | Ratio | Delay in 1$^{st}$ end capping reagent |
|---|---|---|---|---|---|---|---|
| 25 [A] | 5,400 | 19 | ND | 140 | NP | 1:0.01 | 0 |
| 25 [B] | 5,400 | 19 | 0.24 | 30 | $2 \times 10^{-6}$ | 1:0.01 | 0 |
| 26 | 4,100 | 15 | NP | NP | NP | 1:0.05 | 2 hr |
| 27 | 4,000 | 14 | 0.24 | 7 | $2 \times 10^{-5}$ | 1:0.05 | 0 |
| 28[1] | 3,800 | 13 | 0.35 | 9 | $3 \times 10^{-6}$ | 1:0.1 | 0 |
| 3(b) | 1,800 | 6 | 0.38 | 40 | $1 \times 10^{-5}$ | 1:0.5 | 0 |
| 29 | 1,300 | 4 | NP | NP | NP | 1:1 | 2 hr |
| 30 | 1,000 | 3 | NP | NP | NP | 1:1 | 0 |
| 31 | 1,200 | 4 | NP | NP | NP | 1:2 | 2 hr |
| 32 | 700 | 2 | NP | NP | NP | 1:2 | 0 |

Footnotes
[1]The PIDC test was performed on a CTL of 20% w/w CTM in PCZ.
ND Denotes the CTL did not discharge in the PIDC test.
NP Denotes that test was not performed on that CTL.

Experiment 5

A further series of OPC devices were prepared (with a CTL of 25% w/w polymeric CTM in PCZ) using bis(N-4-chlorophenyl)-2,4-dimethylphenylamine polymers of varying molecular weight, prepared analogously to similar polymers as described herein. The PIDC values are given in Table 9 below.

TABLE 9

| $M_0$ (daltons) | m | $E_{7/8}$ ($\mu J/cm^2$) | $V_f$ (V) |
|---|---|---|---|
| 14,500 | 53 | ND | 799 |
| 13,600 | 50 | ND | 798 |
| 13,100 | 48 | ND | 800 |
| 11,500 | 42 | ND | 800 |
| 10,900 | 39 | 0.52 | 60 |
| 9,800 | 35 | 0.34 | 34 |
| 8,700 | 31 | 0.32 | 19 |
| 7,700 | 28 | 0.33 | 23 |
| 6,700 | 24 | 0.31 | 19 |
| 5,600 | 20 | 0.38 | 29 |
| 5,100 | 18 | 0.38 | 25 |
| 4,500 | 16 | 0.40 | 41 |
| 3,400 | 8 | 0.42 | 44 |
| 1,100 | 3 | ND | 225 |

Footnotes
ND Denotes the CTL did not discharge in the PIDC test.

PIDC results, particularly $V_f$ values, in Table 9 (and which are plotted in FIG. 2 herein) illustrate the desirability of being able to control the m value of polymeric CTMs of the present invention for electrophotographic applications. For devices formulated in this CTL with this polymeric CTM the results in Tables 8 and 9 show application performance improving with increasing m until a plateau is reached over the range for m from 24 to 31. For m values above 31 there is a deterioration in performance which becomes very abrupt when m reaches 42. It was found that for this CTM in this CTL formulation, polymers which had m values above 42 failed to discharge. This illustrates the desirability of being able to readily control the m value of polymeric CTMs of the present invention. Methods for exercising such control by addition of specific amounts of end capping reagent are exemplified herein (see Examples 25 to 32).

The trend observed in Table 9 may be specified to the particular polymers tested as they comprise specific repeat units and specific terminal groups; are made using a specific process; and are formulated in a specific manner. However, again it can be seen that invention polymers of this type are much improved CTMs compared to a prior art CTM (TPD) over a wide range molecular weights.

Experiment 6

A further series of OPC devices were prepared (with a CTL of 25% w/w polymeric CTM in PCZ) using bis(N-4-chlorophenyl)-2,4-dimethylphenylamine polymers of varying molecular weight, prepared analogously to similar polymers as described herein. The TOF values are given in Table 10 below.

TABLE 10

| $M_0$ (daltons) | m | $\mu_0$ (cm$^2$/V$_s$) |
|---|---|---|
| 3800 | 13 | $1 \times 10^{-5}$ |
| 3200 | 11 | $8 \times 10^{-8}$ |
| 2300 | 8 | $4 \times 10^{-6}$ |
| 1600 | 5 | $2 \times 10^{-6}$ |
| 1500 | 5 | $1 \times 10^{-5}$ |
| 1100 | 3 | $4 \times 10^{-7}$ |

Zero field mobility results ($\mu_0$) contained in Table 10 (and which are also plotted in FIG. 3 herein) demonstrate the influence that the average number of repeat units (m) in the polymer chain has on the CTM's performance. It can be seen that the $\mu_0$ of this CTL increases almost exponentially with m over the range disclosed (for the particular polymeric CTM used and in the particular CTL formulation tested). Examples 25 to 32 herein teach how m can be controlled by adjusting the ratio of monomer to end capping reagent and it can be concluded that this will allow the performance of the CTM to be tailored to the application requirement.

The trend observed in Table 10 may also be specific to the polymers tested for the reasons given in Experiment 5. However, yet again the data shows that polymers of this type are improved CTMs compared to a prior art CTM (TPD) considering the low concentration (25% w/w) polymeric CTM used in CTL (see also Experiment 7).

Experiment 7

Electrical results as function of CTM concentration

A polymeric CTM prepared similarly to that in Example 3(b) herein was formulated and fabricated into a series of OPC devices for the PIDC experiments as described in Test Method 1 herein, but the CTM concentration in the CTL was varied in 5% increments between 5% and 50% w/w. The comparative device using TPD as the CTM (at 40% w/w in the CTL) was produced as described above (in Test Method 1.3). A further comparative device was similarly produced but with the CTL comprising 25% TPD in Lexan 181 (polycarbonate A supplied by GE Plastics). The devices were tested as described in Test Method 1.4 and yielded the results tabulated below in Table 11. The effect of CTM loading on the residual potential is also plotted in FIG. 4.

In similar manner to that above, polymeric CTM prepared similarly to that in Example 3(b) herein was formulated and fabricated into a series of OPC devices for the TOF experiments as described above (in Test Method 2) but the CTM concentration in the CTL was varied in 5% increments between 5 and 50% w/w. The comparative device using TPD as the CTM (at 40% w/w in the CTL) was produced as described above. The devices were tested as described in Test Methods 2.3 to 2.5 and yielded the results also tabulated below in Table 11.

TABLE 11

| Expt. ref. | CTM content (%) | $E_{7/8}$ ($\mu Jcm^{-2}$) | $V_f$ (V) | $\mu_0$ (cm$^2$V$^{-1}$s$^{-1}$) |
|---|---|---|---|---|
| 7a | 5 | NR | 789 | NP |
| 7b | 10 | NR | 590 | $1 \times 10^{-7}$ |
| 7c | 15 | 0.35 | 66 | $4 \times 10^{-7}$ |
| 7d | 20 | 0.34 | 31 | $1 \times 10^{-6}$ |
| 7e[1] | 25 | 0.28 | 42 | $4 \times 10^{-5}$ |
| 7f | 30 | 0.25 | 30 | $9 \times 10^{-6}$ |
| 7g | 35 | 0.30 | 36 | $2 \times 10^{-5}$ |
| 7h | 40 | 0.32 | 21 | $3 \times 10^{-5}$ |
| 7i | 45 | 0.31 | 34 | $4 \times 10^{-5}$ |
| 7j | 50 | 0.24 | 30 | $6 \times 10^{-8}$ |
| Comp III | 40 | 0.32 | 32 | $2 \times 10^{-6}$ |
| Comp IV | 25 | NR | 153 | NP |

Footnotes
All CTLs tested in Table 11 use Example 3(b) as the CTM except Comparative Examples III and IV which use TPD.
[1]The PIDC of this CTL is shown in FIG. 1 herein.
NR Denotes that the $E_{7/8}$ point was not reached during the PIDC test
NP Denotes that test was not performed on that CTL.

It can be seen from Table 11 and FIG. 4 [e.g. by comparing the PIDC performance of 20% of Example 3(b) with 40% TPD] that polymeric CTMs of the present invention can give a similar discharge to comparative examples using TPD as the CTM but achieve this with a much lower loading of CTM. It can also be seen that the OPC devices formulated with 15 to 25% of polymeric CTM of the present invention give superior discharge properties to the comparative example (Comp IV) formulated with 25% of TPD.

It also can be seen from Table 11 that films dropped with 20 to 25% of the polymeric CTMs of the present invention can have hole transport mobilities comparable to those of films doped with 40% of the prior art CTM (TPD). It can also be seen that the zero field mobility of a film doped with 40% of the polymeric CTM of the present invention can be more than an order of magnitude greater than that of a film doped with 40% of the prior art CTM (TPD).

Therefore the exemplified end capped polymers are much more effective as CTMs than prior art small molecule CTMs.

Experiment 8

CTL layers using the mixture of "4-methyl polymer" and "2,4-dimethyl polymer".

Polymeric CTMs prepared similarly to those in Examples 2(b) and 3(b) herein were formulated and fabricated into an OPC device which was subjected to TOF measurement as described above (Test Method 2) except that both these CTMs were incorporated into (the same CTL at 12.5% w/w each. The zero field mobility ($\mu_0$) of the device was found to be $2\times10^{-6}$ cm$^2$V$^{-1}$s$^{-}$, which is similar to $\mu_0$ of TPD at 40% w/w ($2\times10^{-6}$ cm$^2$V$^{-1}$s$^{-1}$) but is achieved with a much lower total loading of CTM (25% w/w). This demonstrates that mixtures of different polymeric CTMs of the present invention can be used in OPC formulations and also show advantage over prior art CTMs.

Experiment 9

Measurement of photoreceptor abrasion resistance

A number of electrophotographic photoreceptors were prepared in order to evaluate their abrasion resistance. For the preparation of the CGL the method described above in Test Method 1.1 was followed except that the formulation was coated onto a 100 mm square aluminium panel with rounded corners and centrally located 6.3 mm diameter hole. The CGL layer promotes adhesion of the CTL of the substrate.

CTL solutions were formulated using polymeric CTM prepared as in Example 3(b) herein and PCZ (supplied by Espirit Chemical Co. under the trade designation TS 2040) by dissolving them in THF, in the proportions indicated in Table 12 so that the total solids content of the formulation was 30% w/w. The solutions were coated onto the CGL prepared as described above, using a No. 400 sheen bar. The resultant film was allowed to stand at room temperature for one hour, then dried in the oven for two hours at 50° C. The temperature was then raised to 90° C. and maintained for 48 hours. The thickness of the resultant dry film was approximately 50 μm. A comparative sample, containing 40% TPD was prepared in the same way.

Test panels were placed in a Taber abraser fitted with two CS 10 wheels. The instrument was allowed to run over the sample for 2,500 abrasion cycles. The instrument was stopped after every 100 cycles and the sample weight was measured. The wear rate (and hence durability of the photoreceptor) was monitored by weight loss. A similar test method is disclosed in the Annual book of ASTM Standards volume 6.01 1998 (ASTM D 4080–95). The results are tabulated below in Table 12.

TABLE 12

| Expt. Ref. | CTM concentration (% w/w) | weight loss after 2,500 cycles (mg) |
|---|---|---|
| 9a | 15 | 40 |
| 9b | 25 | 43 |
| 9c | 40 | 52 |
| Comp V | 40 | 79 |

Footnote
All CTLs tested in Table 12 used Example 3(b) as the CTM except Comp V which used TPD.

The Taber test results are also shown in FIG. 5, where the weight loss is plotted against the number of abrasive cycles. It can be seen that CTLs formed with the polymeric CTM are much more durable (exhibit much less weight loss) than prior art CTLs formed with a conventional small molecule CTM (TPD).

Experiment 10

Wear rate of OPC devices during printing

Various types of photoreceptor drums were prepared using the polymeric CTM of the present invention in order to assess their print performance and durability. Comparative devices with the prior art CTM (TPD) were also tested.

10a EX type drum with a CTL of 25% polymeric CTM

A 30 mm diameter anodised aluminium drum was dip coated with a 2% solution of Namarichi FR104 resin in butanol solvent to produce a submicron barrier layer. The dip coating technique for OPC manufacturing is well known to those skilled in the art (e.g. U.S. Pat. No. 5,279,916, Canon; EP 0314 497 A2. Sharp). Onto this barrier layer a CGL was dip coated from a dispersion containing TiOPc type IV pigment and polyvinyl butyral resin in the ratio 2:1 w/w in n-butyl acetate solvent. The CGL coating with 0.5 μ thick after drying. A CTL containing 25% polymeric CTM [prepared similarly to that in Example 3(b) herein] in 75% PCZ was dip coated from a THF solution, to yield, after drying, a 25 μ thick layer.

The OPC drum was fitted in a Hewlett Packard Laserjet 5 printer and standard test images, generated by an Anacom Smartbox, were printed. The photoreceptor was removed every 1,000 pages for inspection and the CTL thickness was measured in order to evaluate the loss due to abrasion. The thickness was determined by an Elcometer E 300 type digital instrument. After 18,000 pages the CTL had lost approximately 4 μm (16%) of its thickness.

10b Wx type drum with a CTL of 25% polymeric CTM

A photoreceptor drum was prepared by dip coating as described in Experiment 10a above except a CGL dispersion based on TiOPc type I as the CGM and a longer, anodised drum were used. The OPC drum was fitted into a Hewlett Packard Laserjet 5Si type printer. The photoreceptor was print tested for 30,000 pages in a similar manner to the method described in Experiment 10a above, which the CTL lost about 4 μm of its thickness.

Comp IV Comparative EX type drum with a CTL of 40% TPD

A photoreceptor drum was prepared as described in Experiment 10a above except the CTL was coated from a solution of 40% TPD and 60% PCZ in THF. The OPC drum was tested in a similar manner to the method described in Experiment 10a above. After 16,000 pages the CTL had lost about 8 μm (32%) of its thickness.

Comp VII Comparative WX drum with a CTL of 40% TPD

A photoreceptor was prepared and tested as described in Example 46c except the CTL was coated from the 40%

TPD/60% PCZ solution used in comparative example Comp VI above. The photoreceptor was tested in a similar manner to the method described in Experiment 10a above. The CTL lost about 7 μm of its thickness after 30,000 points.

Experiment 11

Measurement of the glass transition temperature ($T_g$) of various CTL formulations Polymeric CTM prepared similarly to that in Example 3(b) herein was dissolved in THF with PCZ to produce a number of solutions of 25% total solids content. The proportions of PCZ to CTM used are tabulated below in Table 13 (Experiments 11a to 11f). The solutions were coated onto aluminium Q panels using a K#10 bar then dried in an oven for 2 hours at 90° C. to achieve dry film thickness of approximately 30 μm. The glass transition temperature of the film samples were determined using the Perkin Elmer 7 series thermal analysis system. All the samples were heated from 20° C. to 200° C. at rate of 10° C. per minute, fast cooled and reheated until the glass transition temperature was observed. Measurements were repeated until a reproducible $T_g$ value was obtained Table 13 below lists $T_g$ values determined for CTL compositions with different loading of the polymeric CTM.

Comparative Examples using TPD instead of the polymeric CTM were prepared and tested in as similar manner (Experiments 11 g to 11 m). Glass transition temperature characteristic for these are also presented in Table 13 below. In the column headed "Comp Tg (° C.)".

TABLE 13

| Expt. ref. | PCZ | Ex 3(b) | $T_g$ (° C.) | TPD | Comp. $T_g$ (° C.) |
|---|---|---|---|---|---|
| 11a/11g | 100 | 0 | 184 | 0 | 184 |
| 11b/11h | 90 | 10 | 150 | 10 | 148 |
| 11c/— | 80 | 20 | 154 | 25 | NP |
| —/11i | 75 | NP | NP | 25 | 120 |
| 11d/11j | 70 | 30 | 151 | 30 | 106 |
| —/11k | 60 | NP | NP | 40 | 98 |
| 11e/11l | 50 | 50 | 150 | 50 | 1 |
| 11f/11m | 0 | 100 | 157 | 100 | 69 |

Footnotes
NP This formulation was not prepared
[1]$T_g$ not measured due to servere crystallisation of TPD in the coated film From these results it can be seen that the $T_g$ of a pure polymeric CTM of the invention [Example 3(b)] is 157° C., only 27° C. below the $T_0$ of the pure PCZ binder resin at 184° C. Thus when the binder and polymeric CTM are mixed to form a CTL of the invention the $T_g$ of such mixtures are not significantly lower than their polymeric components, leading to a more durable CTL. By comparison, and as can be seen from Table 13 the $T_g$ of a CTL comprising PCZ and a small molecule CTM (e.g. TPD) is lowered to a much greater degree for a given loading of CTM.

Experiment 12

Photoreceptors with polymeric CTM and various CTL binders

OPC devices were prepared in a similar manner to the method described above (see Test Method 1) using a CGL with TiOPc(IV) as the CGM (see Test Method 1.1), except that the coating solution and CTL compositions used were those tabulated below in Table 14. Comparative examples were also produced with TPD doped into the CTL at 25% and 40% w/w. The PIDC of each photoreceptor was measured as described above Test Method 1 and the results are set out in Table 14 below, where:

"Solids %" refers to the solids content of the solution in w/w %;

"$V_r$" denotes the residual potential of the CTL in volts;

"$PCA_{61}$" denotes a polycarbonate A resin available commercially GE Plastic under the tradename Lexan 161;

"APEC02" denotes a co-polycarbonate resin available commercially from Bayer under the trade designation APEC 9202; and "DCM" denotes dichloromethane.

TABLE 14

| Expt. ref. | CTL composition | Solvent | Solids % | $E_{7/8}$ μJcm$^{-2}$ | $V_f$ (V) |
|---|---|---|---|---|---|
| 12a | 25% Ex 3(b), 75% PCZ | toluene | 22.0 | 0.35 | 46 |
| 12b | 25% Ex 3(b), 75% APEC02 | toluene | 22.0 | 0.32 | 22 |
| 12c | 25% Ex 3(b), 75% PCA61 | DCM | 15.5 | 0.35 | 60 |
| Comp VIII | 25% TPD, 75% PCA61 | DCM | 15.6 | 1 | 153 |
| Comp IX | 40% TPD, 60% PCA61 | DCM | 15.5 | 0.29 | 24 |

Footnotes
[1]CTL exhibits insufficient discharge to measure $E_{7/8}$ value

Experiment 13

Photoreceptors with polymeric CTM and TiOPc(I) as the CGM

OPC devices were prepared in a similar manner to that described above in Test Method 1, except that the CGL was based on TiOPc(I). The CGL was formulated as in Test Method 1.1 except that TiOPc(I) was used in place of TIOPc(IV) and 1-methoxy-2-proponal replaced n-butyl acetate as the solvent used in the milling step. The CTL was prepared in an analogous manner to the method described above in Test Method 1.2 using the formulation set out above in Experiment 12c, Table 14. Comparative examples were produced with prior art CTLs (using TPD as the CTM) prepared in analogous manner to Test Method 1.3 with the formulations denoted by "Comp VIII" and "Comp IX" in Table 14.

The PIDC measurements on these TiOPc(I) based films were made as described in Test Method 1.3, with the exception that the exposure range was extended to 4.5 μJcm$^{-2}$. The results are tabulated below in Table 15.

TABLE 15

| Expt. ref. | CGM | CTM | CTL ref. | $E_{7/8}$ μJcm$^{-2}$ | $V_f$ (V) |
|---|---|---|---|---|---|
| 13 | TiOPc(l) | Ex 3(b) | 12c | 1.62 | 57 |
| Comp X | TiOPc(l) | TPD | Comp VIII | 4.24 | 98 |
| Comp XI | TiOPc(l) | TPD | Comp IX | 0.99 | 24 |

The comparative material, TPD, has to be used at much higher concentration (40% w/w TPD in Comp XI) in order to achieve comparable PIDC results to the polymeric CTM at 25%. The high loadings required with prior art CTMs may adversely affect the hardness of the CTL. High CTM concentrations (especially or small molecule CTMs like TPD) lower $T_g$ to a greater extent and hence further reduce durability of the device. At high CTM loadings there is also an increased tendency for the CTM to crystalline within the CTL leading to photoreceptor failure.

Experiment 14

Photoreceptors with dibromoanthanthrone (DBA) as the CGM

A CGL based on DBA was prepared as follows. DBA (1.5 g) was dispersed into a solution of 0.25 g polyvinyl butyral (available commercially from Sekisul under the trade designation (BM-S) in 10 ml cyclohexanone by milling in a Red Devil paint shaker with 3 mm glass beads. Milling was continued for two hours. The resulting slurry was diluted by addition of cyclohexanone (5 ml) before coating the mixture onto aluminised Melinex film was a K#0 bar and K Control coater. The layer was air dried for 10 minutes then oven dried for 5 minutes at 100° C. to produce a dry CGL film of approximately 0.5 µm thickness.

The CGL was overcoated with the particular CTLs referred to in Table 11 below, in an analogous manner to the method described above in Test Method 1.2 using the formulation set out in Example 12c, Table 14. Comparative examples were produced with prior art CTLs prepared in analogous manner to Test Method 1.3 with the formulations denoted by "Comp VIII" and "Comp IX" in Table 14.

The PIDC measurements on these DBA based films were carried out as described in Test Method 1.4, with the exception that the light was filtered through a 550 nm bandpass filter and the exposure range was extended to 5 µJcm$^{-2}$. The results are tabulated below. In Table 18.

TABLE 16

| Expt. ref. | CGM | CTM | CTL ref. | $E_{7/8}$ µJcm$^{-2}$ | V, (V) |
|---|---|---|---|---|---|
| 14 | DBA | Ex5(b) | 12c | 2.47 | 35 |
| Comp XII | DBA | TPD | Comp VII | 4.17 | 91 |
| Comp XIII | DBA | TPD | Comp IX | 1.60 | 25 |

It can be seen that TPD has to be used at the much higher (40%) concentration (Comp XIII) in order to achieve comparable PIDC results.

Further photoreceptor compositions

Further compositions which are suitable for making and/ or forming the CTLs of the invention are described in the tables below and can be prepared and tested as described herein. These compositions may also contain other suitable ingredients. The number in the column headed Ex. no. (not in parentheses) denoites the example number(s) of the polymer(s) of the invention to be used as the CTM in each composition (optionally together with other non-invention CTM(s) where specified). The numbers in parentheses denotes parts by mass of that ingredient in the composition and/or that the ingredients have the given relative mass ratios. In addition to abbreviations which would be well understood to those skilled in the art and abbreviations which are already defined herein, the following abbreviations are used in the tables to denote certain ingredients:

Other (non invention) CTMs

3-Me cpd=bis(N,N'-3-methylphenyl)bis(N,N'-phenyl)-1, 1'-biphenyl-4,4'-diamine;

2-Me cpd=bis(N,N'-2-methylphenyl)bis(N,N'-phenyl)-1, 1'-biphenyl-4,4'-diamine;

2,4-diMe cpd=bis(N,N'-2,4-methylphenyl)bis(N,N'-phenyl)-1,1'-biphenyl-4,4'-diamine;

TPTA=tri-4-tolylamine

BD=trans,trans-1,4-[bis(4-diethylamino)phenyl] diphenyl-1,3-butadiene;

MPMP=bis(N,N-4-diethylamino-2-methylphenyl)-4-methylphenylmethane;

TAPC=1,1-bis(4-ditolyaminophenyl)cyclohexane; and/or

PVK=polyvinylcarbazole

CGMs

T1=TiOPc(I):

T2=TiOPc(II);

T3=TiOPc(III);

T4=TiOPc(IV);

TX=TiOPc(X);

TZ=TiOPc(Za);

X=XPc;

G=GaOHPc

DBA=dibromoanthanthrone

Se=trigonal selenium

SeTe=selenium tellurium alloy

CuPc=copper phthalocyanine;

VOPc=Vanadyl phthalocyanine;

AlClPc=chloroaluminium phthalocyanine;

InClPc=chloroindium phthalocyanine;

NiPc=Nickel phthalocyanine;

PtPc=platinum phthalocyanine;

PECl=N,N-bis(2-phenethyl)perylene-3,4:9,10-bis (dicarboxiimide);

BZP=bis(benzimidazole)perylene;

PV=N,N-di(3,5-dimethylphenyl)perylene-3,4:9,10-tetracarboxylic acid diimide; and/or AZO1=4,4'-[(9-oxo-9H-fluorene-2,7-diyl)bis(azo)]-bis [N-(2-chlorophenyl)-3-hydroxy-2-naphtalenecarboxamids].

Resins

APEC denotes various different grades of co-polycarbonate resins such as those available commercially from Bayer e.g. under the trade designations 9202 (=APEC02);

9204 (=APEC04);

PCZ denotes various different grades of polycarbonate resins such as those available commercially from Esprit Chemical Co. e.g. under the trade designations TS 2020 (=PCZ20); TS2040 (=PCZ40);

PCA denotes various different grades of polycarbonate resin such as those available commercially from GE under the trade designation Lexan 161 (=PCA61);

PS denotes polystyrene available from Huntsman;

PSF denotes polysulfones (e.g. Udel, Astrel, Victrex);

PMMC denotes poly(methyl methacrylate);

PVBB denotes poly(vinyl 3-bromobenzoate);

PE denotes polyester resins (e.g. Vitel PE200, Vylon RV200);

PKHH denotes phenoxy resins;

PAR denotes polyarylates (e.g. Ardel DM100NT, Arylef, Arylon, Unikita U100);

PVB denotes various different grades of polyvinylbutyral resin available commercially from Sekisui under the trade designations BM-S (=PVB-S): or Monsanto under the trade designations such as Butvar B76, B90; and SAC denotes styrene-acrylic resins.

| Solvents | | |
|---|---|---|
| EA = ethyl acetate; | CB = chlorobenzene; | DCM = dichloromethane; |
| BA = n-butylacetate; | Tol = toluene; | THF = tetrahydrofuran. |

Table 17 denotes CTL compositions.

Table 18 describes liquid compositions which can be used to form a CTL (e.g. by dip coating an electromagnetic drum pre-coated with a CGL and then evaporation of solvent).

Table 19 describes CGL compositions that can be used in the conventional manner (e.g. as described herein) in conjugation with CTLs of the invention such as those compositions in Tables 17 and/or 18 and/or any other CTLs described herein. The column in this table headed "CTL ref." refers to a CTL which might be used especially with this CGL. A reference to Table 17 denotes a CTL directly, whereas a reference to Table 18 denotes that CTL would be formed from the liquid composition referred to in Table 18.

These CGLs and CTLs may be arranged on the OPC device to form multiple, different layers (of any suitable thicknesses) or the CGL and CTL may be combined one homogeneous layer on the drum with the composition of the combination. However in preference, the drum comprises a single CGL on top of which lies a single CTL.

TABLE 17

| Ref. | Polymeric CTM Ex(s) | Other CTM(s) | Resin(s) |
|---|---|---|---|
| A | 8 (20) | — | PCZ40 (80) |
| B | 3 (30) | — | PCZ20 (70) |
| C | 17 (25) | 3-Me cpd (10) | PCA51 (65) |
| D | 21 (20) + 15 (10) | — | PCZ40 (70) |
| E | 26 (10) | — | APEC02 (90) |
| F | 27 (17) | 2-Me cpd (5) | PCA61 (76) |
| G | 7 (27) | — | PCZ20 (73) |
| H | 13 (32) | — | PCA61 (65) |
| I | 14 (22) | 2,4-dlMe cpd (6) | APEC02 (72) |
| J | 8 (12) | 3-Me cpd (3) + 2-Me cpd (5) | APEC02 (80) |
| K | 3 (30) | — | PKHH (70) |
| L | 17 (25) | PVK (5) | PE (70) |
| M | 15 (30) | — | PMMA (70) |
| N | 17 (20) | TAPC (5) | PE (70) |
| O | 7 (35) | — | SAC (65) |
| P | 8 (20) | BD (10) | PS (70) |
| R | 3 (28) | MPMP (12) | PCZ20 (60) |
| Q | 28 (40) | — | PAR (60) |
| R | 3 (40) | — | PS (60) |
| S | 7 (40) | TAPC (10) | PAR (50) |
| T | 28 (40) | — | PMMA (60) |
| U | 3 (30) | BD (5) | PE (65) |
| V | 13 (35) | TPTA (10) | SAC (55) |
| W | 15 (20) | — | PCZ (60) |
| X | 14 (20) | — | PCA (80) |
| Y | 15 (20) | — | PS (80) |
| Z | 21 (50) | — | PCA (50) |

TABLE 18

| Ref. | Polymeric CTM Ex(s) | Other CTM(s) | Resin(s) | Solvent(s) |
|---|---|---|---|---|
| a | 3 (10) | — | PCZ40 (40) | THF (50) |
| b | 17 (4) | — | PCZ20 (16) | DCM (80) |
| c | 15 (2) | 2,4-dlMe cpd (1) + 4-Me cpd (2) | PCZ40 (20) + PCA61 (5) | CB (70) |
| d | 7 (3) | — | PCA51 (7) | DCM (45) + CB (45) |
| e | 13 (15) | — | PCA61 (50) | CB (35) |
| f | 8 (6) | — | PCZ20 (14) | Tol (80) |
| g | 27 (2) | 3-Me cpd (3) + 4-Me cpd (2) | APEC02 (18) + PCA61 (5) | DCM (70) |
| h | 14 (10) | — | PSF (20) | CB (70) |
| i | 8 (4) | TPTA (4) | PAR (12) | DCM (60) |
| j | 21 (8) | — | PE (10) | Tol (82) |
| k | 15 (9) | — | PKHH (16) | THF (75) |
| l | 17 (5) | TAPC (4) | SAC (13) | CB (78) |
| m | 8 (8) | — | PCA61 (17) | CB (75) |
| n | 13 (10) | — | PKHH (18) | Tol (72) |
| o | 14 (8) | — | PAR (14) | DCM (78) |
| p | 15 (8) | — | PS (12) | THF (80) |
| q | 14 (6) | BD (4) | PAR (10) | CB (80) |
| r | 13 (10) | — | PS (14) | Tol (76) |
| s | 7 (10) | — | PE (13) | THF (77) |
| t | 27 (7) | — | PCZ (13) | Tol (80) |
| u | 28 (10) | TPTA (5) | PMMA (15) | DCM (75) |

TABLE 18-continued

| Ref. | Polymeric CTM Ex(s) | Other CTM(s) | Resin(s) | Solvent(s) |
|---|---|---|---|---|
| v | 15 (10) | — | SAC (20) | THF (70) |
| w | 21 (10) | — | PCA (12) | CB (78) |
| x | 17 (4) | 3-Me cpd (4) | PCA (12) | DCM (80) |
| y | 15 (10) | — | PKHH (15) | THF (75) |
| z | 21 (12) | — | PCZ (14) | Tol (74) |

TABLE 19

| CGM(s) | Resin(s) | CTL ref. |
|---|---|---|
| T1 (50) | PVB-S (50) | A |
| T4 (70) | PVB-S (30) | a |
| G (60) | PVB-S (40) | B |
| DBA (80) | PCZ40 (20) | b |
| BZP (65) | PCA61 (35) | C |
| XPc (70) | APEC02 (30) | D |
| TX (50) | PVB-S (50) | d |
| TZ (65) | PVB-S (35) | E |
| T4 (65) | PVB-S (35) | e |
| DBA (75) | PCA61 (25) | f |
| T1 (60) | PCA61 (40) | F |
| TZ (80) | PCZ20 (20) | G |
| VOPc (45) | PVB (55) | k |
| NlPc (70) | PCZ (30) | p |
| AlClPc (60) | PKHH (40) | b |
| InClPc (80) | PVB (20) | Q |
| X (70) | PVB (30) | o |
| PtPc (70) | PVB (30) | l |
| Se (50) | PVK (50) | P |
| SeTe (50) | PVK (50) | f |
| PECl (60) | PVB (40) | G |
| PV (70) | SAC (30) | j |
| BZP (80) | PVB (20) | n |
| AZO1 (67) | SAC (33) | H |
| T4 (50) | PCA (50) | J |
| BZP (75) | SAC (25) | K |
| DBA (50) | PVK (50) | h |
| CuPc (75) | PVB (25) | N |
| VOPc (70) | PVB (30) | f |
| PV (80) | SAC (20) | l |
| T4 (70) | PVB (30) | x |
| CuPc (70) | PCA (30) | q |

What is claimed is:

1. A polymeric material comprising at least one repeat unit, the or each (if more than one) repeat unit consisting substantially of a moiety of Formula I:

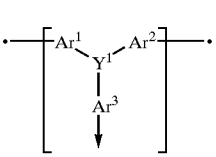

Formula 1 in which:

Y$^1$ represents, independently if in different repeat units, N, P, S, As and/or Se;

Ar$^1$ and Ar$^2$ which may be the same or different, represent, independently if in different repeat units, a multivalent aromatic group optionally substituted by at least one optionally substituted C$_{1-40}$carbyl-derived groups and/or at least one other optional substituent, and Ar$^3$ represents, independently if in different repeat units, a mono or multivalent aromatic group optionally substituted by at least one; optionally substituted C$_{1-40}$carbyl-derived group and/or at least one other optional substituent; except when $Y^1$ is divalent S or divalent Se, $Ar^3$ and the arrow therefrom are not present;

the arrow from $Ar^3$ indicates, in the case where $Ar^3$ is monovalent, a bond to a terminal group inert to coupling in the polymerisation to form said polymeric material, or, in the case where $Ar^3$ is multivalent, a bond to another said repeat unit;

where at least one terminal group is attached in the polymer to the $Ar^1$, $Ar^2$ and optionally $Ar^3$ groups located at the end of the polymer chains, so as to cap the polymer chains and prevent further polymer growth, and at least one terminal group is derived from at least one end capping reagent used in the polymerisation to form said polymeric material to control the molecular weight thereof.

2. A polymeric material as claimed in claim 1, which comprises a substance represented by Formula 2:

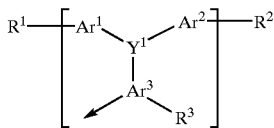

Formula 2 where
$Ar^1$, $Ar^2$, $Ar^3$ and $Y^1$ and the arrow from $Ar^3$, are defined above;
n represents and integer from 3 to about 500;
$R^1$, $R^2$ and $R^3$ represents, independently, a terminal group as described herein, $R^3$ only being present when $Ar^3$ is not attached to another repeat unit.

3. A polymeric material as claimed in claim 1, in which $Ar^1$, $Ar^2$, and $Ar^3$ comprises independently if in different repeat units, at least one optionally substituted heterocyclic and/or benzenoid ring which comprises an aromatic moiety.

4. A polymeric material as set forth in claim 1, in which $Ar^1$, $Ar^2$, and $Ar^3$ comprise, independently if in different repeat units, a bivalent aromatic $C_{6-40}$ hydrocarbyl.

5. A polymeric material as claimed in claim 1, which comprises a substance represented by Formula 3:

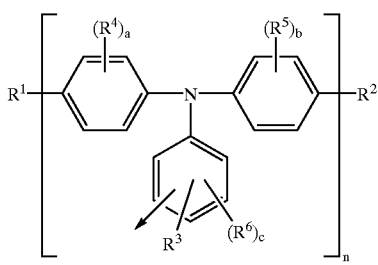

Formula 3 where
$R^1$, $R^2$, $R^3$ and n represent, independently if in different repeat units, those groups or values described herein, $R^3$ only being present when the ring to which it is attached is not itself attached to another repeat unit;
a and b represent, independently in each case, 0 or an integer from 1 to 4;
c represents, independently in each case, 0 or an integer from 1 to d (where d is 6 minus the valence of the aromatic group);
n represents an integer from 4 to about 200; and $R^4$, $R^5$ and $R^6$ represent, independently in each case, optionally substituted $C_{1-15}$ alkyl and/or at least one optional substituent.

6. A polymeric material as claimed in claim 1, in which the terminal group(s) comprise, independently if in different repeat units, at least one optionally substituted $C_{1-40}$ hydrocarbyl group each of which is substantially incapable of undergoing chain extension or cross-linking under the conditions of polymerization.

7. A polymeric material as claimed in claim 1, in which the terminal group(s) comprise, independently if in different repeat units, at least one group selected from $C_{1-30}$ alkyl, $C_{6-36}$ aryl and $C_{7-36}$ aralkyl, each of which is substantially incapable of undergoing chain extension or cross-linking under the conditions of polymerization.

8. A polymeric material as claimed in claim 1 which is obtained by process for preparing an end capped polymeric material, the process comprising the steps of:

a) performing polymerization of at least one polymer precursor of Formula 4:

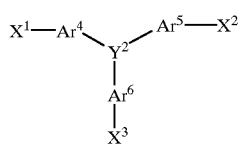

Formula 4 in which:
$Y^2$ independently represents, N, P, S, As and/or Se;
$Ar^4$, $Ar^5$, and $Ar^6$ which may be the same or different, each independently, represent at least one mononuclear or polynuclear aromatic group optionally substituted by a substituent which does not react with other groups on the polymer precursor(s) under the conditions of polymerisation;
$X^1$, $X^2$ which may be the same or different, each independently represent a leaving group which, under the conditions of polymerisation, permits coupling between the aromatic groups to which they are attached and an aromatic group not linked thereto, directly via a bond {this provides chain extension and optional cross-linking, optionally with another of the or each polymer precursor(s)}; and
$X^3$ independently represents H, another group inert to coupling or a leaving group which, under the conditions of polymerization, permits coupling between the aromatic group to which it is attached and an aromatic group not linked thereto, directly via a bond {this provides chain extension and optional cross-linking, optionally with another of the or each polymer precursor(s)}; and then:

b) adding an end capping reagent of Formula 5 in an amount sufficient to reduce substantially polymerization (optionally the end capping reagent is added in excess), and where in Formula 5:

$$T—X^4$$

Formula 5

T represents a carbyl-derived radical, optionally substituted by at least one substituent which does not react with other groups on the polymer precursor(s) under the condition of polymerisation; and
$X^4$ represents at least one group in the compound of Formula 5 which, under the conditions of polymerisation, permits coupling between T and an aromatic group on the growing polymer directly via bond, so as to end cap the chain and provide chain termination.

9. A process for preparing the polymeric material as set forth in claim 8, comprising a) performing polymerization of at least one polymer precursor of Formula 4:

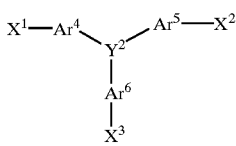

Formula 4 in which:

$Y^2$ independently represents N, P, S, As and/or Se;

$Ar^4$, $Ar^5$, and $Ar^6$ which may be the same or different, each independently represent at least one mononuclear or polynuclear aromatic group optionally substituted by a substituent which does not react with other groups on the polymer precursor(s) under the condition of polymerisation;

$X^1$, and $X^2$ which may be the same or different, each independently represent a leaving group which, under the conditions of polymerisation, permits coupling between the aromatic groups to which they are attached and an aromatic group not linked thereto, directly via a bond {this provides chain extension and optional cross-linking, optionally with another of the or each polymer precursor(s)}; and $X^3$ independently represents H, another group intert to coupling or a leaving group which, under the conditions of polymerization, permits coupling between the aromatic group to which it is attached and an aromatic group not linked thereto, directly via a bond {this provides chain extension and optional cross-linking, optionally with another of the or each polymer precursor(s)}; and then:

b) adding an end capping reagent of Formula 5 in an amount sufficient to reduce substantially polymerization (optionally the end capping reagent is added in excess), and where in Formula 5:

$$T\!-\!X^4$$

Formula 5

T represents a carbyl-derived radical, optionally substituted by at least one substituent which does not react with other groups on the polymer precursor(s) under the conditions of polymerisation; and $X^4$ represents at least one group in the compound of Formula 5 which, under the conditions of polymerization, permits coupling between T and an aromatic group on the growing polymer directly via a bond, so as to end cap the chain and provide chain termination.

10. A charge transport material comprising a polymeric material as claimed in claim 1.

11. A method which comprises transporting charge and/or improving electroreprographic and/or electroluminescent performance with a polymeric material according to claim 1.

12. A polymeric material as claimed in claim 5, wherein c represents 0 to 5.

13. A polymeric material as claimed in claim 8, wherein $Y^2$ represents N.

* * * * *